(12) United States Patent
Iwahori

(10) Patent No.: US 6,870,355 B2
(45) Date of Patent: Mar. 22, 2005

(54) POWER CONVERTER

(75) Inventor: Yutaka Iwahori, Kadoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/479,418

(22) PCT Filed: Mar. 25, 2003

(86) PCT No.: PCT/JP03/03666

§ 371 (c)(1),
(2), (4) Date: Apr. 19, 2004

(87) PCT Pub. No.: WO03/081758

PCT Pub. Date: Feb. 10, 2003

(65) Prior Publication Data

US 2004/0170036 A1 Sep. 2, 2004

(30) Foreign Application Priority Data

Mar. 26, 2002 (JP) .......................... 2002-086276
Mar. 26, 2002 (JP) .......................... 2002-086308

(51) Int. Cl.[7] .................................................. H02M 7/12
(52) U.S. Cl. ...................... 323/351; 323/271; 323/320; 363/84
(58) Field of Search ................... 323/237, 271, 323/282, 320, 351; 363/84, 89

(56) References Cited

U.S. PATENT DOCUMENTS

| | | | | |
|---|---|---|---|---|
| 4,931,716 A | * | 6/1990 | Jovanovic et al. | 323/285 |
| 5,097,196 A | * | 3/1992 | Schoneman | 323/222 |
| 5,627,741 A | | 5/1997 | Naruo et al. | |
| 5,637,988 A | * | 6/1997 | Gucyski | 323/222 |
| 5,808,455 A | * | 9/1998 | Schwartz et al. | 323/271 |
| 5,814,979 A | * | 9/1998 | Grimm | 323/284 |
| 6,094,038 A | * | 7/2000 | Lethellier | 323/282 |
| 6,198,260 B1 | * | 3/2001 | Wittenbreder | 323/271 |
| 6,583,610 B2 | * | 6/2003 | Groom et al. | 323/288 |
| 6,600,298 B2 | * | 7/2003 | McDonald et al. | 323/271 |
| 6,693,412 B2 | * | 2/2004 | Ruan et al. | 323/282 |
| 6,798,177 B1 | * | 9/2004 | Liu et al. | 323/222 |
| 6,815,939 B2 | * | 11/2004 | Umemoto et al. | 323/286 |

FOREIGN PATENT DOCUMENTS

| | | |
|---|---|---|
| JP | 5-111243 A1 | 4/1993 |
| JP | 2001-231267 A1 | 8/2001 |

* cited by examiner

*Primary Examiner*—Jeffrey Sterrett
(74) *Attorney, Agent, or Firm*—Rader, Fishman & Grauer PLLC

(57) ABSTRACT

This power converter comprises a plurality of switching elements, an inductor, and a smoothing capacitor. An input current of low frequency from the AC source is intermitted by the switching element turned on and off at high frequency, and an output current to a load is restricted by the inductor. These switching elements are controlled in different patterns. While these patterns are repeated, a current is always supplied to the load and inductor. Therefore, the power converter can provide a desired output power, making the inductance required for the inductor into the minimum. That is, the power converter can combine miniaturization and high-efficiency.

20 Claims, 67 Drawing Sheets

US 6,870,355 B2

POWER CONVERTER

TECHNICAL FIELD

The present invention relates to a power converter which provides an electric power for a load from an AC source.

BACKGROUND ART

Japanese Non-examined Patent Publication No.8-223915 discloses a conventional power converter. This power converter changes AC power which is from an AC source into DC power, and gives the DC power to a load. A boost converter and a back converter are arranged in parallel, and either of them operates according to power-supply voltage. These two converters include a switching element, respectively, and supply a current to the load, improving harmonic distortion, by making each switching element turn on and off at a frequency higher enough than the frequency of the AC power. This power converter includes two or more switching elements and one inductor which is shared by these converters. The switching elements are controlled in different patterns in order to give a plurality of current supplying modes. By repeating these current supplying modes, power is supplied to the load, improving the harmonic distortion. However, because, in one of these modes, the current does not flow through the inductor and the load at the same time, energy is stored in the inductor while the current is not supplied to the load. So, the amount of the current inputted into the inductor becomes large temporarily, compared with the average output current to the load. For this reason, the inductor and the switching elements need to withstand voltage; therefore, it was difficult to miniaturize the circuit.

DISCLOSURE OF THE INVENTION

In view of the above problem, the object of the present invention is to provide a power converter which has little harmonic distortion and can combine miniaturization and high-efficiency.

The power converter in accordance with the present invention comprises a plurality of switching elements which turns on and off repetitively to interrupt an input current from AC source to provide an output current to a load, an inductor provided in a path of the input current from the AC source to the load, a smoothing capacitor which smoothens the input current to the load, a control circuit for controlling the switching elements to turn on and off. The inductor and the load are connected in series across the AC source so that the current from the AC source can flow to the load directly. The inductor and the load are connected in series across the smoothing capacitor, therefore, the current flowing through the smoothing capacitor is supplied to the load, and a low frequency ripple is reduced.

The control circuit controls the plurality of the switching elements to turn on and off in different patterns to give a first current supplying mode and a second current supplying mode. The first current supplying mode supplies the input current from the AC source in a closed loop including the inductor and the load, during which the current from the AC source is fed directly to the load. The second current supplying mode supplies the output current to the load in a closed loop including the inductor and the load but excluding the AC source, during which energy stored in the inductor supplies a current to the load. The control circuit repeats the first current supplying mode and the second current supplying mode alternately during each half cycle of the AC current supplied from the AC source, thereby constantly passing the current to the inductor and the load. Therefore, a current loop which always contains both the inductor and the load always exists, and the inductor passes only the input current near the average output current needed for the load. Accordingly, it becomes possible to use a small inductor which has small inductance and to improve the harmonic distortion. Therefore, the miniaturization of the whole device can be attained. That is, an efficient and small power converter can be provided.

Preferably, the control circuit controls the plurality of the switching elements in three different patterns to continuously repeat a first pattern, a second pattern, and a third pattern in this order. One of the three patterns defines one of the first current supplying mode and the second current supplying mode; the remaining two patterns define the other of the first current supplying mode and the second current supplying mode. The voltage applied to the inductor decreases in accordance with a progress from the first pattern to the third pattern. Therefore, it is possible to supply a sufficient current to the load through the inductor, lowering the peak value of the current which flows to the inductor. Consequently, the loss reduction of a power conversion and the miniaturization of the device can be attained.

Furthermore, the first pattern allows the smoothing capacitor to pass a discharge current through the inductor, the second pattern keeps the smoothing capacitor free from the current flowing through the inductor, and the third pattern allows the smoothing capacitor to be charged by the current flowing through the inductor. Therefore, the inductor is always supplied with a current, and the change of the current flowing through the inductor draws a generally trapezoid-shape along the time-axis. Therefore, the peak of the current flowing through the inductor is lowered, and the miniaturization of the inductor can be attained.

In one concrete circuit arrangement realizing the above power converter, a rectifier circuit DB which rectifies the AC current from the AC source to give a DC voltage is provided in the power converter. The switching elements comprise a first switching element Q1, a second switching element Q2, and a third switching element Q3. The first switching element Q1, the second switching element Q2, and the third switching element Q3 are connected in series with the inductor L, the load LD, a first diode D1, and the smoothing capacitor C1 across the rectifier circuit DB. A second diode D2 is connected across a series circuit of the smoothing capacitor C1 and the third switching element Q3. The second diode D2 is connected in series with a third diode D3 across a series circuit of the inductor L, the first diode D1, the load LD, and the second switching element Q2. And a fourth diode D4 is connected in series with the smoothing capacitor across the second switching element Q2.

The control circuit can always pass the current to the load and the inductor, improving the harmonic distortion, namely, a power-factor, by controlling the first, second, and third switching elements Q1–Q3 in three different patterns.

A power converter in accordance with other concrete circuit arrangement includes five switching elements Q1–Q5 in addition to a rectifier circuit DB which rectifies the AC current from the AC source to give a DC voltage. Each of the second switching element Q2 and the fourth switching element Q4 has a bypass allowing a reverse current to flow across each switching element. The first switching element Q1 and the second switching element Q2 are connected in series with a first diode across the rectifier circuit DB, and the first diode D1 is inserted between a high voltage side of the rectifier circuit DB and the first switching element Q1, and a cathode of the first diode D1 is connected to the first switching element Q1. The third switching element Q3 and the fourth switching element Q4 are connected in series with a second diode across the rectifier circuit DB, and the second diode D2 is inserted between a high voltage side of the rectifier circuit DB and the third switching element Q3, and a cathode of the second diode D2 is connected to the third switching element Q3. The second switching element Q2 and the fourth switching element Q4 are connected through a common third diode D3 to a low voltage side of the rectifier circuit DB. The inductor L is connected in series with the load LD between the connection point of the first switching element Q1 with the second switching element Q2 and the connection point of the third switching element Q3 with the fourth switching element Q4. The fifth switching element Q5 is connected in series with the first diode D1, the first switching element Q1, the inductor L, the load LD, the fourth switching element Q4, and the smoothing capacitor C1 across the rectifier circuit DB. Also, the fifth switching element Q5 is connected in series with the second diode D2, the third element Q3, the load LD, the inductor L, the switching element Q2, and the smoothing capacitor C1 across the rectifier circuit DB. The fourth diode D4 is connected in series with the bypass of the second switching element Q2, the inductor L, and the load LD across the smoothing capacitor C1. And the fifth diode D5 is connected in series with the bypass of the fourth switching element Q4, the load LD, and the inductor L across the smoothing capacitor.

The control circuit passes the current to the load in one direction by making the first and fourth switching elements Q1, Q4 turn on and off at the same time and making both the second and third switching elements Q2, Q3 turn off in the meantime, while making the fifth switching element Q5 turn on and off on a predetermined cycle. And also, the control circuit passes the current to the load in the reverse direction by making the second and third switching elements Q2, Q3 turn on and off at the same time and making both of the first and fourth switching elements Q1, Q4 turn off in the meantime, while making the fifth switching element Q5 turn on and off on a predetermined cycle. By this, the control circuit can drive the load by the alternating current of a predetermined frequency. Therefore, a power conversion of AC-DC and a power conversion of DC-AC can be attained at the same time, always passing the current to the load and the inductor, by using only five switching elements. Because each of the second switching element Q2 and the fourth switching element Q4 has the bypass allowing the reverse current to flow across each switching element, the current produced from the energy stored at the inductor L charges the smoothing capacitor C1 through either the second switching element Q2 or the fourth switching element Q4.

A power converter in accordance with other concrete circuit arrangement includes five switching elements Q1–Q5 in addition to a rectifier circuit DB which rectifies the AC current from the AC source to give a DC voltage. The first switching element Q1 and the second switching element Q2 are connected in series with a first diode D1 across the rectifier circuit DB, and the first diode D1 is inserted between a high voltage side of the rectifier DB and the first switching element Q1, and the first diode D1 has a cathode connected to the first switching element Q1. The third switching element Q3 and the fourth switching element Q4 are connected in series with a second diode D2 across the rectifier circuit DB, and the second diode D2 is inserted between a high voltage side of the rectifier DB and the third switching element Q3, and the second diode D2 has a cathode connected to the third switching element Q3. The inductor L is connected in series with the load LD between the connection point of the first switching element Q1 with the second switching element Q2 and the connection point of the third switching element Q3 with the fourth switching element Q4. A series circuit of the first diode D1, the first switching element Q1, the inductor L, the load LD, and the fourth switching element Q4 is connected in series with the fifth switching element Q5, and also, a series circuit of the second diode D2, the third switching element Q3, the inductor L, the load LD, and the second switching element Q2 is connected in series with the fifth switching element Q5. The AC source, the rectifier circuit DB, the first diode D1, the first switching element Q1, the inductor L, the load LD, and the third diode D3 are connected in series across the smoothing capacitor C1. And the AC source, the rectifier circuit DB, the second diode D2, the third switching element Q3, the inductor L, the load LD, and the fourth diode D4 are connected in series across the smoothing capacitor C1.

The control circuit passes the current to the load in one direction by making the first and fourth switching elements Q1, Q4 turn on and off at the same time and making both of the second and third switching elements Q2, Q3 turn off in the meantime, while making the fifth switching element Q5 turn on and off on a predetermined cycle. And also, the control circuit passes the current to the load in the reverse direction by making the second and third switching elements Q2, Q3 turn on and off at the same time and making both the first and fourth switching elements Q1, Q4 turn off, while making the fifth switching element Q5 turn on and off on a predetermined cycle. Therefore, the control circuit can drive the load by the alternating current of a predetermined frequency. And, the power conversion of AC-DC and the power conversion of DC-AC can be attained at the same time by using only five switching elements, always passing the current to the load and the inductor.

A power converter in accordance with other concrete circuit arrangement is designed to pass the alternating current to the load by using four switching elements Q1–Q4. The first switching element Q1 and the second switching element Q2 are connected in series with the inductor L and the load LD across the AC source, and the first switching element Q1 and the third switching element Q3 are connected in series with the inductor L and the load LD across the AC source. Each of the second switching element Q2 and the third switching element Q3 has a bypass allowing a reverse current to flow across each switching element. A series circuit of a first smoothing capacitor C1 and a second smoothing capacitor C2 is connected across a series circuit of the second switching element Q2 and the third switching element Q3. A series circuit of a first diode D1 and a second diode D2 are connected across the series circuit of the second switching element Q2 and the third switching element Q3. A diode bridge D11–D14 is inserted between the connection point of the first smoothing capacitor C1 with the second smoothing capacitor C2 and the AC source, each input terminal of the diode bridge is connected to the connection point of the first smoothing capacitor C1 with the second smoothing capacitor C2 and the AC source, respectively. The first switching element Q1 is connected between output terminals of the diode bridge D11–D14. A series circuit of a third diode D3 and a fourth diode D4 is connected across a series circuit of the first diode D1 and the second diode D2. The inductor L and the load LD are connected in series between the connection point of the first diode D1 with the second diode D2 and the connection point of the third diode D3 with the fourth diode D4. The fourth switching element Q4 is connected across the series circuit of the third diode D3 and the fourth diode D4. A series circuit of a fifth diode D5 and a sixth diode D6 is connected across the series circuit of the first diode D1 and the second diode D2, and the AC source is inserted between the connection point of the first diode D1 with the second diode D2 and the connection point of the fifth diode D5 with the sixth diode D6.

The control circuit passes the current to the load in one direction by making the second switching element Q2 turn on and off and making the third switching element Q3 turn off in the meantime, while making the first and fourth switching elements Q1, Q4 turn on and off alternately, and also, the control circuit passes the current to the load in the reverse direction by making the third switching element Q3 turn on and off and making the second switching element turn off in the meantime, while making the first and fourth switching elements Q1, Q4 turn on and off alternately. Therefore, the control circuit can provide the alternating current of a predetermined frequency for the load by setting up the time from the on/off control action of one of the second switching element Q2 and the third switching element Q3 to the on/off control action of the other of the switching elements Q2 and Q3. So, the power conversion of AC-DC and the power conversion of DC-AC can be attained at the same time by using only four switching elements, always passing the current to the load and the inductor.

A power converter in accordance with other concrete circuit arrangement is designed to pass the alternating current to the load by using four switching elements Q1–Q4. The first switching element Q1 and the second switching element Q2 are connected in series with the inductor L and the load LD across the AC source, and the first switching element Q1 and the third switching element Q3 are connected in series with the inductor L and the load LD across said AC source. Each of the second switching element Q2 and the third switching element Q3 has a bypass allowing a reverse current to flow across each switching element. A series circuit of a first diode D1 and a second diode D2 is connected across a series circuit of the second switching element Q2 and the third switching element Q3. A series circuit of a first smoothing capacitor C1 and a second smoothing capacitor C2 is connected across the series circuit of the second switching element Q2 and the third switching element Q3. A diode bridge D11–D14 is inserted between the connection point of the first smoothing capacitor C1 with the second smoothing capacitor C2 and one terminal of the AC source, and each input terminal of the diode bridge is connected to the connection point of the first smoothing capacitor C1 with the second smoothing capacitor C2 and the terminal of the AC source, respectively. The first switching element Q1 is connected between output terminals of the diode bridge D11–D14, and the one terminal of the AC source is connected with the connection point of the first diode D1 with the second diode D2. A diode bridge D3-D6 is inserted between the connection point of the first diode D1 with the second diode D2 and the connection point of the second switching element Q2 with the third switching element Q3. The diode D3 is connected in series with said diode D4. The diode D5 is connected in series with the diode D6. The inductor L and the load LD are connected in series between the connection point of the diode D3 with the diode D4 and the connection point of the diode D5 with the diode D6. The fourth switching element Q4 is connected across a series circuit of the fifth diode D5 and the sixth diode D6.

The control circuit passes the current to the load in one direction by making the second switching element Q2 turn on and off and making the third switching element Q3 turn off in the meantime, while making the first and fourth switching element Q1, Q4 turn on and off alternately, and also, the control circuit passes the current to the load in the reverse direction by making the third switching element Q3 turn on and off and making the second switching element Q2 turn off in the meantime, while making the first and fourth switching elements Q1, Q4 turn on and off alternately. Therefore, the control circuit can provide the alternating current of a predetermined frequency for the load by setting up the time from the on/off control action of one of the second switching element Q2 and the third switching element Q3 to the on/off control action of the other of the switching elements Q2, Q3. So, the power conversion of AC-DC and the power conversion of DC-AC can be attained at the same time by using only four switching elements, always passing the current to the load and the inductor.

A power converter in accordance with other concrete circuit arrangement is designed to pass the alternating current to the load by using four switching elements Q1–Q4. The first switching element Q1 and a first smoothing capacitor C1 are connected in series with the inductor L and the load LD across the AC source, and the second switching element Q2 and a second smoothing capacitor C2 are connected in series with the inductor L and the load LD across the AC source. Each of the first switching element Q1 and the second switching element Q2 has a bypass allowing a reverse current to flow across each switching element. The first switching element Q1 and the second switching element Q2 are connected in series, and a series circuit of the first smoothing capacitor C1 and the second smoothing capacitor C2 is connected across the series circuit of the first switching element Q1 and the second switching element Q2. A first diode D1 and the third switching element Q3 are connected in series across a series circuit of the inductor L and said load LD, and a second diode D2 and the fourth switching element Q4 are connected in series across the series circuit of the inductor L and the load LD. A series circuit of the third switching element Q3 and the fourth switching element Q4 is connected across a series circuit of the first diode D1 and the second diode D2, and the AC source is inserted between the connection point of the first switching element Q1 with the second switching element Q2 and the connection point of the first diode D1 with the second diode D2. The load LD, the inductor L, the AC source, and the bypass of the first switching element Q1 are connected in series across the first smoothing capacitor C1. The bypass of the second switching element Q2, the AC source, the inductor L, and the load LD are connected in series across the second smoothing capacitor C2.

The control circuit passes the current to the load in one direction by making the second and third switching elements Q2, Q3 turn off while making the first and fourth switching elements Q1, Q4 turn on and off alternately. And also, the control circuit passes the current to the load in the reverse direction by making the first and fourth switching elements Q1, Q4 turn off while making the second and third switching elements Q2, Q3 turn on and off alternately. Therefore, the control circuit can provide the alternating current of a predetermined frequency for the load by setting up the time from the alternating on/off control action of the first switching element Q1 and the fourth switching element Q4 to the alternating on/off control action of the second switching element Q2 and the third switching element Q3. So, the power conversion of AC-DC and the power conversion of DC-AC can be attained at the same time by using only four switching elements, always passing the current to the load and the inductor.

A power converter in accordance with other concrete circuit arrangement is designed to pass the alternating current to the load by using four switching elements Q1–Q4. The first switching element Q1 and a first diode D1 are connected in series with the inductor L and the load LD across the AC source, the second switching element Q2 and a second diode D2 are connected in series with the inductor L and the load LD across the AC source. Each of the first switching element Q1 and the second switching element Q2 has a bypass allowing a reverse current to flow across each switching element. The first switching element Q1 and the second switching element Q2 are connected in series, and a series circuit of the first diode D1 and the second diode D2 and a smoothing capacitor C1 are connected across the series circuit of the first and second switching elements Q1, Q2. A series circuit of the third switching element Q3 and the fourth switching element Q4 is connected across a series circuit of the switching element Q1 and the second switching element Q2. The AC source is inserted between the connection point of the first diode D1 with the second diode D2 and the connection point of the third switching element Q3 with the fourth switching element Q4. The inductor L and the load LD are inserted in series between the connection point of the first switching element Q1 with the second switching element Q2 and the connection point of the third switching element Q3 with the fourth switching element Q4. The bypass of the second switching element Q2, the load LD, the inductor L, the AC source, and the first diode D1 are connected in series across the smoothing capacitor C1, and the second diode D2, the AC source, the inductor L, the load LD, and the bypass of the first switching element Q1 are connected in series across the smoothing capacitor C1.

The control circuit passes the current to the load in one direction by making the second and third switching elements Q2, Q3 turn off while making the first and fourth switching elements Q1, Q4 turn on and off. And also, the control circuit passes the current to the load in the reverse direction by making the first and fourth switching elements Q1, Q4 turn off while making the second and third switching elements Q2, Q3 turn on and off. Therefore, the control circuit can provide the alternating current of a predetermined frequency for the load by setting up the time from the on/off control action of the first and fourth switching elements Q1, Q4 to the on/off control action of the second and third switching elements Q2, Q3. So, the power conversion of AC-DC and the power conversion of DC-AC can be attained at the same time by using only four switching elements, always passing the current to the load and the inductor.

A power converter in accordance with other concrete circuit arrangement is designed to pass the alternating current to the load by using four switching elements Q1–Q4. A first diode D1 and the first switching element Q1 are connected in series with the inductor L and the load LD across the AC source, and the second switching element Q2 and a second diode D2 are connected in series with the inductor L and the load LD across the AC source. The first switching element Q1 and the second switching element Q2 are connected in series, and the series circuit of the first and second switching elements is connected across a series circuit of the first diode D1 and the second diode D2. A first smoothing capacitor C1 and the third switching element Q3 are connected in series across a series circuit of the inductor L and the load LD. The fourth switching element Q4 and a second smoothing capacitor C2 are connected in series across the series circuit of the inductor L and the load LD. Each of said third switching element Q3 and said fourth switching element Q4 has a bypass allowing a reverse current to flow across each switching element. The first smoothing capacitor C1 and the second smoothing capacitor C2 are connected in series, and the series circuit of the first and second smoothing capacitors is connected across a series circuit of the third switching element Q3 and the fourth switching element Q4. The AC source is connected between the connection point of the first diode D1 with the second diode D2 and the connection point of the first smoothing capacitor C1 with the second smoothing capacitor C2. The inductor L, the load LD, and the bypass of the third switching element Q3 are connected in series across the first smoothing capacitor C1. The bypass of the fourth switching element Q4, the load LD, and the inductor L are connected in series across the second smoothing capacitor C2.

The control circuit passes the current to the load in one direction by making the second and fourth switching elements Q2, Q4 turn off while making the first and third switching elements Q1, Q3 turn on and off alternately. And also, the control circuit passes the current to the load in the reverse direction by making the first and third switching elements Q1, Q3 turn off while making the second and fourth switching elements Q2, Q4 turn on and off alternately. Therefore, the control circuit can provide the alternating current of a predetermined frequency for the load by setting up the time from the alternating on/off control action of the first and third switching elements Q1, Q3 to the alternating on/off control action of the second and fourth switching elements Q2, Q4. So, the power conversion of AC-DC and the power conversion of DC-AC can be attained at the same time by using only four switching elements, always passing the current to the load and the inductor.

A power converter in accordance with other concrete circuit arrangement is designed to pass the alternating current to the load by using four switching elements Q1–Q4. A first diode D1 and a first smoothing capacitor C1 are connected in series with the inductor L and the load LD across the AC source, and a second diode D2 and a second smoothing capacitor C2 are connected in series with the inductor L and the load LD across the AC source. The first diode D1 and the second diode D2 are connected in series, and the series circuit of the first and second diodes is connected across a series circuit of the first smoothing capacitor C1 and the second smoothing capacitor C2. A series circuit of the first switching element Q1 and the second switching element Q2 is connected across a series circuit of the first diode D1 and the second diode D2. A series circuit of a third diode D3 and the third switching element Q3 is connected across a series circuit of the inductor L and the load LD, and a series circuit of a fourth diode D4 and the fourth switching element Q4 is connected across the series circuit of the inductor L and the load LD. A series circuit of the third switching element Q3 and the fourth switching element Q4 is connected across a series circuit of the third diode D3 and the fourth diode D4. The AC source is inserted between the connection point of the first diode D1 with the second diode D2 and the connection point of the first switching element Q1 with the second switching element Q2.

The control circuit passes the current to the load in one direction by making the second and third switching elements Q2, Q3 turn off while making the first and fourth switching elements Q1, Q4 turn on and off alternately. And also, the control circuit passes the current to the load in the reverse direction by making the first and fourth switching elements Q1, Q4 turn off while making the second and third switching elements Q2, Q3 turn on and off alternately. Therefore, the control circuit can provide the alternating current of a predetermined frequency for the load by setting up the time from the alternating on/off control action of the first and fourth switching elements Q1, Q4 to the alternating on/off control action of the second and third switching elements Q2, Q3. So, the power conversion of AC-DC and the power conversion of DC-AC can be attained at the same time by using only four switching elements, always passing the current to the load and the inductor.

A power converter in accordance with other concrete circuit arrangement is designed to pass the alternating current to the load by using four switching elements Q1–Q4. A first diode D1, the first switching element Q1, and a second diode D2 are connected in series with the inductor L and the load LD across the AC source, and the first diode D1, the second switching element Q2, the second diode D2, and a smoothing capacitor C1 are connected in series with the inductor L and the load LD across the AC source. And also, a third diode D3, the third switching element Q3, and a fourth diode D4 are connected in series with the inductor L and the load LD across the AC source, and the third diode D3, the fourth switching element Q4, the smoothing capacitor C1, and the fourth diode D4 are connected in series with the inductor L and the load LD across the AC source. Each of the second switching element Q2 and the fourth switching element Q4 has a bypass allowing a reverse current to flow across each switching element. A series circuit of the first switching element Q1, the fourth switching element Q4, the inductor L, and the load LD is connected across the smoothing capacitor C1, and also, a series circuit of the second switching element Q2, the third switching element Q3, the inductor L, and the load LD is connected across the smoothing capacitor C1. The second diode D2, the AC source, the first diode D1, the load LD, the inductor L, and the bypass of the second switching element Q2 are connected in series across the smoothing capacitor C1. And the fourth diode D4, the AC source, the third diode D3, the inductor L, the load LD, and the bypass of the fourth switching element Q4 are connected in series across the smoothing capacitor C1.

The control circuit passes the current to the load in one direction by making the second and third switching elements Q2, Q3 turn off while making the first and fourth switching elements Q1, Q4 turn on and off with different duty ratio. And also, the control circuit passes the current to the load in the reverse direction by making the first and fourth switching elements Q1, Q4 turn off while making the second and third switching elements Q2, Q3 turn on and off with different duty ratio. Therefore, the control circuit can provide the alternating current of a predetermined frequency for the load by setting up the time from the on/off control action of the first and fourth switching elements Q1, Q4 to the on/off control action of the second and third switching elements Q2, Q3. So, the power conversion of AC-DC and the power conversion of DC-AC can be attained at the same time by using only four switching elements, always passing the current to the load and the inductor.

It is preferable that the inductor L is connected with the smoothing capacitor through a rectifying device in a power converter in accordance with other concrete circuit arrangement. Also, it is preferred that the inductor L has a primary winding n1 and a secondary winding n2, and a current is fed to the load through the primary winding n1, and the secondary winding n2 is connected with the smoothing capacitor C1 through the rectifying device, and the smoothing capacitor C1 is charged by the current generated in the secondary winding. By using the inductor including the primary winding n1 and the secondary winding n2 as mentioned above, it is possible to set the voltage of the smoothing capacitor to a desired value by selecting the turn ratio of the primary winding n1 and the secondary winding n2 appropriately, whereby, the freedom of a circuit design can be improved.

Furthermore, a power converter in accordance with other concrete circuit arrangement converts power using a rectifier circuit DB which rectifies the AC current from said AC source and two switching elements Q1 and Q2. The first switching element Q1 is connected in series with the inductor L and the load LD across the rectifier circuit DB, and a first diode D1, the smoothing capacitor C1, and a second diode D2 are connected in series across the inductor L. The first diode D1 and the second diode D2 define the above rectifying device. A series circuit of the second switching element Q2, the inductor L, and the load LD is connected across the smoothing capacitor C1.

The control circuit can improve a power-factor and can limit the current to the load, always passing the current to the load and the inductor, by using two switching elements Q1, Q2 which are controlled so that they can have both a period in which they are turned on and off alternately and a period in which they are turned off at the same time.

Also, it is prevented that the supply voltage to the load will become superfluous, because the first diode D1 is connected in series with the inductor L and the smoothing capacitor C1 across the rectifier circuit DB and the current is shunted to the smoothing capacitor through the first diode D1 near the peak voltage of the AC source.

Furthermore, a power converter in accordance with other concrete circuit arrangement converts power using a rectifier circuit DB which rectifies the AC current from said AC source, two switching elements Q1 and Q2, and an inductor having a primary winding n1 and a secondary winding n2. The first switching element Q1 is connected in series with the primary winding n1 of the inductor L and the load LD across the rectifier circuit DB. The second switching element Q2, the inductor L, and the load LD are connected in series across the smoothing capacitor C1. The secondary winding n2 and a first diode D1 are connected across the smoothing capacitor C1, and the first diode D1 defines the rectifying device. The load LD and a second diode D2 are connected in series across the primary winding n1.

So, the control circuit can improve a power-factor and can limit the current to the load, always passing the current to the load and the inductor, by using two switching elements which are controlled so that they can have both a period in which they are turned on and off alternately and a period in which they are turned off at the same time. Furthermore, the freedom of a circuit design can be raised, because it is possible to set the voltage of the smoothing capacitor to a desired value by selecting the turn ratio of the primary winding n1 and the secondary winding n2 suitably.

Furthermore, a power converter in accordance with other concrete circuit arrangement converts power using a rectifier circuit DB which rectifies the AC current from said AC source and two switching elements Q1 and Q2. In this circuit, the first switching element Q1 is connected in series with the inductor L, the load LD, the smoothing capacitor C1, and the second switching element Q2 across the rectifier circuit DB. And the first switching element Q1 is connected in series with the inductor L, the load LD, and a first diode D1 across the rectifier circuit DB. A series circuit of a second diode D2, the smoothing capacitor C1, and a third diode D3 is inserted across the inductor L, and the second diode D2 and the third diode D3 define the above rectifying device which passes the current to the smoothing capacitor from the inductor.

The control circuit can improve a power-factor and can limit the current to the load, always passing the current to the load and the inductor, by using two switching elements which are controlled so that they can have a period in which both of them are turned on, a period in which either of them is turned off, and a period in which both of them are turned off. Further, the control circuit can provide a stable power for the load, because the surplus power flowing through the inductor is shunted to the smoothing capacitor through the second and third diodes D2 and D3. And, there are few idle periods of the input current, and the suppression effect on the harmonic component is high, because the first and second switching elements pass the input current from the AC source to both the inductor and the load in two patterns out of the three different patterns.

Furthermore, a power converter in accordance with other concrete circuit arrangement is designed to pass the alternating current to the load by using four switching elements Q1–Q4. Each of the first switching element Q1 and the second switching element Q2 has a bypass allowing a reverse current to flow across each switching element. In this circuit, a first diode D1, the first switching element Q1, the inductor L, and the load LD are connected in series across the AC source. And the load LD, the inductor L, the second switching element Q2, and a second diode D2 are connected in series across the AC source. The third switching element Q3 and the bypass of the second switching element Q2 are connected in series across a series circuit of the inductor L and the load LD. And, a third diode D3, a smoothing capacitor C1, and the bypass of the second switching element Q2 are connected in series across the inductor L. The bypass of the first switching element Q1 and the fourth switching element Q4 are connected in series across the series circuit of the inductor L and the load LD. The bypass of the first switching element Q1, the smoothing capacitor C1, and a fourth diode D4 are connected in series across the inductor L. And, the third diode D3 and the fourth diode D4 define the above rectifying device which passes a current from the inductor L to the smoothing capacitor.

The control circuit passes the current to the load in one direction by controlling the first and third switching elements Q1 and Q3 so that both switching elements will repeat three patterns comprising a period in which both switching elements are turned on at the same time, a period in which either of them is turned on, and a period in which both of them are turned off, while making the second and fourth switching element Q2 and Q4 turn off. And the control circuit passes the current to the load in the reverse direction by controlling the second and fourth switching element Q2 and Q4 so that both switching elements will repeat three patterns comprising a period in which both switching elements are turned on at the same time, a period in which either of them is turned on, and a period in which both of them are turned off, while making the first and third switching elements Q1 and Q3 turn off. Therefore, the control circuit can provide the alternating current of a predetermined frequency for the load by setting up the time from the on/off control action of the first and third switching elements Q1, Q3 to the on/off control action of the second and fourth switching elements Q2, Q4. So, the power conversion of AC-DC and the power conversion of DC-AC can be attained at the same time by using only four switching elements, always passing the current to the load and the inductor.

Further, the control circuit can provide a stable power to the load, because the surplus power flowing through the inductor is shunted to the smoothing capacitor through the third and fourth diodes D3 and D4.

Furthermore, a power converter in accordance with other concrete circuit arrangement is designed to pass the alternating current to the load by using four switching elements Q1–Q4. Each of the first switching element Q1 and the second switching element Q2 has a bypass allowing a reverse current to flow across each switching element. A first diode D1, the first switching element Q1, the primary winding n1 of the inductor L, and the load LD are connected in series across the AC source, and also, the load LD, the primary winding n1, the second switching element Q2, and a second diode D2 are connected in series across the AC source. The third switching element Q3 and the bypass of the second switching element Q2 are connected in series across a series circuit of the primary winding n1 and the load LD. The bypass of the first switching element Q1 and the fourth switching element Q4 are connected in series across the series circuit of the primary winding n1 and the load LD. A series circuit of a third diode D3, the smoothing capacitor C1, and a fourth diode D4 is connected across the secondary winding n2. A series circuit of a fifth diode D5, the smoothing capacitor C1, and a sixth diode D6 is also connected across the secondary winding n2. A series circuit of the first switching element Q1, the primary winding n1, the load LD, the third switching element Q3 is inserted across the smoothing capacitor C1. A series circuit of the fourth switching element Q4, the load LD, the primary winding n1, the second switching element Q2 is also inserted across the smoothing capacitor C1. The third diode D3, the fourth diode D4, the fifth diode D5, and the sixth diode D6 define the above rectifying device which passes a current from the inductor L to the smoothing capacitor.

The control circuit passes the current to the load in one direction by controlling the first and third switching elements Q1 and Q3 so that both switching elements will repeat three patterns comprising a period in which both switching elements are turned on at the same time, and periods in which either of them is turned on, while making the second and fourth switching element Q2 and Q4 turn off. And the control circuit passes the current to the load in the reverse direction by controlling the second and fourth switching elements Q2 and Q4 so that both switching elements will repeat three patterns comprising a period in which both switching elements are turned on at the same time, and periods in which either of them is turned on, while making the first and third switching elements Q1 and Q3 turn off. Therefore, the control circuit can provide the alternating current of a predetermined frequency for the load by setting up the time from the on/off control action of the first and third switching elements Q1, Q3 to the on/off control action of the second and fourth switching elements Q2, Q4. So, the power conversion of AC-DC and the power conversion of DC-AC can be attained at the same time by using only four switching elements, always passing the current to the load and the inductor.

In this case, it is possible to set the voltage of the smoothing capacitor to a desired value by selecting the turn ratio of the primary winding n1 and the secondary winding n2 appropriately, whereby, the freedom of a circuit design can be raised.

BEST MODE FOR CARRYING OUT THE INVENTION

First Embodiment

A power converter in accordance with a first embodiment of the present invention will be explained based on FIGS. 1–5. This power converter is designed to convert AC power which is supplied from an AC source into DC power and to drive a load such as a discharge lamp. This power converter includes a rectifier circuit DB which rectifies the AC current from the AC source to give a DC voltage, switching elements which comprises a first switching element Q1, a second switching element Q2, and a third switching element Q3, and a control circuit 1 which controls the switching elements to turn on and off. The first switching element Q1, the second switching element Q2, and the third switching element Q3 are connected in series with an inductor L, a load LD, a first diode D1, and a smoothing capacitor C1 across the rectifier circuit DB. A second diode D2 is connected across a series circuit of the smoothing capacitor C1 and the third switching element Q3. The second diode D2 is connected in series with a third diode D3 across a series circuit of the inductor L, the first diode D1, the load LD, and the second switching element Q2. And a fourth diode D4 is connected in series with the smoothing capacitor C1 across the second switching element Q2. And, a low pass filter is provided between the AC source and the rectifier circuit DB.

Figure 1:
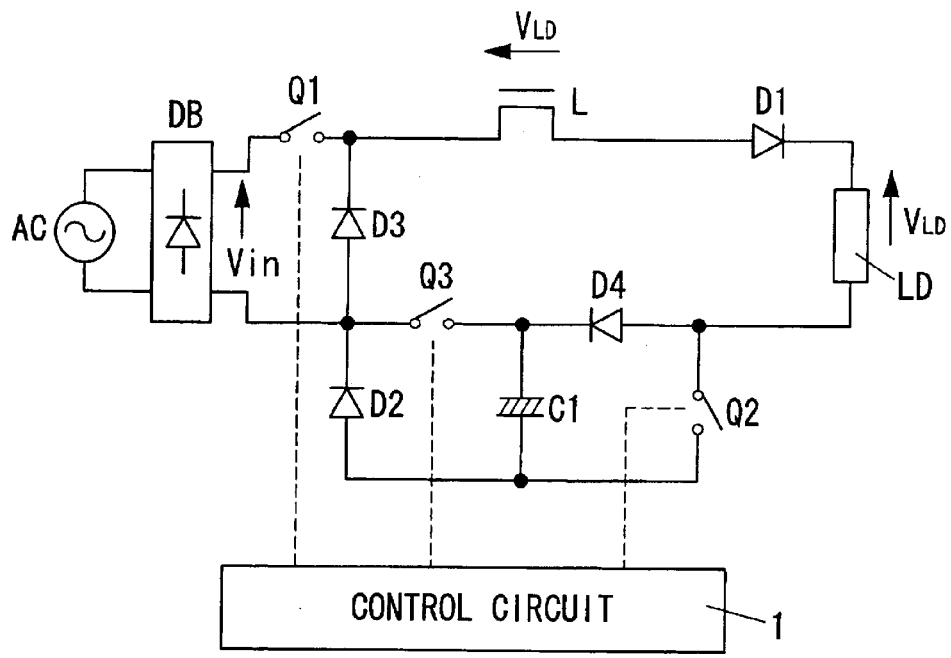
FIG. 1 is a circuit diagram of a power converter in accordance with a first embodiment of the present invention.
Figure 2:
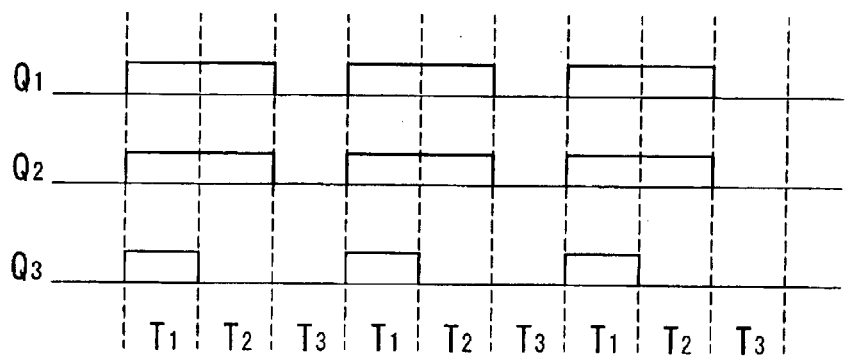
FIG. 2 is a time chart showing a control action of switching elements used in the above circuit.

The control circuit 1 can always pass the current to both the load and the inductor, improving the harmonic distortion, namely, a power-factor, by controlling the first, second, and third switching elements Q1–Q3 in three different patterns. The control circuit repeats the three different patterns two or more times in the half cycle of the AC current from the AC source, as shown in FIG. 2. In a first pattern, all the switching elements Q1–Q3 are turned on. In a second pattern, only the switching elements Q1 and Q2 are turned on. In a third pattern, all the switching elements Q1–Q3 are turned off. Each switching element is turned on and off at a frequency higher enough than the frequency of the AC source (50–60 Hz), for example, dozens—several hundred kHz.

Figure 3A:
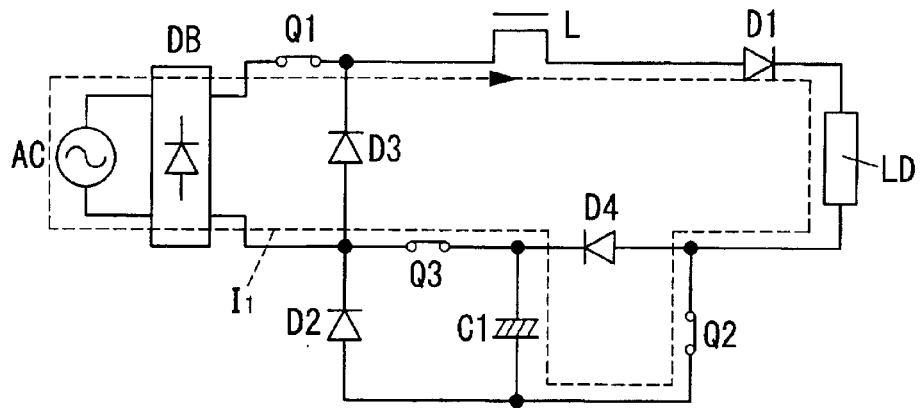
FIGS. 3A, 3B, and 3C are explanatory diagrams showing a pass of a current flowing through the above circuit when the switching elements are controlled in different on/off patterns.
Figure 3B:
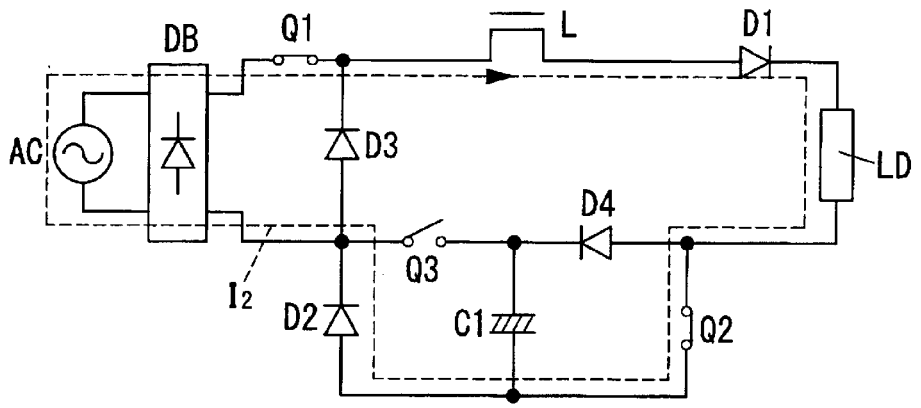
Figure 3C:
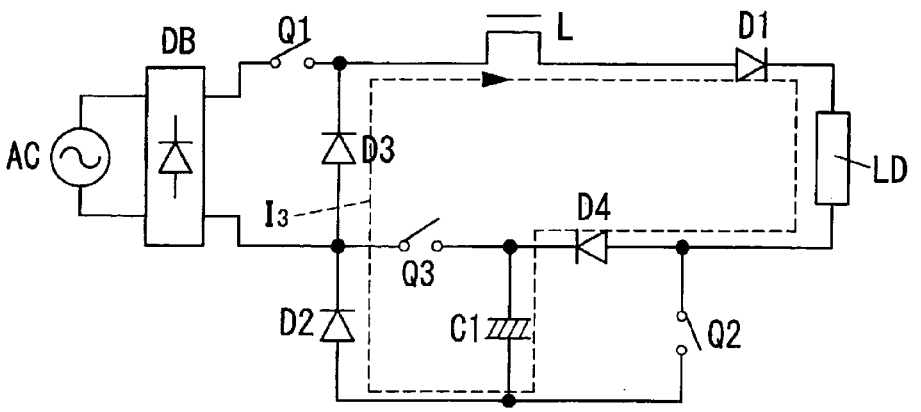
Figure 4A:
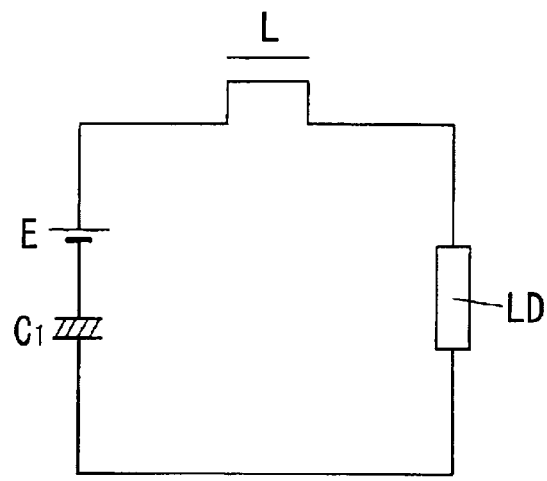
FIGS. 4A, 4B, and 4C are schematic diagrams showing an equivalent circuit corresponding to FIGS. 3A, 3B, and 3C, respectively.

FIGS. 3A–3C show a current which flows through the circuit in a first period T1 controlled based on the first pattern, in a second period T2 controlled based on the second pattern, and in a third period T3 controlled based on the third pattern, respectively. In the first period T1, as shown in FIG. 3A, a current I1 flows increasingly through a closed loop; from the AC source to the AC source via the rectifier circuit DB, the first switching element Q1, the inductor L, the first diode D1, the load LD, the second switching element Q2, the smoothing capacitor C1, the third switching element Q3, and the rectifier circuit DB. The current I1 is accompanied by a discharging current from the smoothing capacitor C1. A simplified equivalent circuit in this period is shown in FIG. 4A, which is a series circuit of the inductor L and the load LD connected across a series circuit of the charged smoothing capacitor C1 and a DC source E which outputs an input voltage Vin.

Figure 4B:
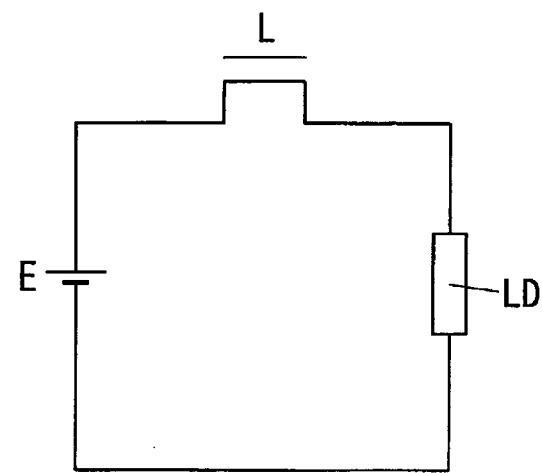

In the second period T2, as shown in FIG. 3B, a current I2 flows increasingly through a closed loop; from the AC source to the AC source via the rectifier circuit DB, the first switching element Q1, the inductor L, the first diode D1, the load LD, the second switching element Q2, the second diode D2, and the rectifier circuit DB. The current I2 flows independently of a charge and a discharge of the smoothing capacitor C1. A simplified equivalent circuit in this period is shown in FIG. 4B, which is a series circuit of the inductor L and the load LD connected across the DC source E.

Figure 4C:
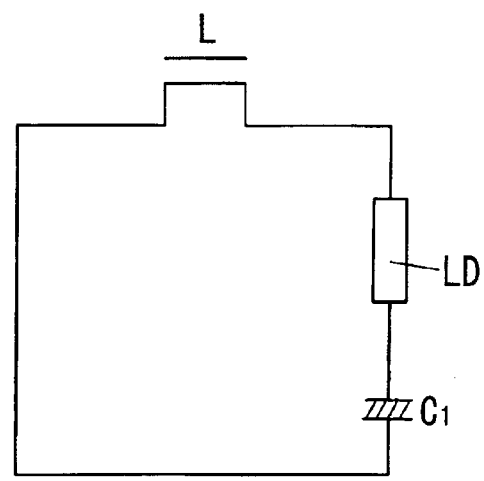

In the third period T3, as shown in FIG. 3C, a current I3 flows decreasingly by back electromotive force of the inductor L through a closed loop; from the inductor L to the inductor L via the first diode D1, the load LD, the fourth diode D4, the smoothing capacitor C1, the second diode D2, and the third diode D3. The current I3 is accompanied by a charging current to the smoothing capacitor C1. A simplified equivalent circuit in this period is shown in FIG. 4C, which is a series circuit of the inductor L, the load LD, and the smoothing capacitor C1.

In the first and second period T1 and T2, a first current supplying mode is given, in which the current flows through a loop including the AC source, the inductor L, and the load LD. In the third period T3, a second current supplying mode is given, in which the current flows through a loop including the inductor L and the load LD but excluding the AC source. The control circuit can improve a harmonic distortion (a power-factor) and limit the current to the load, always passing the current to the load and the inductor, by repeating the first current supplying mode and the second current supplying mode alternately.

Figure 5:
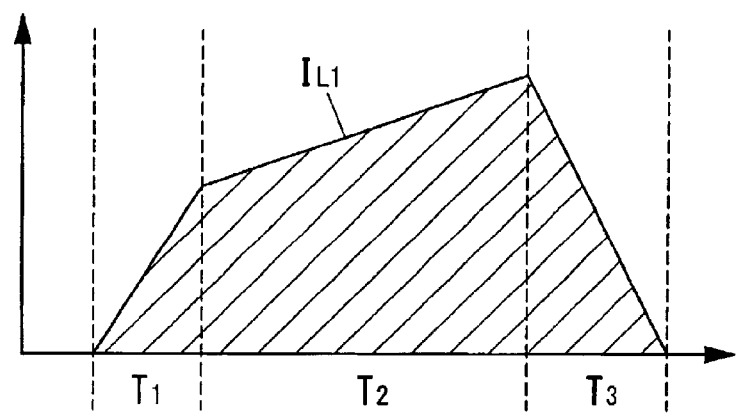
FIG. 5 is a graph showing the current flowing through the inductor in the above circuit.

As shown in FIG. 5, the inductor L sees a current IL1 of trapezoidal waveform over the periods T1 to T3. The periods in which the inductor L contributes to the input current from the AC source are the periods T1 and T2, and the periods in which the inductor L contributes to the output current to the load LD are the periods T1–T3.

If the input voltage (the output voltage of the rectifier circuit DB) is Vin, the voltage across the smoothing capacitor C1 is Vc1, and the voltage across the load LD is VLd, then a voltage VLt1 across the inductor L in the first period T1 is expressed as; VLt1=Vin+Vc1−VLd, and a voltage VLt2 across the inductor L in the second period T2 is expressed as; VLt2=Lin−VLd, and a voltage VLt3 across the inductor L in the third period T3 is expressed as; VLt3=−

VLd−Vc1. Because Vc1>Vin is always held in this circuit arrangement, VLt1>VLt2>VLt3 are always held. These voltages VLt1, VLt2, and VLt3 across the inductor L define a gradient of the inductor current IL1 in the periods T1 to T3. Thus, a gradient in the period T1>a gradient in the period T2>a gradient in the period T3, therefore, the inductor current IL1 becomes a trapezoidal waveform.

The amount of the power conversion in a desired input and output voltage is fluctuated in proportion to the average of the amount of the current flowing through the inductor L. In this embodiment, the inductor current IL which lowers the peak value can be realized by making the inductor current IL into the generally trapezoid-shape as mentioned above, whereby, the miniaturization of the inductor L can be attained. In addition, since one inductor L contributes to both improving the harmonic distortion and limiting the current, the miniaturization of the power converter can be attained.

Furthermore, in this embodiment, because a loop in which the input current from the AC source flows through the load LD directly through the inductor L is formed in the first and second periods T1 and T2, it is possible to reduce the number of the elements through which the current from the AC source to the load flows, therefore, the loss of the power conversion can be reduced, and the miniaturization of the device can be attained.

Furthermore, in this embodiment, since the output current is fed to the load through the inductor L over all the periods, that is, the inductor L always supplies the current to the load, it is possible to lower the peak value of the inductor current IL. Therefore, the loss of the power conversion at the switching elements Q1–Q3, the inductor L, and the diode D1–D4 can be reduced, and the miniaturization of the device becomes possible.

Furthermore, because a current loop including the inductor L and the load LD is always formed and a current loop including the AC source, the inductor L, and the load LD is formed in the periods T1 and T2, the length (T1, T2) in which the inductor current IL1 contributes to the input is shorter than the length (T1, T2, and T3) in which the inductor current contributes to the output to the load LD. If the loss of the circuit is ignored, the input power and the output power in the power converter are equivalent, and when the supply voltage is higher than the load voltage, the output current (a current from the AC source or the smoothing capacitor to the load) becomes larger than the input current (a current from the AC source to the load and/or the smoothing capacitor). If the magnitude relation between the input current and the output current matches the magnitude relation between the length in which the inductor current contributes to the input and the length in which the inductor current contributes to the output, it is possible to change larger current over longer length and suppress the peak current of choke current. Therefore, this power converter is suitable when the supply voltage is higher than the load voltage.

Second Embodiment

Figure 6:
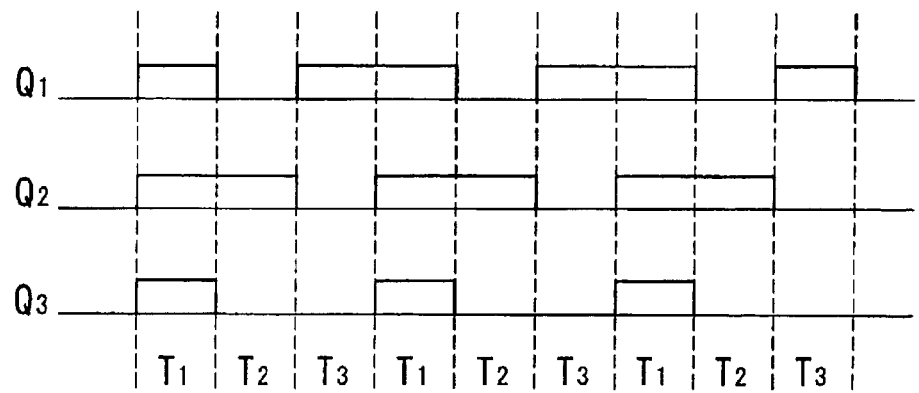
FIG. 6 is a time chart showing a control action of switching elements used in a power converter in accordance with a second embodiment of the present invention.

A power converter in accordance with a second embodiment of the present invention will be explained based on FIGS. 6–9. A circuit arrangement of the power converter is identical to the first embodiment, and a control system of the control circuit 1 is different from the first embodiment. The similar parts of these embodiments are identified by the same reference character. The control circuit 1 controls the first, second, and third switching elements Q1–Q3 in three different on/off patterns, as shown in FIG. 6. In a first pattern, all the switching elements Q1–Q3 are turned on. In a second pattern, only the second switching element Q2 is turned on. In a third pattern, only the first switching elements Q1 is turned on. Each switching element is turned on and off at a frequency higher enough than the frequency of the AC source (50–60 Hz), for example, dozens—several hundred kHz.

Figure 7A:
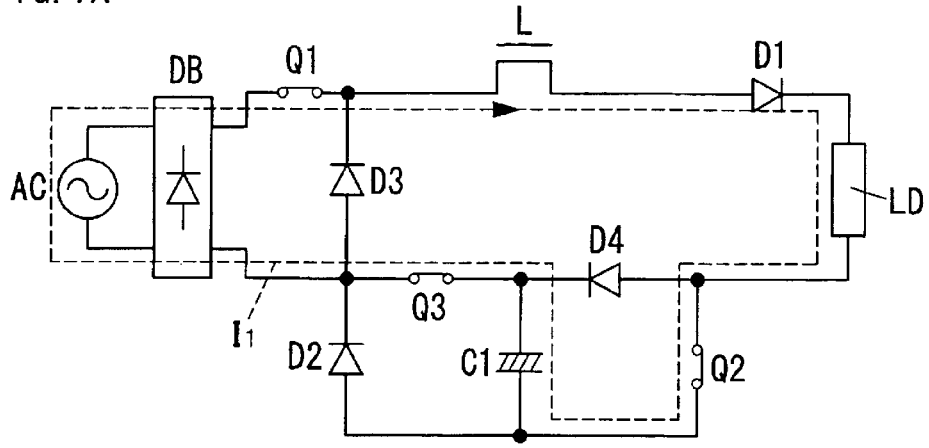
FIGS. 7A, 7B, and 7C are explanatory diagrams showing a pass of the current flowing through the above circuit when the switching elements are controlled in different on/off patterns.
Figure 7B:
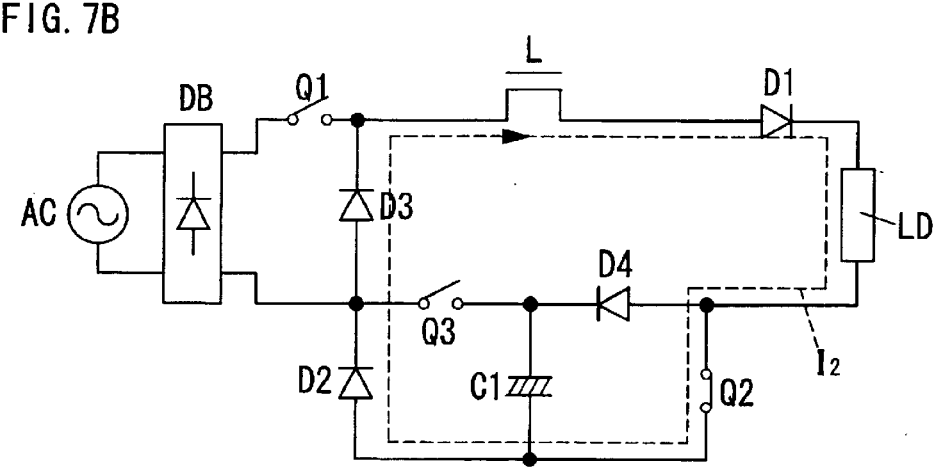
Figure 7C:
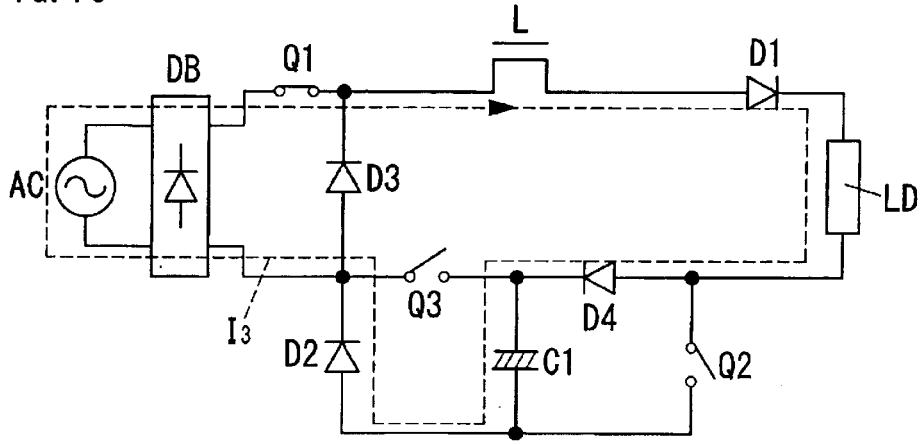
Figure 8A:
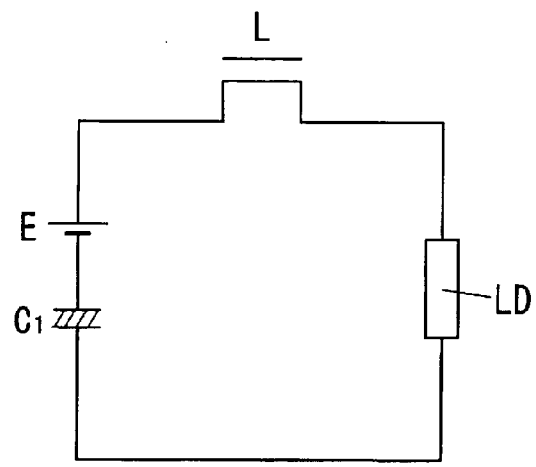
FIGS. 8A, 8B, and 8C are schematic diagrams showing an equivalent circuit corresponding to FIGS. 7A, 7B, and 7C, respectively.

FIGS. 7A–7C show a current which flows through the circuit in a first period T1 controlled based on the first pattern, in a second period T2 controlled based on the second pattern, and in a third period T3 controlled based on the third pattern, respectively. In the first period T1, as shown in FIG. 7A, a current I1 flows increasingly through a closed loop; from the AC source to the AC source via the rectifier circuit DB, the first switching element Q1, the inductor L, the first diode D1, the load LD, the second switching element Q2, the smoothing capacitor C1, the third switching element Q3, and the rectifier circuit DB. The current I1 is accompanied by a discharging current from the smoothing capacitor C1. A simplified equivalent circuit in the first period is shown in FIG. 8A, which is a series circuit of the inductor L and the load LD connected across a series circuit of the charged smoothing capacitor C1 and a DC source E which outputs an input voltage Vin.

Figure 8B:
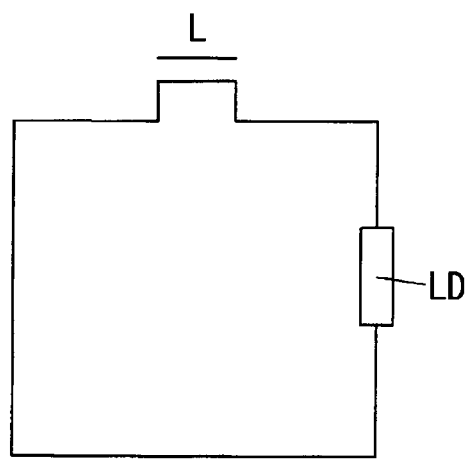

In the second period T2, as shown in FIG. 7B, a current I2 flows decreasingly by back electromotive force of the inductor L through a closed loop; from the inductor L to the inductor L via the first diode D1, the load LD, the second switching element Q2, the second diode D2, and the third diode D3. The current I2 flows independently of a charge and a discharge of the smoothing capacitor C1. A simplified equivalent circuit in this period is shown in FIG. 8B, which is a series circuit of the inductor L and the load LD.

Figure 8C:
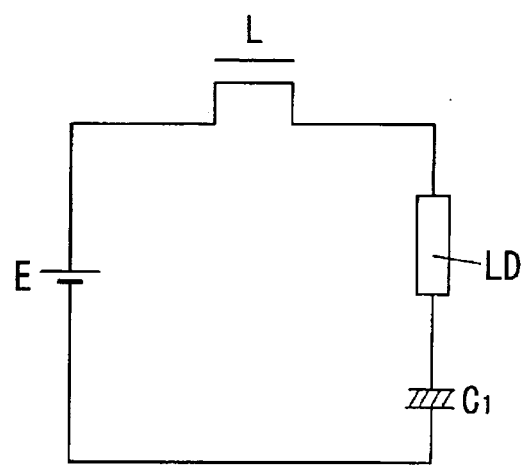

In the third period T3, as shown in FIG. 7C, a current I3 flows decreasingly through a closed loop; from the AC source to the AC source via the rectifier circuit DB, the first switching element Q1, the inductor L, the first diode D1, the load LD, the fourth diode D4, the smoothing capacitor C1, the second diode D2, and the rectifier circuit DB. The current I3 is accompanied by a charging current to the smoothing capacitor C1. A simplified equivalent circuit in this period is shown in FIG. 8C, which is a series circuit of the inductor L, the load LD, and the smoothing capacitor C1 connected across the DC source E.

In the first and third period T1 and T3, a first current supplying mode is given, in which the current flows through a closed loop including the AC source, the inductor L, and the load LD. In the second period T2, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

Figure 9:
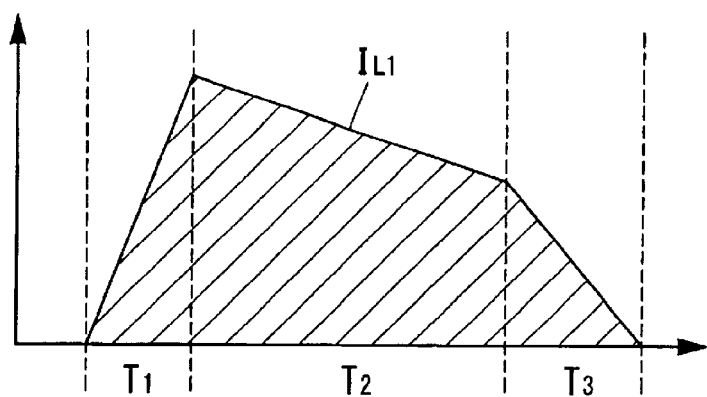
FIG. 9 is a graph showing the current flowing through the inductor in the above circuit.

As shown in FIG. 9, the inductor L sees a current IL1 of trapezoidal waveform over the periods T1 to T3. The periods in which the inductor L contributes to the input current from the AC source are the periods T1 and T2, and the periods in which the inductor L contributes to the output current to the load LD are the periods T1–T3.

If the output voltage of the rectifier circuit DB is Vin, the voltage across the smoothing capacitor C1 is Vc1, and the voltage across the load LD is VLd, then a voltage VLt1 across the inductor L in the first period T1 is expressed as; VLt1=Vin+Vc1−VLd, and a voltage VLt2 across the inductor L in the second period T2 is expressed as; VLt2=−VLd, and a voltage VLt3 across the inductor L in the third period T3 is expressed as; VLt3=Vin−Vc1−VLd. Because Vc1>Vin is always held in this circuit arrangement, VLt1>VLt2>VLt3 are always held. These voltages VLt1, VLt2, and VLt3 across the inductor L define a gradient of the inductor current IL1 in the periods T1–T3. Thus, a gradient in the period T1>a gradient in the period T2>a gradient in the period T3, therefore, the inductor current IL1 becomes a trapezoidal waveform.

Third Embodiment

Figure 10:
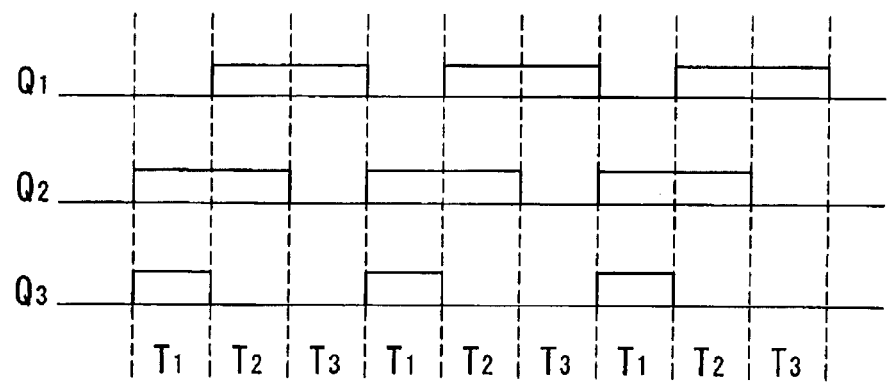
FIG. 10 is a time chart showing a control action of switching elements used in a power converter in accordance with a third embodiment of the present invention.

A power converter in accordance with a third embodiment of the present invention will be explained based on FIGS. 10–13. A circuit arrangement of the power converter is identical to the first embodiment, and a control system of the control circuit 1 is different from the first embodiment. The similar parts of these embodiments are identified by the same reference character. The control circuit 1 controls the first, second, and third switching elements Q1–Q3 in three different on/off patterns, as shown in FIG. 10. In a first pattern, the second and third switching elements Q2 and Q3 are turned on. In a second pattern, the first and second switching elements Q1 and Q2 are turned on. In a third pattern, only the first switching element Q1 is turned on. Each switching element is turned on and off at a frequency higher enough than the frequency of the AC source (50–60 Hz), for example, dozens—several hundred kHz.

Figure 11A:
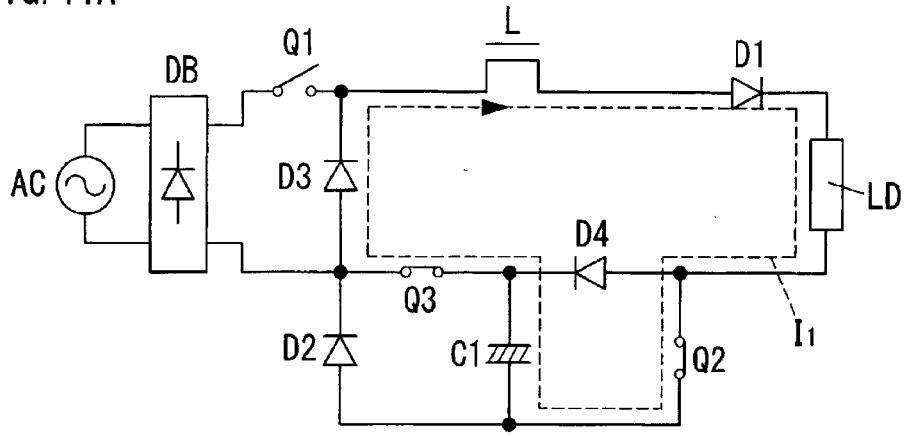
FIGS. 11A, 11B, and 11C are explanatory diagrams showing a pass of the current flowing through the above circuit when the switching elements are controlled in different on/off patterns.
Figure 11B:
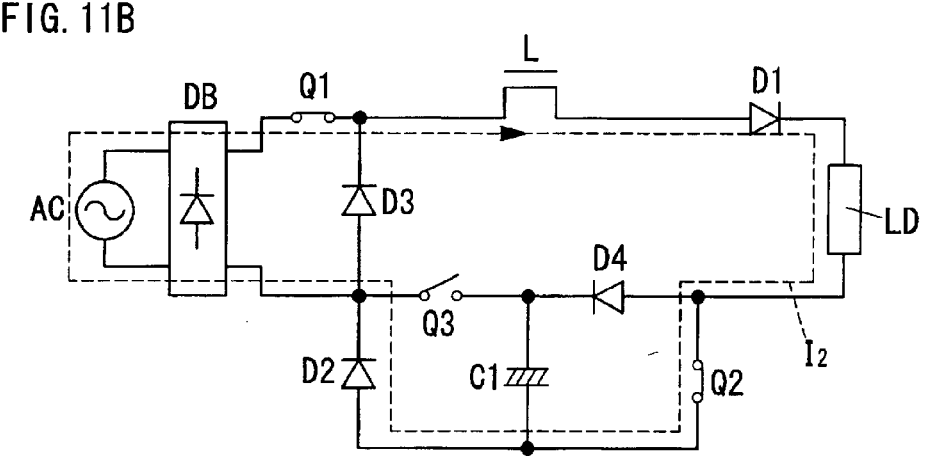
Figure 11C:
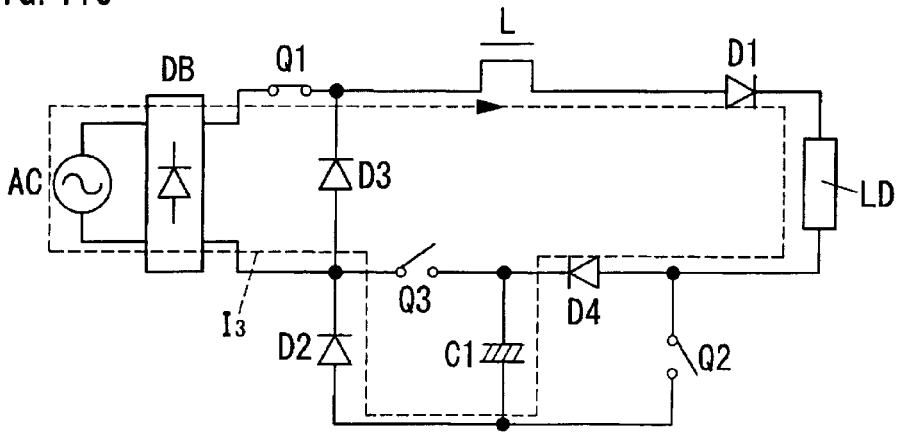
Figure 12A:
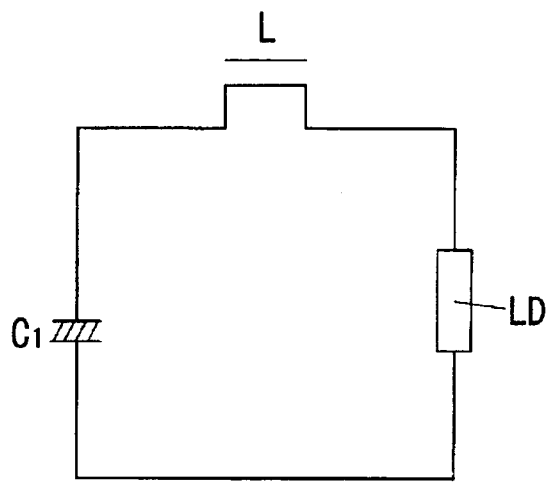
FIGS. 12A, 12B, and 12C are schematic diagrams showing an equivalent circuit corresponding to FIGS. 11A, 11B, and 11C, respectively.

FIGS. 11A–11C show a current which flows through the circuit in a first period T1 controlled based on the first pattern, in a second period T2 controlled based on the second pattern, and in a third period T3 controlled based on the third pattern, respectively. In the first period T1, as shown in FIG. 11A, a current I1 flows increasingly through a closed loop; from the smoothing capacitor C1 to the smoothing capacitor C1 via the third switching element Q3, the third diode D3, the inductor L, the first diode D1, the load LD, and the second switching element Q2. The current I1 is accompanied by a discharging current from the smoothing capacitor C1. A simplified equivalent circuit in the first period is shown in FIG. 12A, which is a series circuit of the inductor L and the load LD connected across the charged smoothing capacitor C1.

Figure 12B:
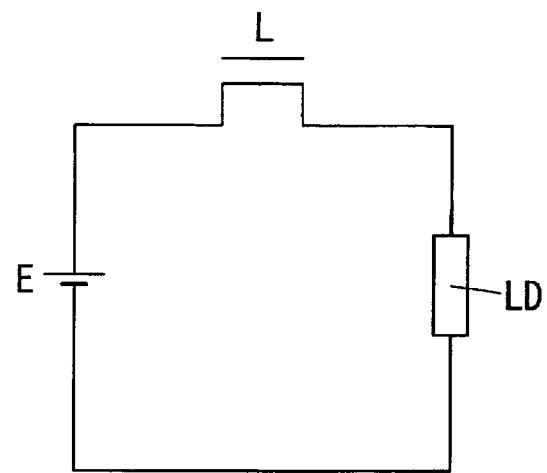

In the second period T2, as shown in FIG. 11B, a current I2 flows increasingly through a closed loop; from the AC source to the AC source via the rectifier circuit DB, the first switching element Q1, the inductor L, the first diode D1, the load LD, the second switching element Q2, the second diode D2, and the rectifier circuit DB. The current I2 flows independently of a charge and a discharge of the smoothing capacitor C1. A simplified equivalent circuit in this period is shown in FIG. 12B, which is a series circuit of the inductor L and the load LD connected across the DC source E which outputs an input voltage Vin.

Figure 12C:
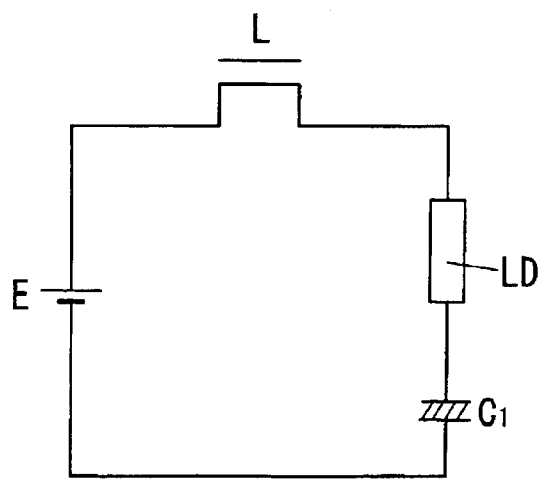

In the third period T3, as shown in FIG. 11C, a current I3 flows decreasingly through a closed loop; from the AC source to the AC source via the rectifier circuit DB, the first switching element Q1, the inductor L, the first diode D1, the load LD, the fourth diode D4, the smoothing capacitor C1, the second diode D2, and the rectifier circuit DB. The current I3 is accompanied by a charging current to the smoothing capacitor C1. A simplified equivalent circuit in this period is shown in FIG. 12C, which is a series circuit of the inductor L, the load LD, and the smoothing capacitor C1 connected across the DC source E.

In the second and third period T2 and T3, a first current supplying mode is given, in which the current flows through a closed loop including the AC source, the inductor L, and the load LD. In the first period T1, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

Figure 13:
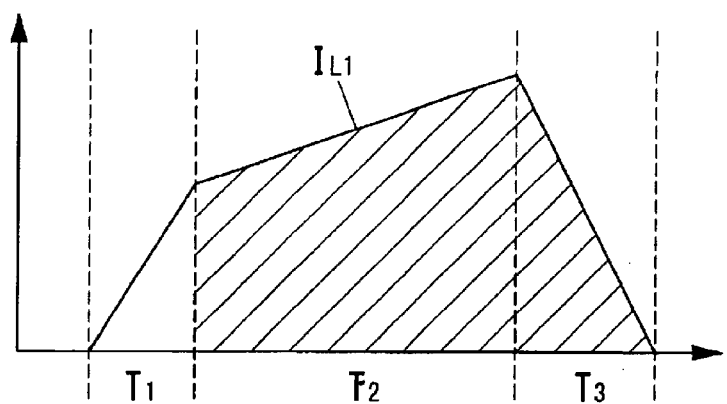
FIG. 13 is a graph showing the current flowing through the inductor in the above circuit.

As shown in FIG. 13, the inductor L sees a current IL1 of trapezoidal waveform over the periods T1 to T3. The periods in which the inductor L contributes to the input current from the AC source are the periods T2 and T3, and the periods in which the inductor L contributes to the output current to the load LD are the periods T1–T3.

If the output voltage of the rectifier circuit DB is Vin, the voltage across the smoothing capacitor C1 is Vc1, and the voltage across the load LD is VLd, then a voltage VLt1 across the inductor L in the first period T1 is expressed as; VLt1=Vc1−VLd, and a voltage VLt2 across the inductor L in the second period T2 is expressed as; VLt2=Vin−VLd, and a voltage VLt3 across the inductor L in the third period T3 is expressed as; VLt3=Vin−Vc1−VLd. Because Vc1>Vin is always held in this circuit arrangement, VLt1>VLt2>VLt3 are always held. These voltages VLt1, VLt2, and VLt3 across the inductor L define a gradient of the inductor current IL1 in the periods T1–T3. Thus, a gradient in the period T1>a gradient in the period T2>a gradient in the period T3, therefore, the inductor current IL1 becomes a trapezoidal waveform.

Fourth Embodiment

Figure 14:
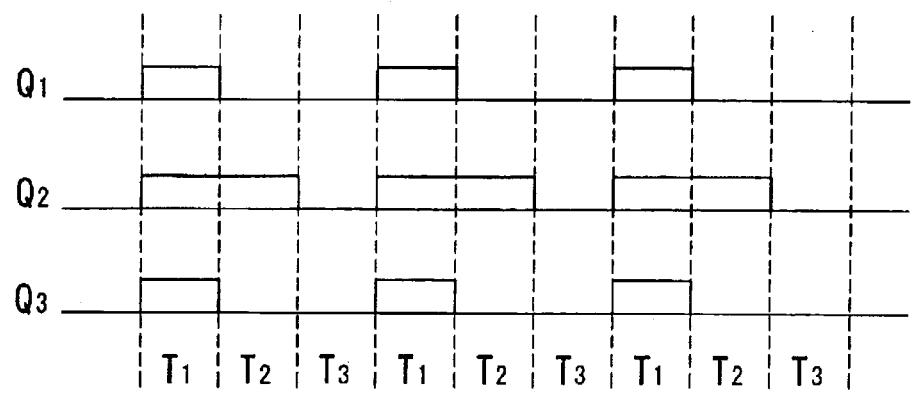
FIG. 14 is a time chart showing a control action of switching elements used in a power converter in accordance with a fourth embodiment of the present invention.

A power converter in accordance with a fourth embodiment of the present invention will be explained based on FIGS. 14–17. A circuit arrangement of the power converter is identical to the first embodiment, and a control system of the control circuit 1 is different from the first embodiment. The similar parts of these embodiments are identified by the same reference character. The control circuit 1 controls the first, second, and third switching elements Q1–Q3 in three different on/off patterns, as shown in FIG. 14. In a first pattern, all the switching elements Q1–Q3 are turned on. In a second pattern, only the second switching element Q2 is turned on. In a third pattern, all the switching elements Q1–Q3 are turned off. Each switching element is turned on and off at a frequency higher enough than the frequency of the AC source (50–60 Hz), for example, dozens—several hundred kHz.

Figure 15A:
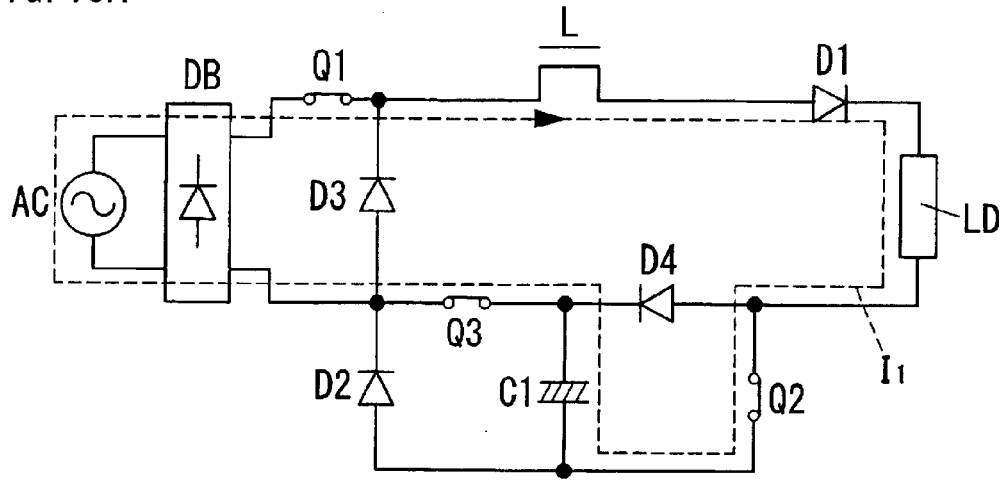
FIGS. 15A, 15B, and 15C are explanatory diagrams showing a pass of the current flowing through the above circuit when the switching elements are controlled in different on/off patterns.
Figure 15B:
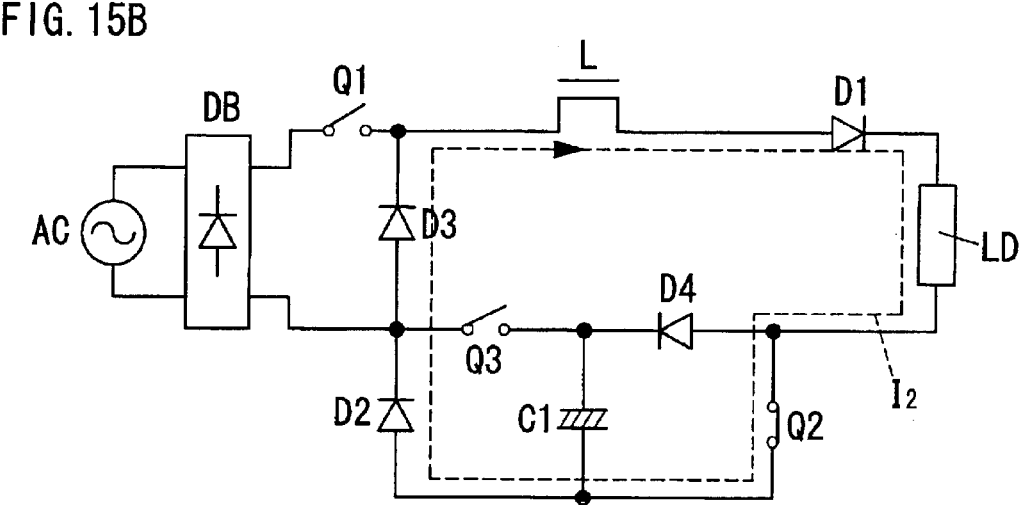
Figure 15C:
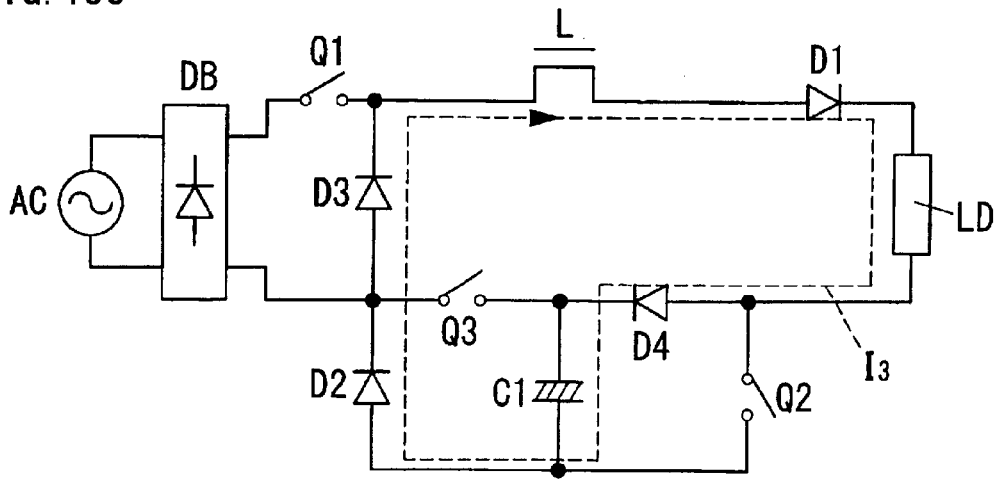
Figure 16A:
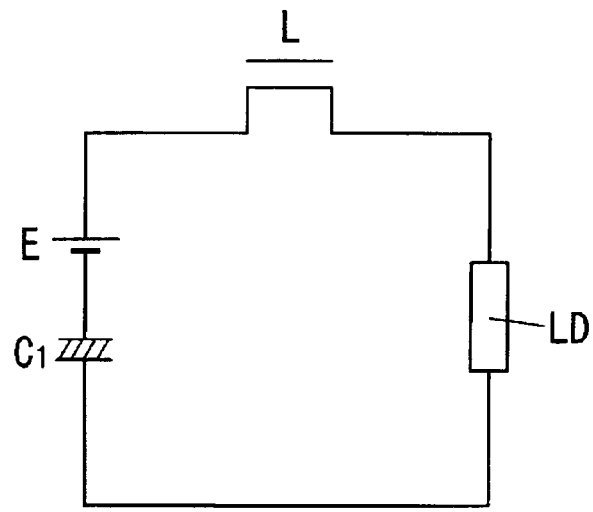
FIGS. 16A, 16B, and 16C are schematic diagrams showing an equivalent circuit corresponding to FIGS. 15A, 15B, and 15C, respectively.

FIGS. 15A–15C show a current which flows through the circuit in a first period T1 controlled based on the first pattern, in a second period T2 controlled based on the second pattern, and in a third period T3 controlled based on the third pattern, respectively. In the first period T1, as shown in FIG. 15A, a current I1 flows increasingly through a closed loop; from the AC source to the AC source via the rectifier circuit DB, the first switching element Q1, the inductor L, the first diode D1, the load LD, the second switching element Q2, the smoothing capacitor C1, the third switching element Q3, and the rectifier circuit DB. The current I1 is accompanied by a discharging current from the smoothing capacitor C1. A simplified equivalent circuit in the first period is shown in FIG. 16A, which is a series circuit of the inductor L and the load LD connected across a series circuit of the charged smoothing capacitor C1 and a DC source E which outputs an input voltage Vin.

Figure 16B:
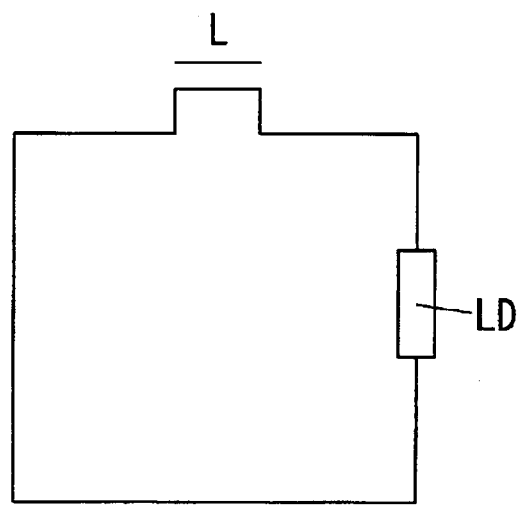

In the second period T2, as shown in FIG. 15B, a current I2 flows decreasingly by back electromotive force of the inductor L through a closed loop; from the inductor L to the inductor L via the first diode D1, the load LD, the second switching element Q2, the second diode D2, and the third diode D3. The current I2 flows independently of a charge and a discharge of the smoothing capacitor C1. A simplified equivalent circuit in this period is shown in FIG. 16B, which is a series circuit of the inductor L and the load LD.

Figure 16C:
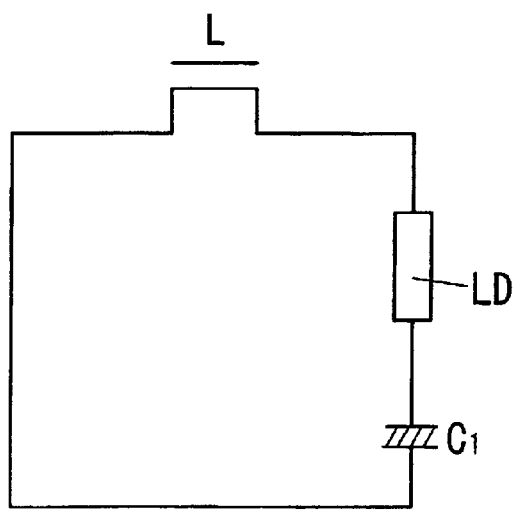

In the third period T3, as shown in FIG. 15C, a current I3 flows decreasingly by back electromotive force of the inductor L through a closed loop; from the inductor L to the inductor L via the first diode D1, the load LD, the fourth diode D4, the smoothing capacitor C1, the second diode D2, the third diode D3. The current I3 is accompanied by a charging current to the smoothing capacitor C1. A simplified equivalent circuit in this period is shown in FIG. 16C, which is a series circuit of the inductor L, the load LD, and the smoothing capacitor C1.

In the first period T1, a first current supplying mode is given, in which the current flows through a closed loop including the AC source, the inductor L, and the load LD. In the second and third periods T2 and T3, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

Figure 17:
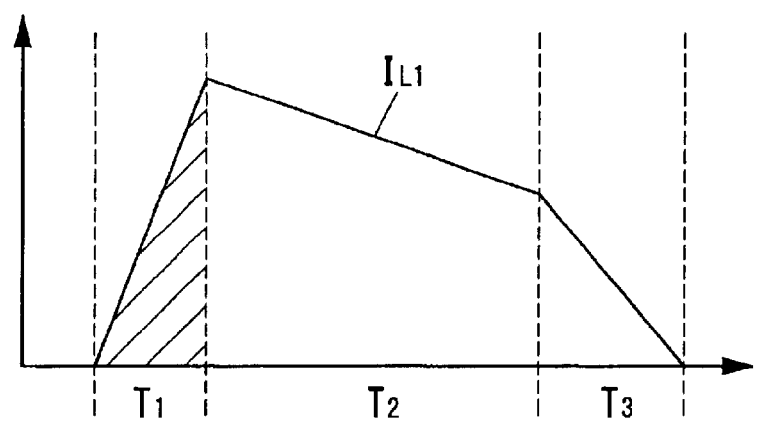
FIG. 17 is a graph showing the current flowing through the inductor in the above circuit.

As shown in FIG. 17, the inductor L sees a current IL1 of trapezoidal waveform over the periods T1 to T3. The period in which the inductor L contributes to the input current from the AC source is only the periods T1, and the periods in which the inductor L contributes to the output current to the load LD are the periods T1–T3.

If the output voltage of the rectifier circuit DB is Vin, the voltage across the smoothing capacitor C1 is Vc1, and the voltage across the load LD is VLd, then a voltage VLt1 across the inductor L in the first period T1 is expressed as; VLt1=Vin+Vc1−VLd, and a voltage VLt2 across the inductor L in the second period T2 is expressed as; VLt2=−VLd, and a voltage VLt3 across the inductor L in the third period T3 is expressed as; VLt3=−Vc1−VLd. Because Vc1>Vin is always held in this circuit arrangement, VLt1>VLt2>VLt3 are always held. These voltages VLt1, VLt2, and VLt3 across the inductor L define a gradient of the inductor current IL1 in the periods T1–T3. Thus, a gradient in the period T1>a gradient in the period T2>a gradient in the period T3, therefore, the inductor current IL1 becomes a trapezoidal waveform.

Fifth Embodiment

Figure 18:
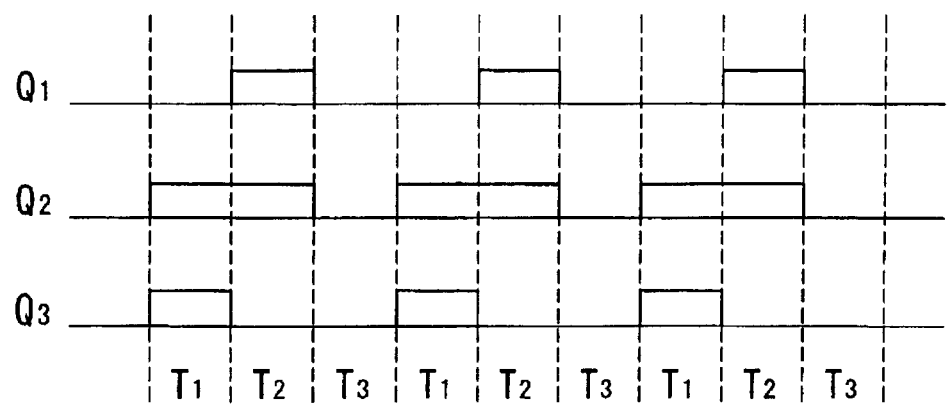
FIG. 18 is a time chart showing a control action of switching elements used in a power converter in accordance with a fifth embodiment of the present invention.

A power converter in accordance with a fifth embodiment of the present invention will be explained based on FIGS. 18–21. A circuit arrangement of the power converter is identical to the first embodiment, and a control system of the control circuit 1 is different from the first embodiment. The similar parts of these embodiments are identified by the same reference character. The control circuit 1 controls the first, second, and third switching elements Q1–Q3 in three different on/off patterns, as shown in FIG. 18. In a first pattern, the second and third switching elements Q2 and Q3 are turned on. In a second pattern, the first and second switching elements Q1 and Q2 are turned on. In a third pattern, all the switching elements Q1–Q3 are turned off. Each switching element is turned on and off at a frequency higher enough than the frequency of the AC source (50–60 Hz), for example, dozens—several hundred kHz.

Figure 19A:
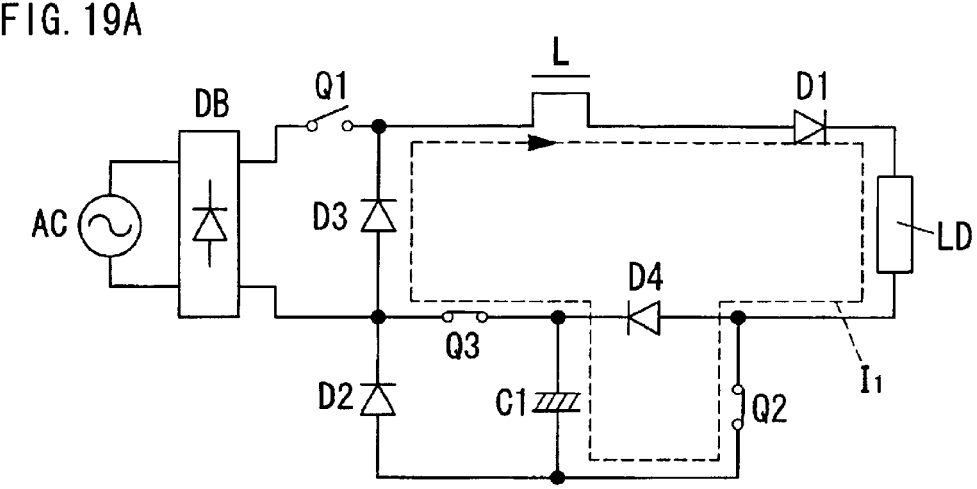
FIGS. 19A, 19B, and 19C are explanatory diagrams showing a pass of the current flowing through the above circuit when the switching elements are controlled in different on/off patterns.
Figure 19B:
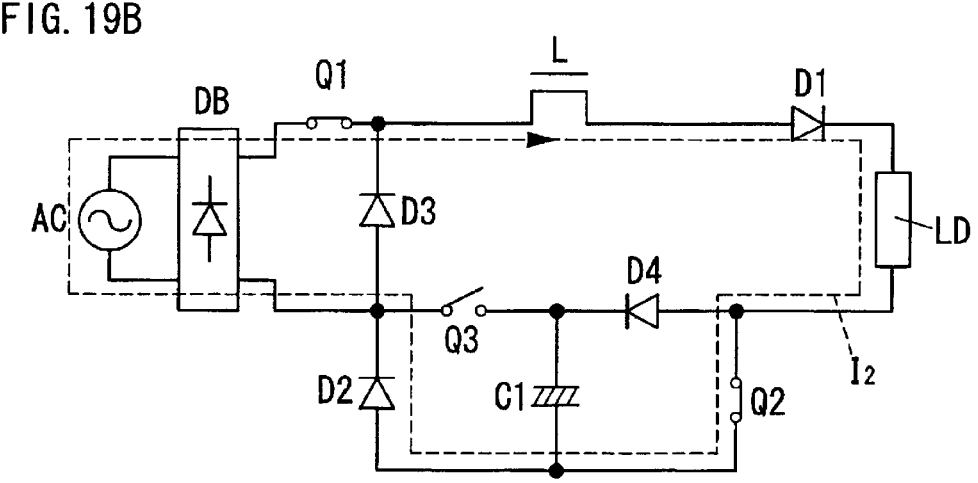
Figure 19C:
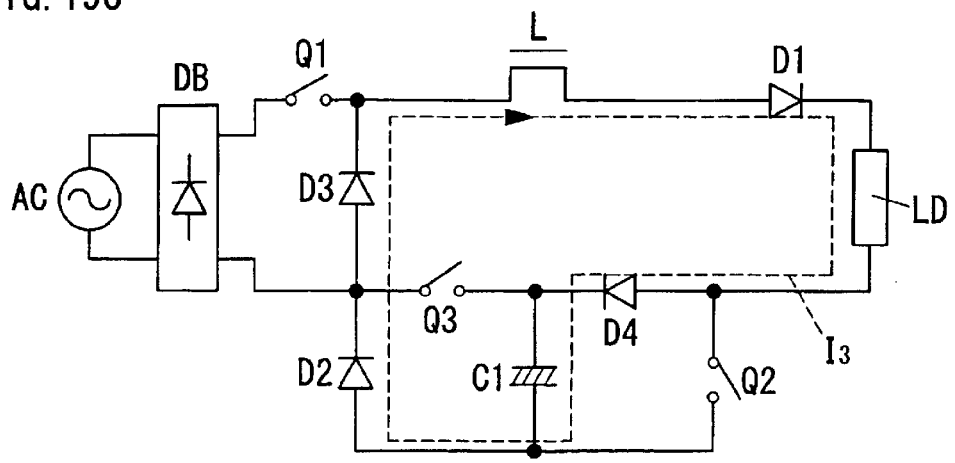
Figure 20A:
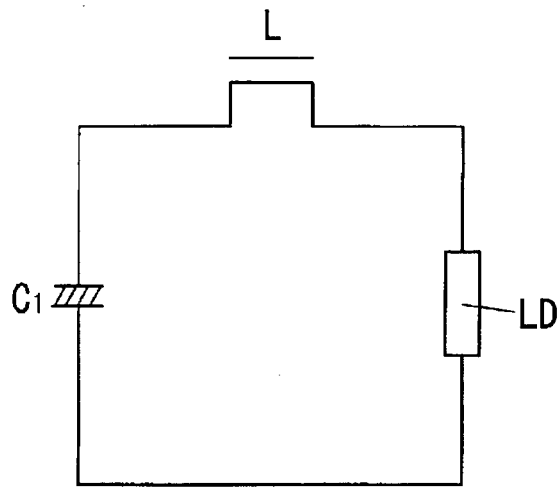
FIGS. 20A, 20B, and 20C are schematic diagrams showing an equivalent circuit corresponding to FIGS. 19A, 19B, and 19C, respectively.

FIGS. 19A–19C show a current which flows through the circuit in a first period T1 controlled based on the first pattern, in a second period T2 controlled based on the second pattern, and in a third period T3 controlled based on the third pattern, respectively. In the first period T1, as shown in FIG. 19A, a current I1 flows increasingly through a closed loop; from the smoothing capacitor C1 to the smoothing capacitor C1 via the third switching element Q3, the third diode D3, the inductor L, the first diode D1, the load LD, the second switching element Q2. The current I1 is accompanied by a discharging current from the smoothing capacitor C1. A simplified equivalent circuit in the first period is shown in FIG. 20A, which is a series circuit of the inductor L and the load LD connected across the charged smoothing capacitor C1.

Figure 20B:
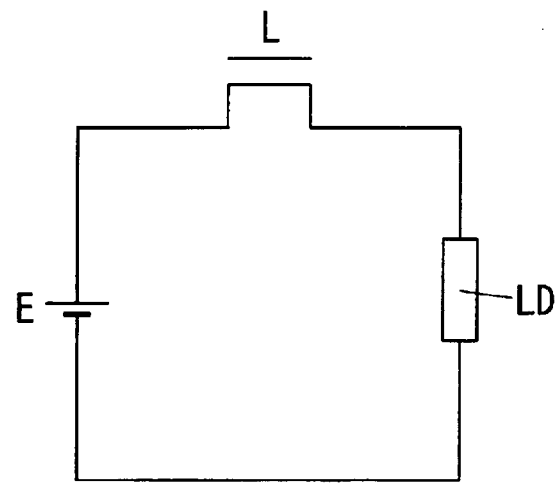

In the second period T2, as shown in FIG. 19B, a current I2 flows increasingly through a closed loop; from the AC source to the AC source via the rectifier circuit DB, the first switching element Q1, the inductor L, the first diode D1, the load LD, the second switching element Q2, the second diode D2, and the rectifier circuit DB. The current I2 flows independently of a charge and a discharge of the smoothing capacitor C1. A simplified equivalent circuit in this period is shown in FIG. 20B, which is a series circuit of the inductor L and the load LD connected across the DC source E which outputs an input voltage Vin.

Figure 20C:
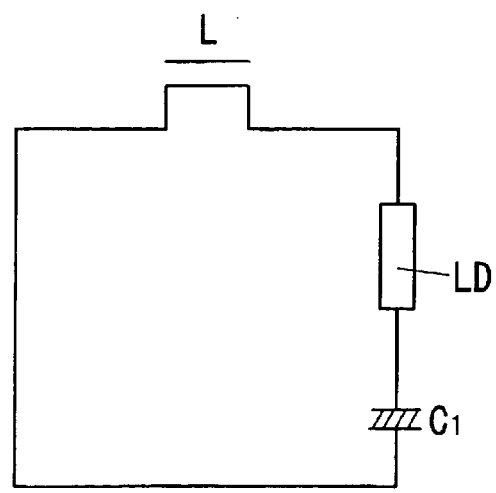

In the third period T3, as shown in FIG. 19C, a current I3 flows decreasingly by back electromotive force of the inductor L through a closed loop; from the inductor L to the inductor L via the first diode D1, the load LD, the fourth diode D4, the smoothing capacitor C1, the second diode D2, the third diode D3. The current I3 is accompanied by a charging current to the smoothing capacitor C1. A simplified equivalent circuit in this period is shown in FIG. 20C, which is a series circuit of the inductor L, the load LD, and the smoothing capacitor C1.

In the second period T2, a first current supplying mode is given, in which the current flows through a closed loop including the AC source, the inductor L, and the load LD. In the first and third periods T1 and T3, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

Figure 21:
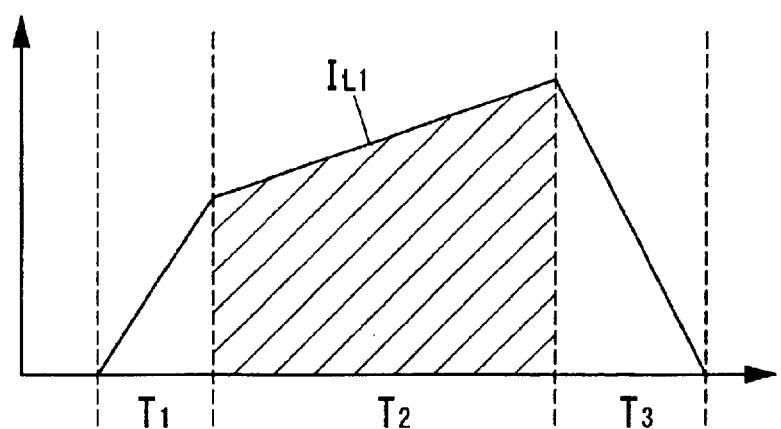
FIG. 21 is a graph showing the current flowing through the inductor in the above circuit.

As shown in FIG. 21, the inductor L sees a current IL1 of trapezoidal waveform over the periods T1 to T3. The period in which the inductor L contributes to the input current from the AC source is only the periods T2, and the periods in which the inductor L contributes to the output current to the load LD are the periods T1–T3.

If the output voltage of the rectifier circuit DB is Vin, the voltage across the smoothing capacitor C1 is Vc1, and the voltage across the load LD is VLd, then a voltage VLt1 across the inductor L in the first period T1 is expressed as; VLt1=Vc1−VLd, and a voltage VLt2 across the inductor L in the second period T2 is expressed as; VLt2=Vin−VLd, and a voltage VLt3 across the inductor L in the third period T3 is expressed as; VLt3=−Vc1−VLd. Because Vc1>Vin is always held in this circuit arrangement, VLt1>VLt2>VLt3 are always held. These voltages VLt1, VLt2, and VLt3 across the inductor L define a gradient of the inductor current IL1 in the periods T1–T3. Thus, a gradient in the period T1>a gradient in the period T2>a gradient in the

Sixth Embodiment

Figure 22:
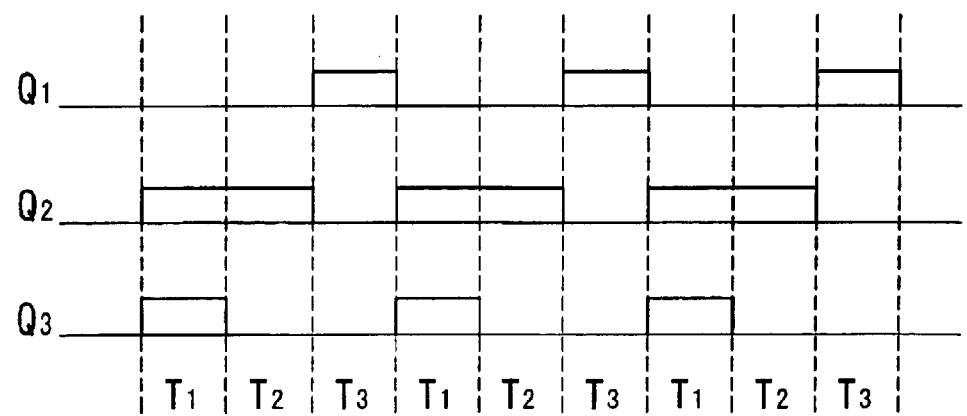
FIG. 22 is a time chart showing a control action of switching elements used in a power converter in accordance with a sixth embodiment of the present invention.

A power converter in accordance with a sixth embodiment of the present invention will be explained based on FIGS. 22–25. A circuit arrangement of the power converter is identical to the first embodiment, and a control system of the control circuit 1 is different from the first embodiment. The similar parts of these embodiments are identified by the same reference character. The control circuit 1 controls the first, second, and third switching elements Q1–Q3 in three different on/off patterns, as shown in FIG. 22. In a first pattern, the second and third switching elements Q2 and Q3 are turned on. In a second pattern, only the second switching element Q2 is turned on. In a third pattern, only the first switching element Q1 is turned on. Each switching element is turned on and off at a frequency higher enough than the frequency of the AC source (50–60 Hz), for example, dozens—several hundred kHz.

Figure 23A:
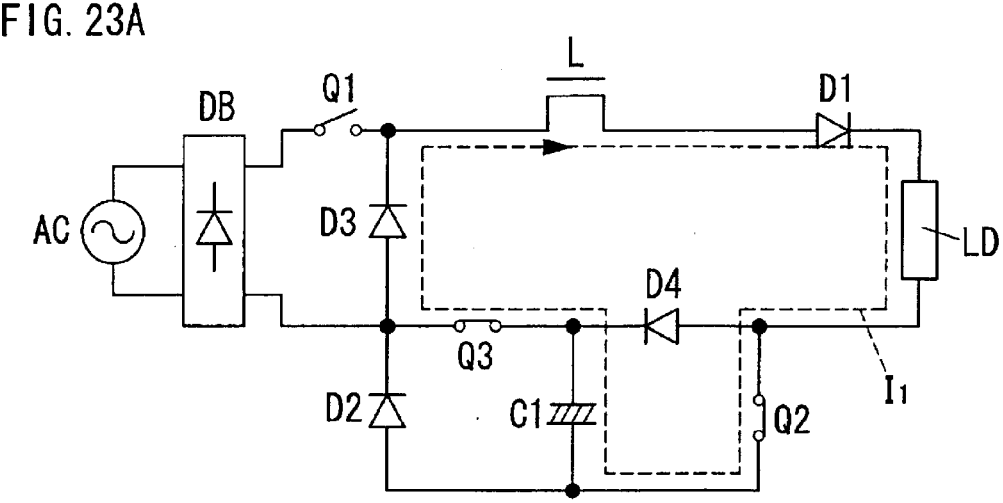
FIGS. 23A, 23B, and 23C are explanatory diagrams showing a pass of the current flowing through the above circuit when the switching elements are controlled in different on/off patterns.
Figure 23B:
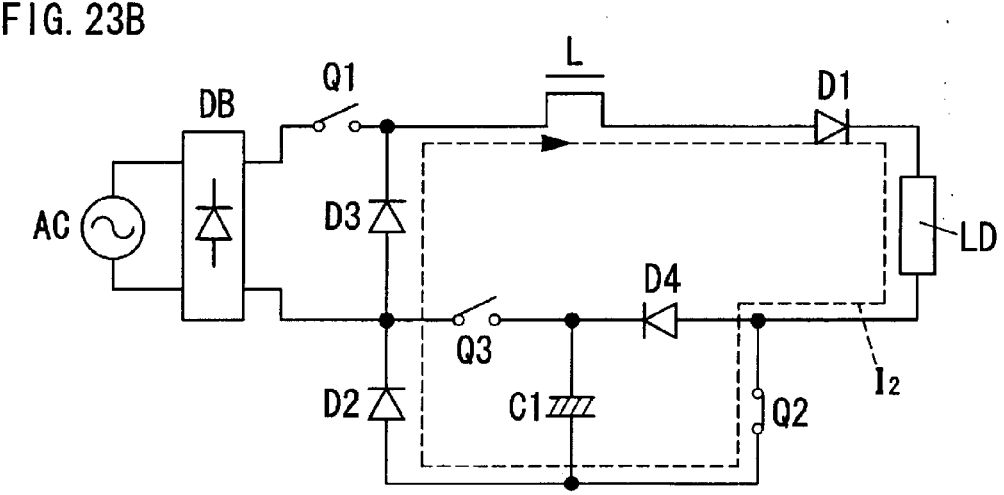
Figure 23C:
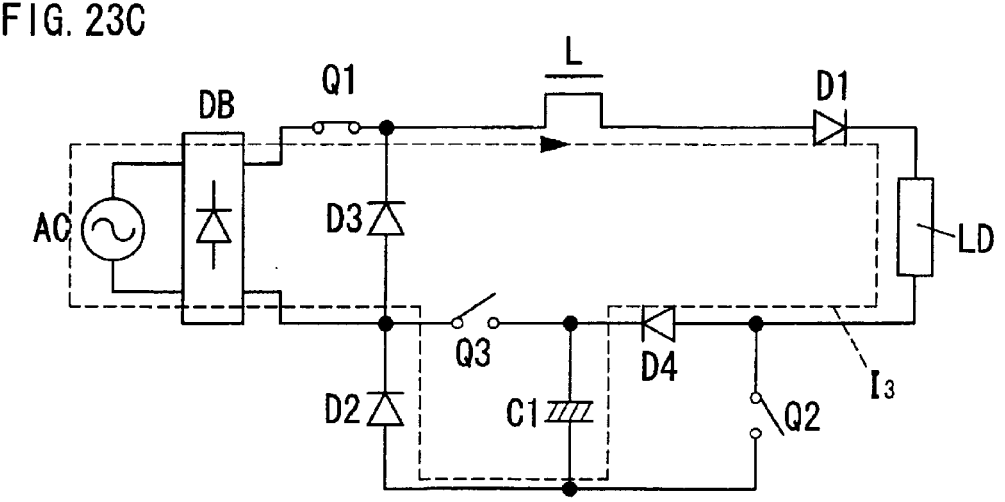
Figure 24A:
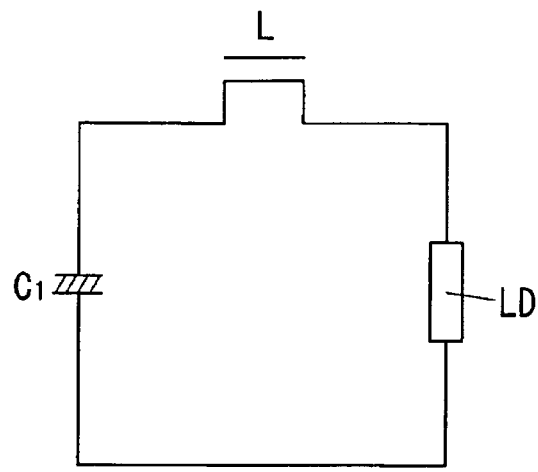
FIGS. 24A, 24B, and 24C are schematic diagrams showing an equivalent circuit corresponding to FIGS. 23A, 23B, and 23C, respectively.

FIGS. 23A–23C show a current which flows through the circuit in a first period T1 controlled based on the first pattern, in a second period T2 controlled based on the second pattern, and in a third period T3 controlled based on the third pattern, respectively. In the first period T1, as shown in FIG. 23A, a current I1 flows increasingly through a closed loop; from the smoothing capacitor C1 to the smoothing capacitor C1 via the third switching element Q3, the third diode D3, the inductor L, the first diode D1, the load LD, the second switching element Q2. The current I1 is accompanied by a discharging current from the smoothing capacitor C1. A simplified equivalent circuit in the first period is shown in FIG. 24A, which is a series circuit of the inductor L and the load LD connected across the charged smoothing capacitor C1.

Figure 24B:
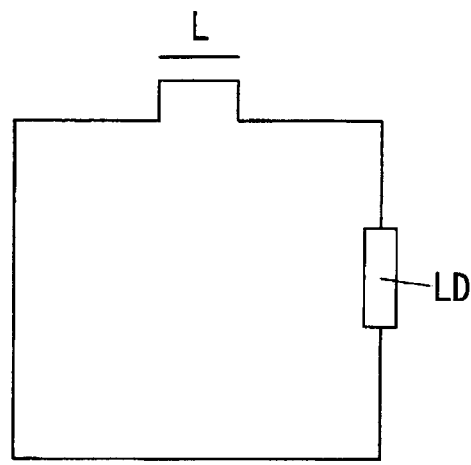

In the second period T2, as shown in FIG. 23B, a current I2 flows decreasingly by back electromotive force of the inductor L through a closed loop; from the inductor L to the inductor L via the first diode D1, the load LD, the second switching element Q2, the second diode D2, the third diode D3. The current I2 flows independently of a charge and a discharge of the smoothing capacitor C1. A simplified equivalent circuit in this period is shown in FIG. 24B, which is a series circuit of the inductor L and the load LD.

Figure 24C:
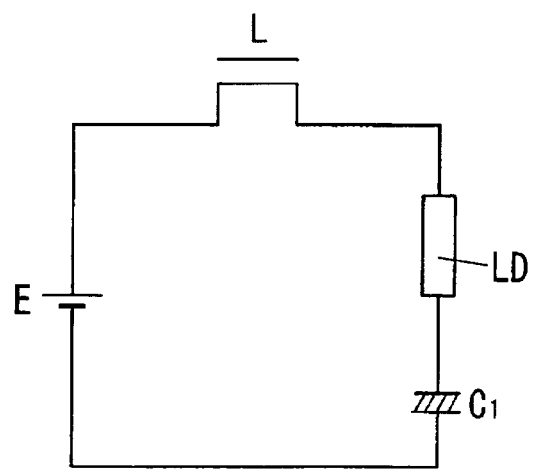

In the third period T3, as shown in FIG. 23C, a current I3 flows decreasingly through a closed loop; from the AC source to the AC source via the rectifier circuit DB, the first switching element Q1, the inductor L, the first diode D1, the load LD, the fourth diode D4, the smoothing capacitor C1, the second diode D2, and the rectifier circuit DB. The current I3 is accompanied by a charging current to the smoothing capacitor C1. A simplified equivalent circuit in this period is shown in FIG. 24C, which is a series circuit of the inductor L, the load LD, and the smoothing capacitor C1 connected across the DC source E.

In the third period T3, a first current supplying mode is given, in which the current flows through a closed loop including the AC source, the inductor L, and the load LD. In the first and second periods T1 and T2, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

Figure 25:
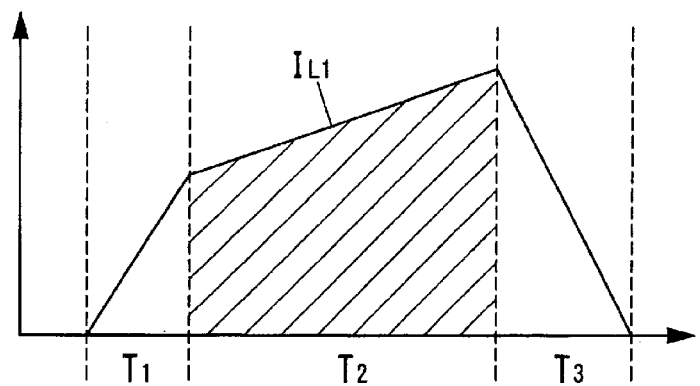
FIG. 25 is a graph showing the current flowing through the inductor in the above circuit.

As shown in FIG. 25, the inductor L sees a current IL1 of trapezoidal waveform over the periods T1 to T3. The period in which the inductor L contributes to the input current from the AC source is only the periods T3, and the periods in which the inductor L contributes to the output current to the load LD are the periods T1–T3.

If the output voltage of the rectifier circuit DB is Vin, the voltage across the smoothing capacitor C1 is Vc1, and the voltage across the load LD is VLd, then a voltage VLt1 across the inductor L in the first period T1 is expressed as; VLt1=Vc1−VLd, and a voltage VLt2 across the inductor L in the second period T2 is expressed as; VLt2=−VLd, and a voltage VLt3 across the inductor L in the third period T3 is expressed as; VLt3=Vin−Vc1−VLd. Because Vc1>Vin is always held in this circuit arrangement, VLt1>VLt2>VLt3 are always held. These voltages VLt1, VLt2, and VLt3 across the inductor L define a gradient of the inductor current IL1 in the periods T1–T3. Thus, a gradient in the period T1>a gradient in the period T2>a gradient in the period T3, therefore, the inductor current IL1 becomes a trapezoidal waveform.

Seventh Embodiment

Figure 26:
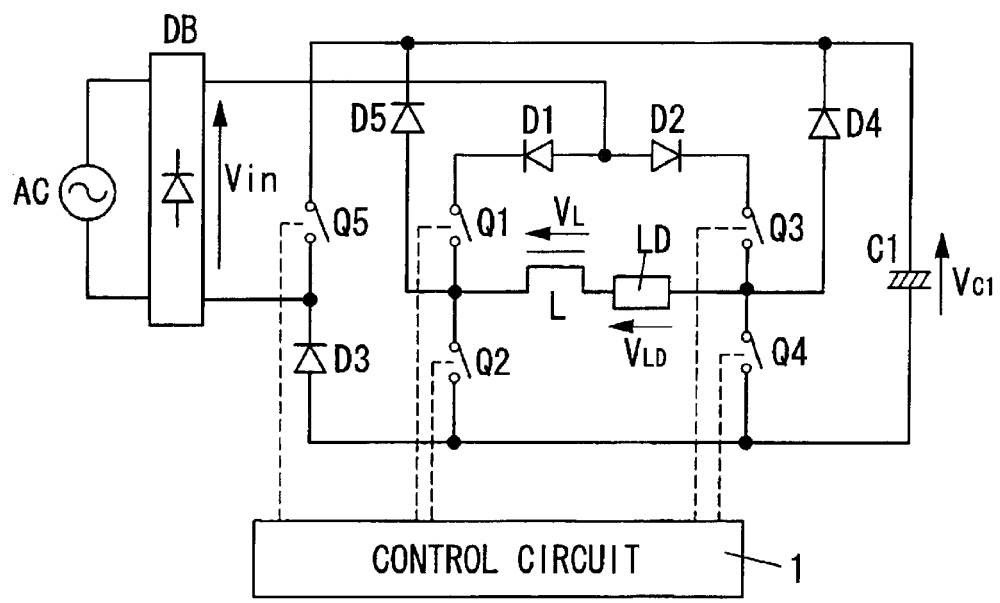
FIG. 26 is a circuit diagram of a power converter in accordance with a seventh embodiment of the present invention.
Figure 27:
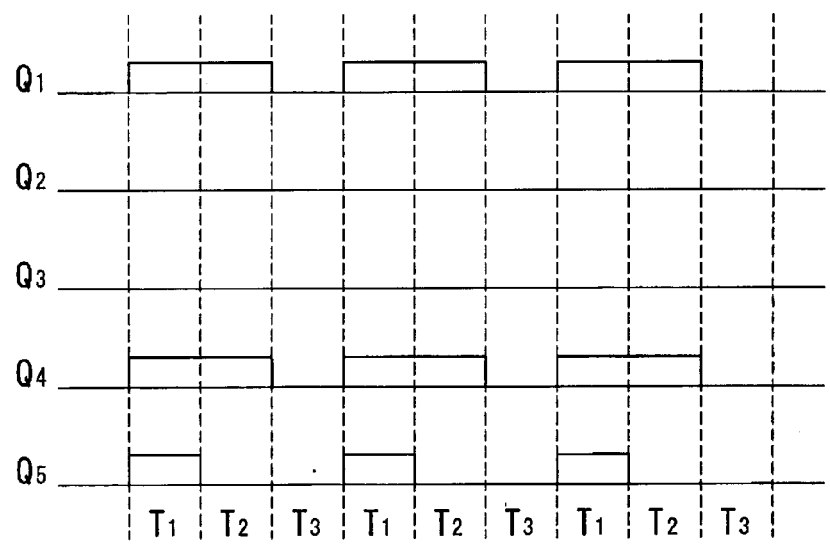
FIG. 27 is a time chart showing a control action of switching elements used in the above circuit.

A power converter in accordance with a seventh embodiment of the present invention will be explained based on FIGS. 26–28. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes a rectifier circuit DB which rectifies the AC current from the AC source to give a DC voltage, five switching elements Q1–Q5, one inductor L, and one smoothing capacitor C1. The first switching element Q1 and the second switching element Q2 are connected in series with a first diode across the rectifier circuit DB, and the first diode D1 is inserted between a high voltage side of the rectifier circuit DB and the first switching element Q1, and a cathode of the first diode D1 is connected to the first switching element Q1. The third switching element Q3 and the fourth switching element Q4 are connected in series with a second diode across the rectifier circuit DB, and the second diode D2 is inserted between a high voltage side of the rectifier circuit DB and the third switching element Q3, and a cathode of the second diode D2 is connected to the third switching element Q3. The second switching element Q2 and the fourth switching element Q4 are connected through a common third diode D3 to a low voltage side of the rectifier circuit DB. An inductor L is connected in series with the load LD between the connection point of the first switching element Q1 with the second switching element Q2 and the connection point of the third switching element Q3 with the fourth switching element Q4. The inductor L, the load LD, and a fourth diode D4 are connected in series with the smoothing capacitor C1 across the second switching element Q2, and the load LD, the inductor L, and a fifth diode D5 are connected in series across the fourth switching element Q4. The fifth switching element Q5 is connected in series with the smoothing capacitor C1 across the rectifier circuit DB. Each of the second switching element Q2 and fourth switching element Q4 is FET, and a parasitic diode of each FET forms a bypass allowing a reverse current to flow across each switching element. The other switching elements are also FETs, but they are not necessarily limited to FETs.

The control circuit passes the current to the load in one direction by making the first and fourth switching elements Q1, Q4 turn on and off at the same time and making both the second and third switching elements Q2, Q3 turn off in the meantime, while making the fifth switching element Q5 turn on and off on a predetermined cycle. And also, the control circuit passes the current to the load in the reverse direction by making the second and third switching elements Q2, Q3 turn on and off at the same time and making both the first and fourth switching elements Q1, Q4 turn off in the meantime, while making the fifth switching element Q5 turn on and off on a predetermined cycle. By this, the control circuit can drive the load by the alternating current of low frequency.

The control circuit 1 can always pass the current to both the load and the inductor, improving the harmonic distortion, namely, a power-factor, by controlling the five switching elements Q1–Q5 in six different patterns. These six patterns are classified into a positive cycle in which three continuous patterns are repeated, and a negative cycle in which remaining three continuous patterns are repeated. Each of the positive cycle and the negative cycle is repeated alternately at a low frequency, for example, at 100 Hz. FIG. 27 shows a control system to control the first, fourth, and fifth switching elements Q1, Q4, Q5 in three different patterns in the positive cycle. In a control system in the negative cycle, the common switching element Q5 and the remaining switching elements Q2, Q3 are controlled; in more detail, the switching element Q5 is controlled like in the positive cycle and the second and third switching elements Q2, Q3 are controlled like the first and fourth switching elements Q1, Q4 in the positive cycle. In each cycle, the three patterns are repeated two or more times in the half cycle of the AC current from the AC source.

In a first pattern, the first, fourth, and fifth switching elements Q1, Q4, and Q5 are turned on. In a second pattern, the first and fourth switching elements Q1, Q4 are turned on. In a third pattern, all the switching elements are turned off. Each switching element is turned on and off at a frequency higher enough than the frequency of the AC source (50–60 Hz), for example, dozens—several hundred kHz.

Figure 28A:
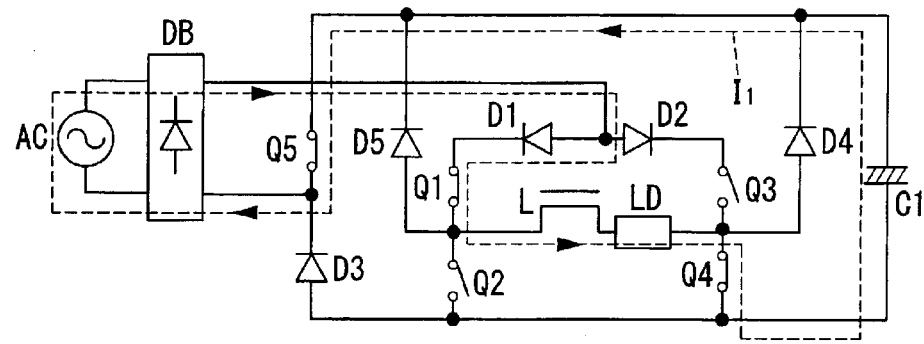
FIGS. 28A, 28B, and 28C are explanatory diagrams showing a pass of the current flowing through the above circuit when the switching elements are controlled in different on/off patterns.
Figure 28B:
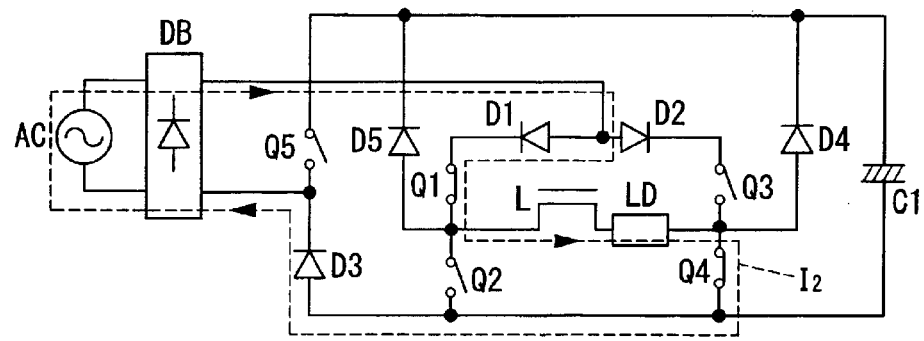
Figure 28C:
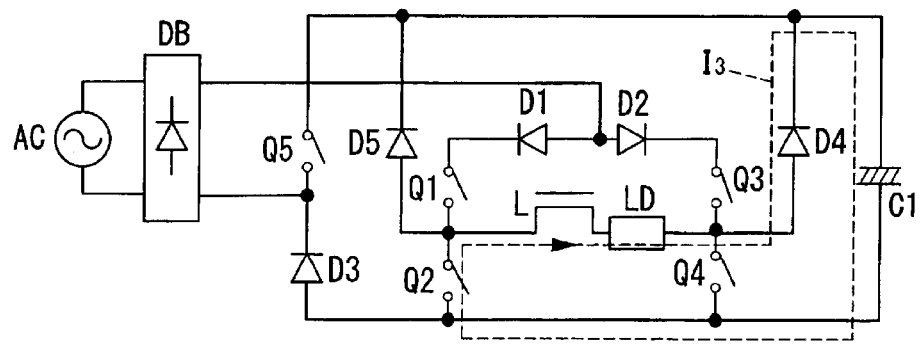

FIGS. 28A–28C show a current which flows through the circuit in a first period T1 controlled based on the first pattern, in a second period T2 controlled based on the second pattern, and in a third period T3 controlled based on the third pattern, respectively. In the first period T1, as shown in FIG. 28A, a current I1 flows increasingly through a closed loop; from the AC source to the AC source via the rectifier circuit DB, the first diode D1, the first switching element Q1, the inductor L, the load LD, the fourth switching element Q4, the smoothing capacitor C1, the fifth switching element Q5, and the rectifier circuit DB. The current I1 is accompanied by a discharging current from the smoothing capacitor C1. A simplified equivalent circuit in the first period is shown in FIG. 4A, which is a series circuit of the inductor L and the load LD connected across a series circuit of the charged smoothing capacitor C1 and a DC source E which outputs an input voltage Vin.

In the second period T2, as shown in FIG. 28B, a current I2 flows increasingly through a closed loop; from the AC source to the AC source via the rectifier circuit DB, the first diode D1, the first switching element Q1, the inductor L, the load LD, the fourth switching element Q4, the third diode D3, and the rectifier circuit DB. The current I2 flows independently of a charge and a discharge of the smoothing capacitor C1. A simplified equivalent circuit in this period is shown in FIG. 4B, which is a series circuit of the inductor L and the load LD connected across the DC source E.

In the third period T3, as shown in FIG. 28C, a current I3 flows decreasingly by back electromotive force of the inductor L through a closed loop; from the inductor L to the inductor L via the load LD, the fourth diode D4, the smoothing capacitor C1, and the bypass of the switching element Q2. The current I3 is accompanied by a charging current to the smoothing capacitor C1. A simplified equivalent circuit in this period is shown in FIG. 4C, which is a series circuit of the inductor L, the load LD, and the smoothing capacitor C1.

In the first and second period T1 and T2, a first current supplying mode is given, in which the current flows through a loop including the AC source, the inductor L, and the load LD. In the third period T3, a second current supplying mode is given, in which the current flows through a loop including the inductor L and the load LD but excluding the AC source. That is, the control circuit can improve a harmonic distortion (a power-factor) and limit the current to the load, always passing the current to the load and the inductor, by repeating the first current supplying mode and the second current supplying mode alternately.

The control circuit can pass the current of rectangular wave of low frequency to the load LD by repeating the remaining three patterns of the negative cycle after repeating the first, second, and third patterns two or more times as mentioned above. The control system in the negative cycle is designed to pass the current to the load in the reverse direction by controlling the second and third switching elements like the first and fourth switching elements, instead of controlling the first and fourth switching elements.

As is clear from the above operation, this power converter in this embodiment can convert AC power into DC power and convert the DC power into AC power at the same time to supply the alternating current to the load by using only five switching elements Q1–Q5.

In the third period in the negative cycle, the current flows in the opposite direction of the direction indicated by the arrow of FIG. 28C; from the inductor L to the load via the fifth diode D5, the smoothing capacitor C1, and the bypass of the fourth switching elements Q4.

Eighth Embodiment

Figure 29:
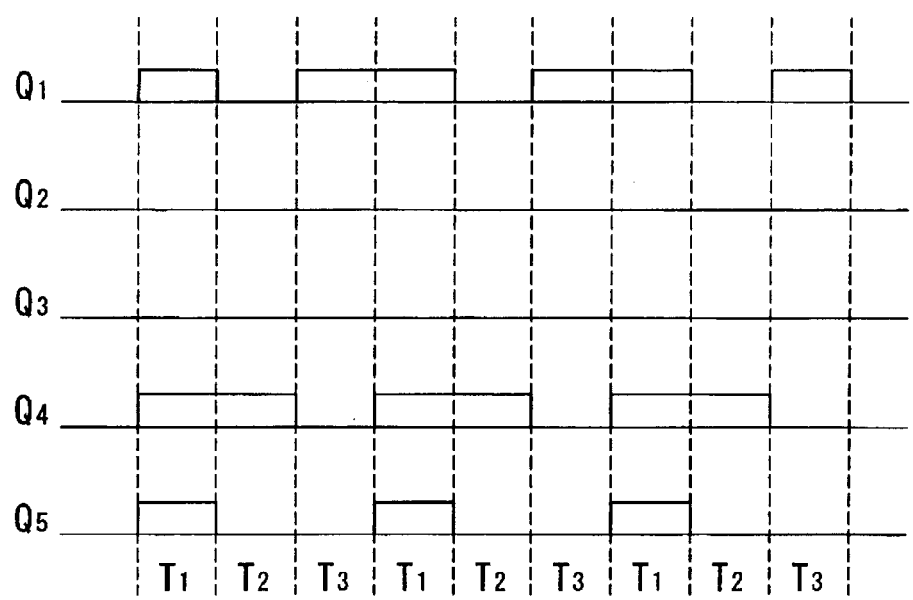
FIG. 29 is a time chart showing a control action of switching elements used in a power converter in accordance with a eighth embodiment of the present invention.

A power converter in accordance with an eighth embodiment of the present invention is shown in FIGS. 29, 30. A circuit arrangement of the power converter is identical to the seventh embodiment, and a control system of the control circuit 1 is different from the seventh embodiment. The similar parts of these embodiments are identified by the same reference character. The control circuit 1 controls the first, second, third, fourth, and fifth switching elements Q1–Q5 in six different on/off patterns as shown in FIG. 29 to always pass the current to the load and the inductor, improving the harmonic distortion, namely, a power-factor. These six patterns are classified into a positive cycle in which three continuous patterns are repeated, and a negative cycle in which remaining three continuous patterns are repeated. Each of the positive cycle and the negative cycle is repeated alternately at a low frequency, for example, at 100 Hz. FIG. 29 shows a control system to control the first, fourth, and fifth switching elements Q1, Q4, Q5 in three different patterns in the positive cycle. In a control system in the negative cycle, the common switching element Q5 and the remaining switching elements Q2, Q3 are controlled; in more detail, the switching element Q5 is controlled like in the positive cycle, and the second and third switching elements Q2, Q3 are controlled like the first and fourth switching elements Q1, Q4 in the positive cycle. In each cycle, the three patterns are repeated two or more times in the half cycle of the AC current from the AC source.

In a first pattern, the first, fourth, and fifth switching elements Q1, Q4, and Q5 are turned on. In a second pattern, only the fourth switching element Q4 is turned on. In a third pattern, only the first switching elements Q1 is turned on. Each switching element is turned on and off at a frequency higher enough than the frequency of the AC source (50–60 Hz), for example, dozens—several hundred kHz.

Figure 30A:
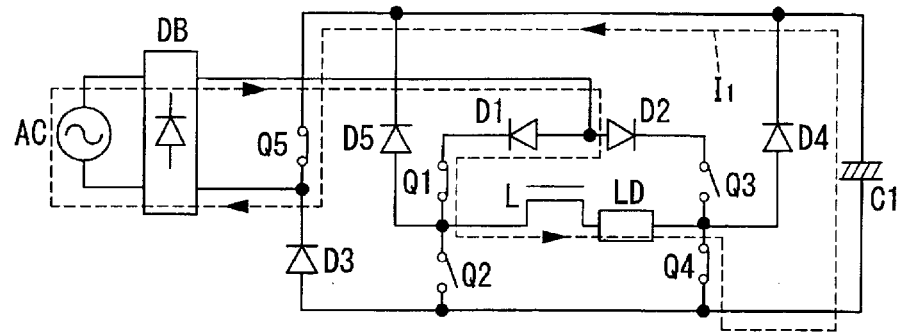
FIGS. 30A, 30B, and 30C are explanatory diagrams showing a pass of the current flowing through the above circuit when the switching elements are controlled in different on/off patterns.
Figure 30B:
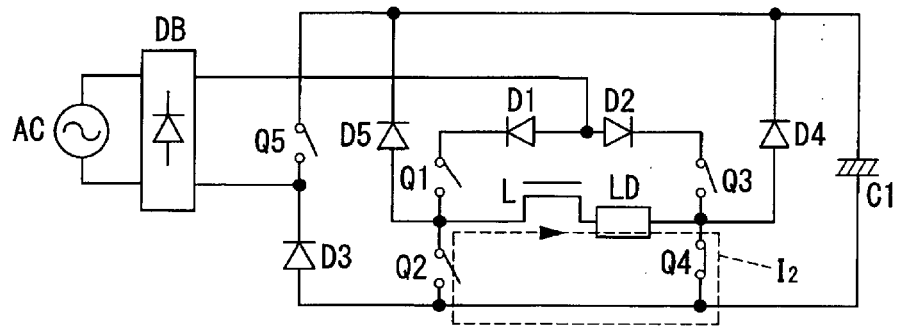
Figure 30C:
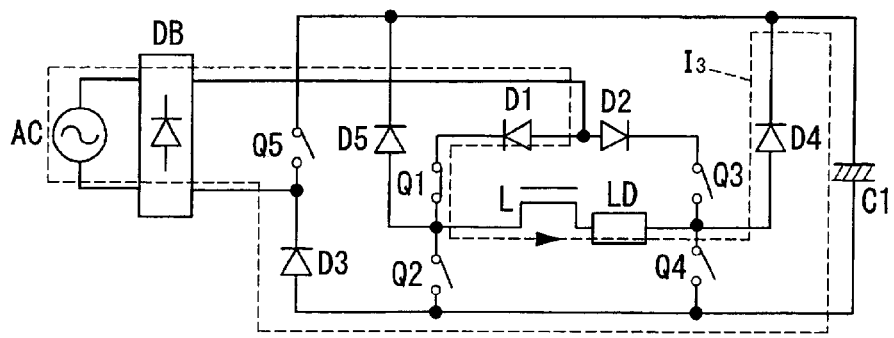

FIGS. 30A–30C show a current which flows through the circuit in a first period T1 controlled based on the first pattern, in a second period T2 controlled based on the second pattern, and in a third period T3 controlled based on the third pattern, respectively. In the first period T1, as shown in FIG. 30A, a current I1 flows increasingly through a closed loop; from the AC source to the AC source via the rectifier circuit DB, the first diode D1, the first switching element Q1, the inductor L, the load LD, the fourth switching element Q4, the smoothing capacitor C1, the fifth switching element Q5, and the rectifier circuit DB. The current I1 is accompanied by a discharging current from the smoothing capacitor C1. A simplified equivalent circuit in the first period is shown in FIG. 8A, which is a series circuit of the inductor L and the load LD connected across a series circuit of the charged smoothing capacitor C1 and a DC source E which outputs an input voltage Vin.

In the second period T2, as shown in FIG. 30B, a current I2 flows decreasingly by back electromotive force of the inductor L through a closed loop; from the inductor L to the inductor L via the load LD, the fourth switching element Q4, and the bypass of the second switching element Q2. The current I2 flows independently of a charge and a discharge of the smoothing capacitor C1. A simplified equivalent circuit in this period is shown in FIG. 8B, which is a series circuit of the inductor L and the load LD.

In the third period T3, as shown in FIG. 30C, a current I3 flows decreasingly through a closed loop; from the AC source to the AC source via the rectifier circuit DB, the first diode D1, the first switching element Q1, the inductor L, the load LD, the fourth diode D4, the smoothing capacitor C1, the third diode D3, and the rectifier circuit DB. The current I3 is accompanied by a charging current to the smoothing capacitor C1. A simplified equivalent circuit in this period is shown in FIG. 8C, which is a series circuit of the inductor L, the load LD, and the smoothing capacitor C1 connected across the DC source E.

In the first and third period T1 and T3, a first current supplying mode is given, in which the current flows through a closed loop including the AC source, the inductor L, and the load LD. In the second period T2, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

The control circuit can pass the current of rectangular wave of low frequency to the load LD by repeating the remaining three patterns of the negative cycle after repeating the first, second, and third patterns two or more times as mentioned above. The control system in the negative cycle is designed to pass the current to the load in the reverse direction by controlling the third and second switching elements like the first and fourth switching elements, respectively, instead of controlling the first and fourth switching elements.

Ninth Embodiment

Figure 31:
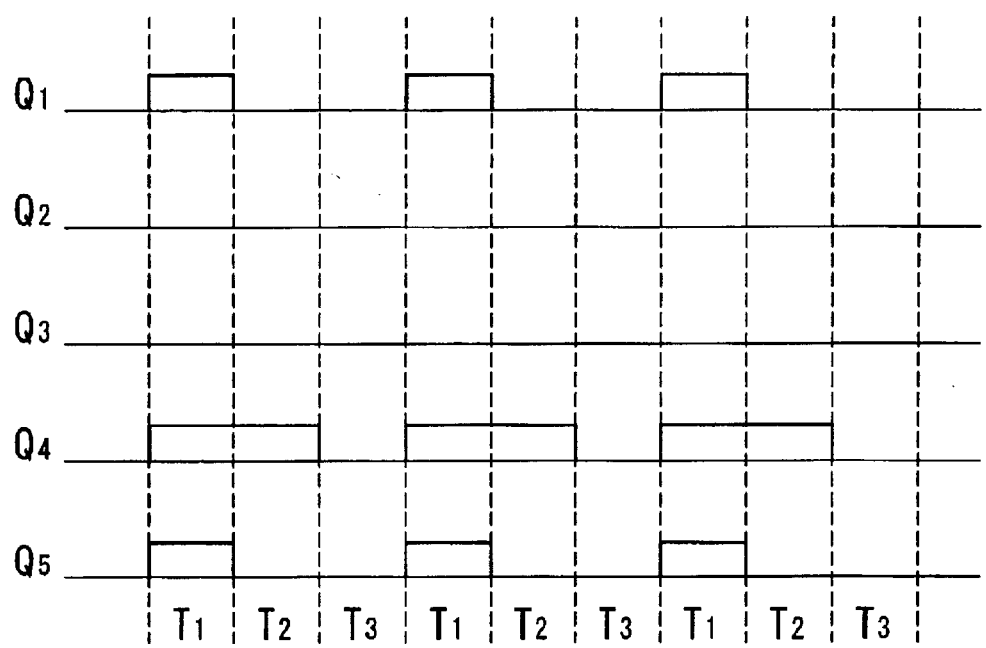
FIG. 31 is a time chart showing a control action of switching elements used in a power converter in accordance with a ninth embodiment of the present invention.

A power converter in accordance with a ninth embodiment of the present invention is shown in FIGS. 31, 32. A circuit arrangement of the power converter is identical to the seventh embodiment, and a control system of the control circuit 1 is different from the seventh embodiment. The similar parts of these embodiments are identified by the same reference character. The control circuit 1 controls the first, second, third, fourth, and fifth switching elements Q1–Q5 in six different on/off patterns as shown in FIG. 31 to always pass the current to the load and the inductor, improving the harmonic distortion, namely, a power-factor. These six patterns are classified into a positive cycle in which three continuous patterns are repeated, and a negative cycle in which remaining three continuous patterns are repeated. Each of the positive cycle and the negative cycle is repeated alternately at a low frequency, for example, at 100 Hz. FIG. 31 shows a control system to control the first, fourth, and fifth switching elements Q1, Q4, Q5 in three different patterns in the positive cycle. In a control system in the negative cycle, the common switching element Q5 and the remaining switching elements Q2, Q3 are controlled; in more detail, the switching element Q5 is controlled like in the positive cycle, and the third and second switching element Q3, Q2 are controlled like the first and fourth switching elements Q1, Q4 in the positive cycle, respectively. In each cycle, the three patterns are repeated two or more times in the half cycle of the AC current from the AC source.

In a first pattern, the first, fourth, and fifth switching elements Q1, Q4, and Q5 are turned on. In a second pattern, only the fourth switching element Q4 is turned on. In a third pattern, all the switching elements are turned off. Each switching element is turned on and off at a frequency higher enough than the frequency of the AC source (50–60 Hz), for example, dozens—several hundred kHz.

Figure 32A:
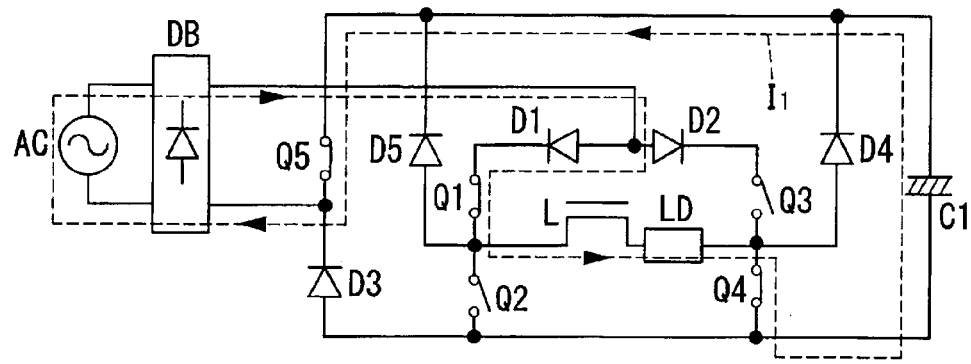
FIGS. 32A, 32B, and 32C are explanatory diagrams showing a pass of the current flowing through the above circuit when the switching elements are controlled in different on/off patterns.
Figure 32B:
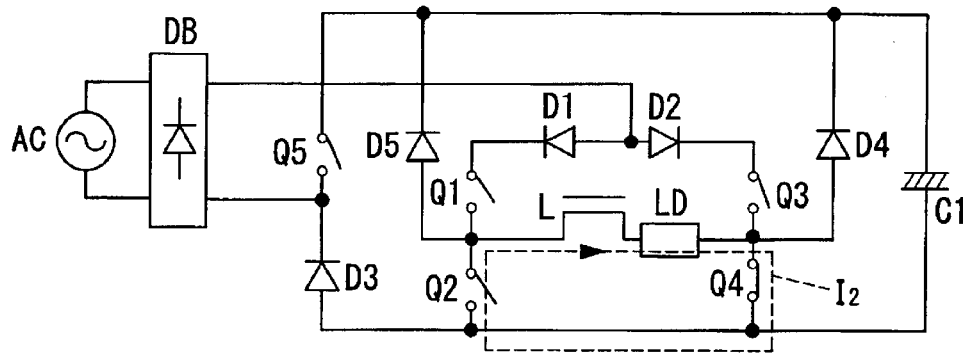
Figure 32C:
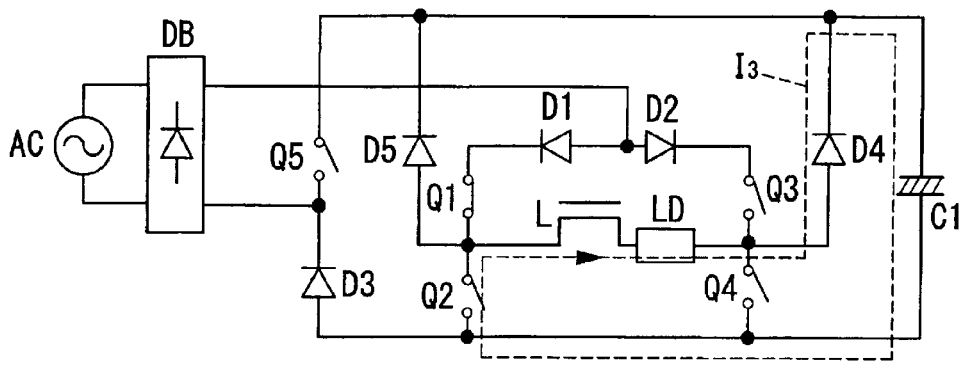

FIGS. 32A–32C show a current which flows through the circuit in a first period T1 controlled based on the first pattern, in a second period T2 controlled based on the second pattern, and in a third period T3 controlled based on the third pattern, respectively. In the first period T1, as shown in FIG. 32A, a current I1 flows increasingly through a closed loop; from the AC source to the AC source via the rectifier circuit DB, the first diode D1, the first switching element Q1, the inductor L, the load LD, the fourth switching element Q4, the smoothing capacitor C1, the fifth switching element Q5, and the rectifier circuit DB. The current I1 is accompanied by a discharging current from the smoothing capacitor C1. A simplified equivalent circuit in the first period is shown in FIG. 16A, which is a series circuit of the inductor L and the load LD connected across a series circuit of the charged smoothing capacitor C1 and a DC source E which outputs an input voltage Vin.

In the second period T2, as shown in FIG. 32B, a current I2 flows decreasingly by back electromotive force of the inductor L through a closed loop; from the inductor L to the inductor L via the load LD, the fourth switching element Q4, and the bypass of the second switching element Q2. The current I2 flows independently of a charge and a discharge of the smoothing capacitor C1. A simplified equivalent circuit in this period is shown in FIG. 16B, which is a series circuit of the inductor L and the load LD.

In the third period T3, as shown in FIG. 32C, a current I3 flows decreasingly by back electromotive force of the inductor L through a closed loop; from the inductor L to the inductor L via the load LD, the fourth diode D4, the smoothing capacitor C1, the bypass of the second switching element Q2. The current I3 is accompanied by a charging current to the smoothing capacitor C1. A simplified equivalent circuit in this period is shown in FIG. 16C, which is a series circuit of the inductor L, the load LD, and the smoothing capacitor C1.

In the first period T1, a first current supplying mode is given, in which the current flows through a closed loop including the AC source, the inductor L, and the load LD. In the second and third periods T2, T3, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

The control circuit can pass the current of rectangular wave of low frequency to the load LD by repeating the remaining three patterns of the negative cycle after repeating the first, second, and third patterns two or more times as mentioned above. The control system in the negative cycle is designed to pass the current to the load in the reverse direction by controlling the third and second switching elements like the first and fourth switching elements, respectively, instead of controlling the first and fourth switching elements.

Tenth Embodiment

Figure 33:
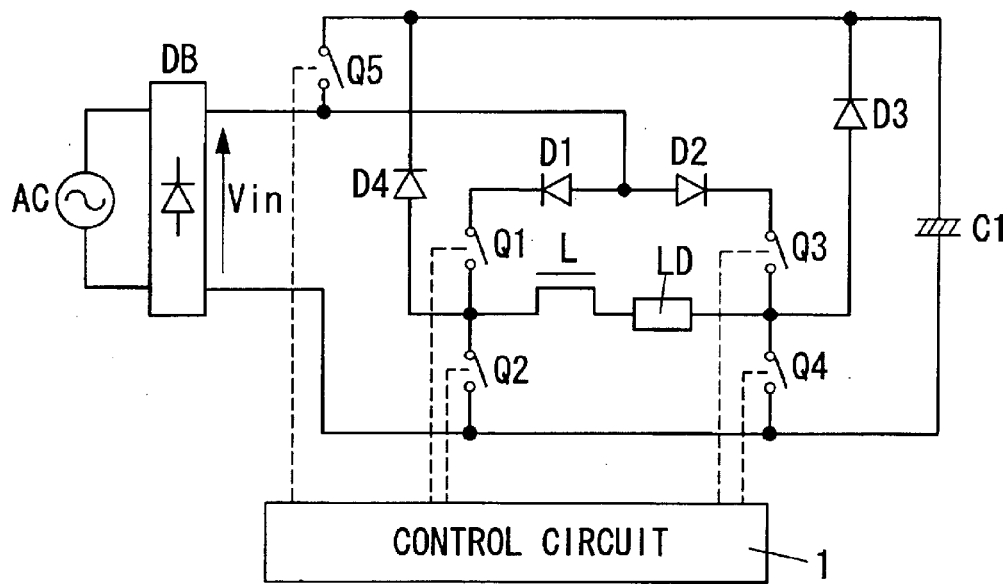
FIG. 33 is a circuit diagram of a power converter in accordance with a tenth embodiment of the present invention.
Figure 34:
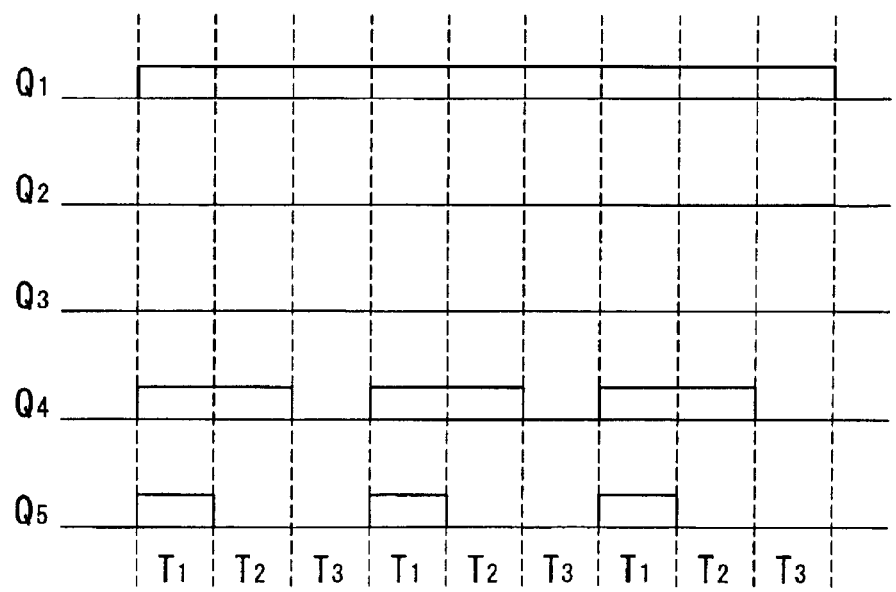
FIG. 34 is a time chart showing a control action of switching elements used in the above circuit.

A power converter in accordance with a tenth embodiment of the present invention will be explained based on FIGS. 33–35. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes a rectifier circuit DB which rectifies the AC current from the AC source to give a DC voltage, five switching elements Q1–Q5, one inductor L, and one smoothing capacitor C1. The first switching element Q1 and the second switching element Q2 are connected in series with a first diode D1 across the rectifier circuit DB, and the first diode D1 is inserted between a high voltage side of the rectifier DB and the first switching element Q1. A cathode of the first diode D1 is connected to the first switching element Q1. The third switching element Q3 and the fourth switching element Q4 are connected in series with a second diode D2 across the rectifier circuit DB, and the second diode D2 is inserted between a high voltage side of the rectifier DB and the third switching element Q3. A cathode of the second diode D2 is connected to the third switching element Q3. The inductor L is connected in series with the load LD, and the series circuit is inserted between the connection point of the first switching element Q1 with the second switching element Q2 and the connection point of the third switching element Q3 with the fourth switching element Q4. The third diode D3 is connected in series with the smoothing capacitor C1 across the fourth switching element Q4. The fourth diode D4 is connected in series with the smoothing capacitor C1 across the second switching element Q2. A series circuit of the fifth switching element Q5, the first diode D1, the first switching element Q1, the inductor L, the load LD, and the fourth switching element Q4 is connected across the smoothing capacitor C1. Also, a series circuit of the fifth switching element Q5, the second diode D2, the third switching element Q3, the inductor L, the load LD, and the second switching element Q2 is connected across the smoothing capacitor.

The control circuit passes the current to the load in one direction by making the first and fourth switching elements Q1, Q4 turn on and off at the same time and making both the second and third switching elements Q2, Q3 turn off in the meantime, while making the fifth switching element Q5 turn on and off on a predetermined cycle. And also, the control circuit passes the current to the load in the reverse direction by making the second and third switching elements Q2, 03 turn on and off at the same time and making both the first and fourth switching elements Q1, Q4 turn off, while making the fifth switching element Q5 turn on and off on a predetermined cycle. By this, the control circuit can drive the load by the alternating current of low frequency.

The control circuit 1 can always pass the current to both the load and the inductor, improving a harmonic distortion, namely, a power-factor, by controlling the five switching elements Q1–Q5 in six different patterns. These six patterns are classified into a positive cycle in which three continuous patterns are repeated, and a negative cycle in which remaining three continuous patterns are repeated. Each of the positive cycle and the negative cycle is repeated alternately at a low frequency, for example, at 100 Hz. FIG. 34 shows a control system to control the first, fourth, and fifth switching elements Q1, Q4, Q5 in three different patterns in the positive cycle. In a control system in the negative cycle, the common switching element Q5 and the remaining switching elements Q2, Q3 are controlled; in more detail, the switching element Q5 is controlled like in the positive cycle, and the third and second switching element Q3 and Q2 are controlled like the first and fourth switching elements Q1, Q4 in the positive cycle, respectively. In each cycle, the three patterns are repeated two or more times in the half cycle of the AC current from the AC source.

In a first pattern, the first, fourth, and fifth switching elements Q1, Q4, and Q5 are turned on. In a second pattern, the first and fourth switching elements Q1, Q4 are turned on. In a third pattern, all the switching elements except the first switching element are turned off. Each switching element is turned on and off at a frequency higher enough than the frequency of the AC source (50–60 Hz), for example, dozens—several hundred kHz.

Figure 35A:
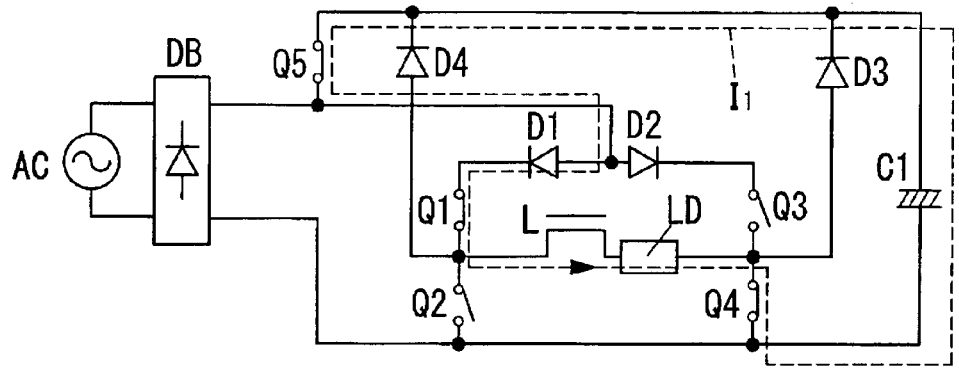
FIGS. 35A, 35B, and 35C are explanatory diagrams showing a pass of the current flowing through the above circuit when the switching elements are controlled in different on/off patterns.
Figure 35B:
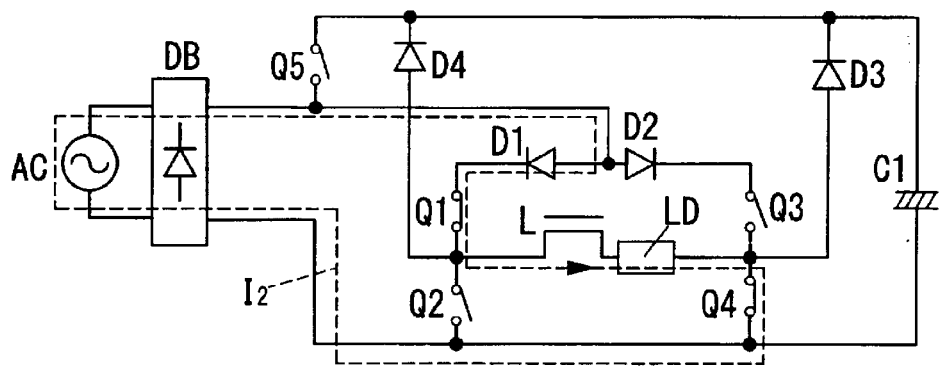
Figure 35C:
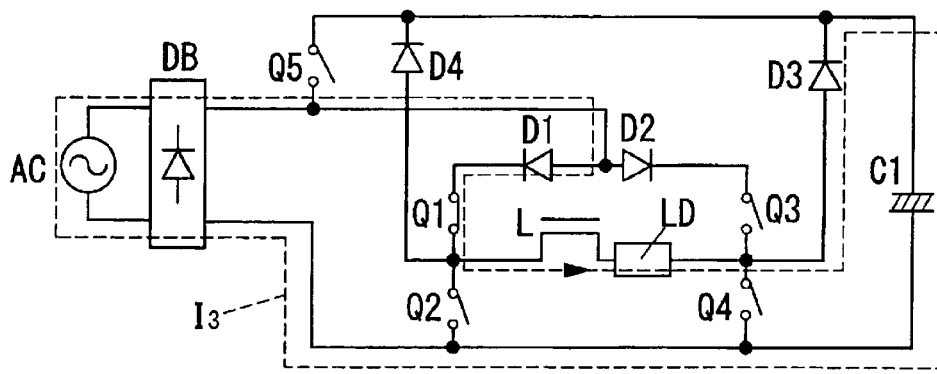

FIGS. 35A–35C show a current which flows through the circuit in a first period T1 controlled based on the first pattern, in a second period T2 controlled based on the second pattern, and in a third period T3 controlled based on the third pattern, respectively. In the first period T1, as shown in FIG. 35A, a current I1 flows increasingly through a closed loop; from the smoothing capacitor C1 to the smoothing capacitor C1 via the fifth switching element Q5, the first diode D1, the first switching element Q1, the inductor L, the load LD, and the fourth switching element Q4. The current I1 is accompanied by a discharging current from the smoothing capacitor C1. A simplified equivalent circuit in the first period is shown in FIG. 12A, which is a series circuit of the inductor L and the load LD connected across the charged smoothing capacitor C1.

In the second period T2, as shown in FIG. 35B, a current I2 flows increasingly through a closed loop; from the AC source to the AC source via the rectifier circuit DB, the first diode D1, the first switching element Q1, the inductor L, the load LD, the fourth switching element Q4, and the rectifier circuit DB. The current I2 flows independently of a charge and a discharge of the smoothing capacitor C1. A simplified equivalent circuit in this period is shown in FIG. 12B, which is a series circuit of the inductor L and the load LD connected across the DC source E which outputs an input voltage Vin.

In the third period T3, as shown in FIG. 35C, a current I3 flows decreasingly through a closed loop; from the AC source to the AC source via the rectifier circuit DB, the first diode D1, the first switching element Q1, the inductor L, the load LD, the third diode D3, the smoothing capacitor C1, and the rectifier circuit DB. The current I3 is accompanied by a charging current to the smoothing capacitor C1. A simplified equivalent circuit in this period is shown in FIG. 12C, which is a series circuit of the inductor L, the load LD, and the smoothing capacitor C1 connected across the DC source E.

In the second and third period T2 and T3, a first current supplying mode is given, in which the current flows through a closed loop including the AC source, the inductor L, and the load LD. In the first period T1, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

The control circuit can pass the current of rectangular wave of low frequency to the load LD by repeating the remaining three patterns of the negative cycle after repeating the first, second, and third patterns two or more times as mentioned above. The control system in the negative cycle is designed to pass the current to the load in the reverse direction by controlling the third and second switching elements like the first and fourth switching elements in the positive cycle, instead of controlling the first and fourth switching elements.

In the third period in the negative cycle, the current flows in the opposite direction of the direction indicated by the arrow of FIG. 35C; from the inductor L to the load via the fourth diode D4, the smoothing capacitor C1, and the bypass of the fourth switching element Q4.

Eleventh Embodiment

Figure 36:
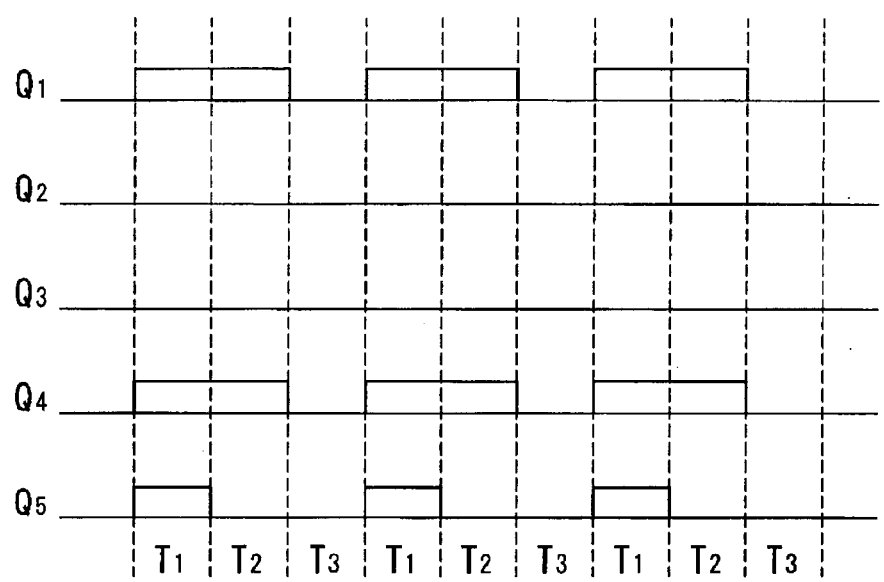
FIG. 36 is a time chart showing a control action of switching elements used in a power converter in accordance with a eleventh embodiment of the present invention.

A power converter in accordance with an eleventh embodiment of the present invention is shown in FIGS. 36, 37. A circuit arrangement of the power converter is identical to the tenth embodiment, and a control system of the control circuit 1 is different from the tenth embodiment. The similar parts of these embodiments are identified by the same reference character. The control circuit 1 controls the first, second, third, fourth, and fifth switching elements Q1–Q5 in six different on/off patterns as shown in FIG. 36 to always pass the current to the load and the inductor, improving the harmonic distortion, namely, a power-factor. These six patterns are classified into a positive cycle in which three continuous patterns are repeated, and a negative cycle in which remaining three continuous patterns are repeated. Each of the positive cycle and the negative cycle is repeated alternately at a low frequency, for example, at 100 Hz. FIG. 36 shows a control system to control the first, fourth, and fifth switching elements Q1, Q4, and Q5 in three different patterns in the positive cycle. In a control system in the negative cycle, the common switching element Q5 and the remaining switching elements Q2, Q3 are controlled; in more detail, the switching element Q5 is controlled like in the positive cycle, and the third and second switching elements Q3, Q2 are controlled like the first and fourth switching elements Q1, Q4 in the positive cycle. In each cycle, the three patterns are repeated two or more times in the half cycle of the AC current from the AC source.

In a first pattern, the first, fourth, and fifth switching elements Q1, Q4, and Q5 are turned on. In a second pattern, the first and fourth switching elements Q1, Q4 are turned on. In a third pattern, all the switching elements Q1–Q5 are turned off. Each switching element is turned on and off at a frequency higher enough than the frequency of the AC source (50–60 Hz), for example, dozens—several hundred kHz.

Figure 37A:
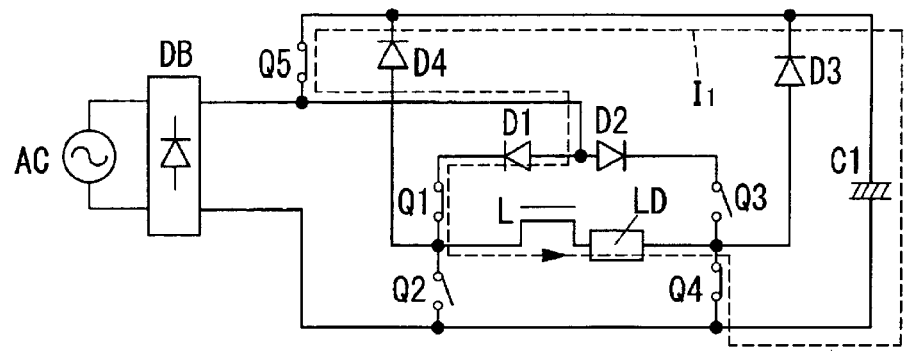
FIGS. 37A, 37B, and 37C are explanatory diagrams showing a pass of the current flowing through the above circuit when the switching elements are controlled in different on/off patterns.
Figure 37B:
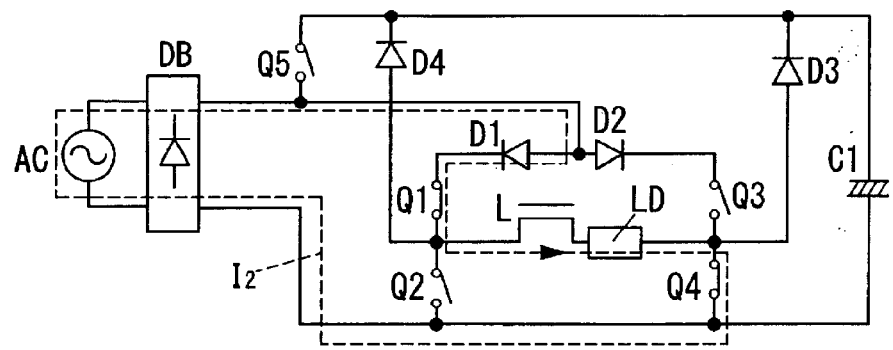
Figure 37C:
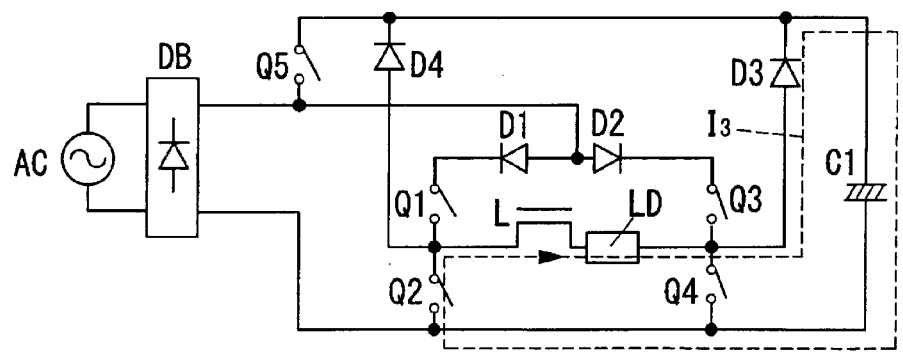

FIGS. 37A–37C show a current which flows through the circuit in a first period T1 controlled based on the first pattern, in a second period T2 controlled based on the second pattern, and in a third period T3 controlled based on the third pattern, respectively. In the first period T1, as shown in FIG. 37A, a current I1 flows increasingly through a closed loop; from the smoothing capacitor C1 to the smoothing capacitor C1 via the fifth switching element Q5, the first diode D1, the first switching element Q1, the inductor L, the load LD, the fourth switching element Q4. The current I1 is accompanied by a discharging current from the smoothing capacitor C1. A simplified equivalent circuit in this period is shown in FIG. 20A, which is a series circuit of the inductor L and the load LD connected across the charged smoothing capacitor C1.

In the second period T2, as shown in FIG. 37B, a current I2 flows increasingly through a closed loop; from the AC source to the AC source via the rectifier circuit DB, the first diode D1, the first switching element Q1, the inductor L, the load LD, the fourth switching element Q4, and the rectifier circuit DB. The current I2 flows independently of a charge and a discharge of the smoothing capacitor C1. A simplified equivalent circuit in this period is shown in FIG. 20B, which is a series circuit of the inductor L and the load LD connected across the DC source E which outputs an input voltage Vin.

In the third period T3, as shown in FIG. 37C, a current I3 flows decreasingly by back electromotive force of the inductor L through a closed loop; from the inductor L to the inductor L via the load LD, the third diode D3, the smoothing capacitor C1, and the bypass of the second switching element Q2. The current I3 is accompanied by a charging current to the smoothing capacitor C1. A simplified equivalent circuit in this period is shown in FIG. 20C, which is a series circuit of the inductor L, the load LD, and the smoothing capacitor C1.

In the second period T2, a first current supplying mode is given, in which the current flows through a closed loop including the AC source, the inductor L, and the load LD. In the first and third periods T1 and T3, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

The control circuit can pass the current of rectangular wave of low frequency to the load LD by repeating the remaining three patterns of the negative cycle after repeating the first, second, and third patterns two or more times as mentioned above. The control system in the negative cycle is designed to pass the current to the load in the reverse direction by controlling the third and second switching elements like the first and fourth switching elements, respectively, instead of controlling the first and fourth switching elements.

In the third period in the negative cycle, the current flows in the opposite direction of the direction indicated by the arrow of FIG. 37C; from the inductor L to the load via the fourth diode D4, the smoothing capacitor C1, and the bypass of the fourth switching element Q4.

Twelfth Embodiment

Figure 38:
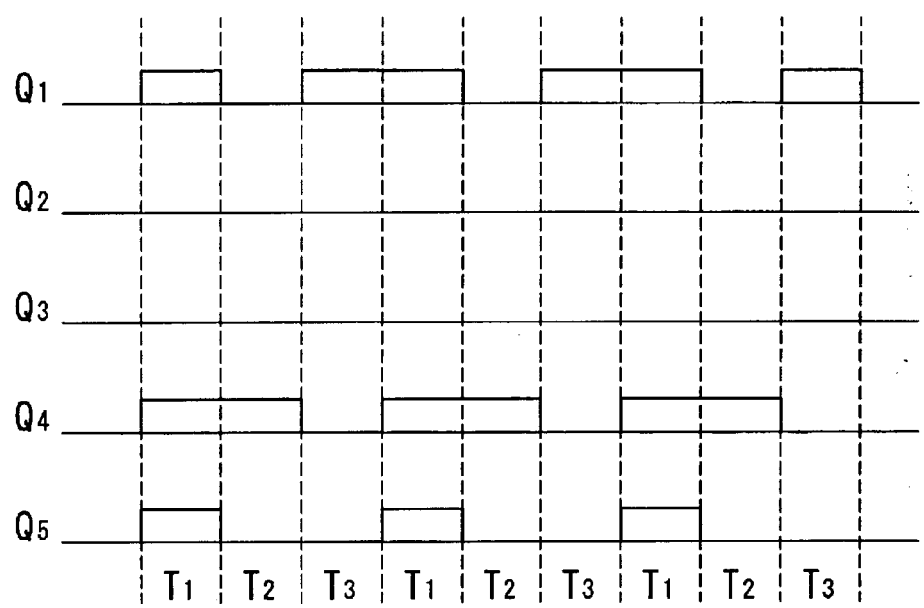
FIG. 38 is a time chart showing a control action of switching elements used in a power converter in accordance with a twelfth embodiment of the present invention.

A power converter in accordance with a twelfth embodiment of the present invention is shown in FIGS. 38, 39. A circuit arrangement of the power converter is identical to the tenth embodiment, and a control system of the control circuit 1 is different from the tenth embodiment. The similar parts of these embodiments are identified by the same reference character. The control circuit 1 controls the first, second, third, fourth, and fifth switching elements Q1–Q5 in six different on/off patterns as shown in FIG. 38 to always pass the current to the load and the inductor, improving the harmonic distortion, namely, a power-factor. These six patterns are classified into a positive cycle in which three continuous patterns are repeated, and a negative cycle in which remaining three continuous patterns are repeated. Each of the positive cycle and the negative cycle is repeated alternately at a low frequency, for example, at 100 Hz. FIG. 38 shows a control system to control the first, fourth, and fifth switching elements Q1, Q4, Q5 in three different patterns in the positive cycle. In a control system in the negative cycle, the common switching element Q5 and the remaining switching elements Q2, Q3 are controlled; in more detail, the switching element Q5 is controlled like in the positive cycle, and the third and second switching elements Q3, Q2 are controlled like the first and fourth switching elements Q1, Q4 in the positive cycle, respectively. In each cycle, the three patterns are repeated two or more times in the half cycle of the AC current from the AC source.

In a first pattern, the first, fourth, and fifth switching elements Q1, Q4, and Q5 are turned on. In a second pattern, only the fourth switching element Q4 is turned on. In a third pattern, only the first switching element Q1 is turned on. Each switching element is turned on and off at a frequency higher enough than the frequency of the AC source (50–60 Hz), for example, dozens—several hundred kHz.

Figure 39A:
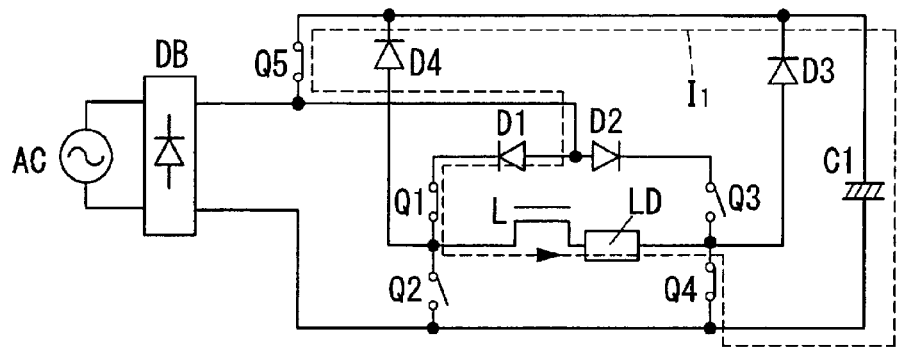
FIGS. 39A, 39B, and 39C are explanatory diagrams showing a pass of the current flowing through the above circuit when the switching elements are controlled in different on/off patterns.
Figure 39B:
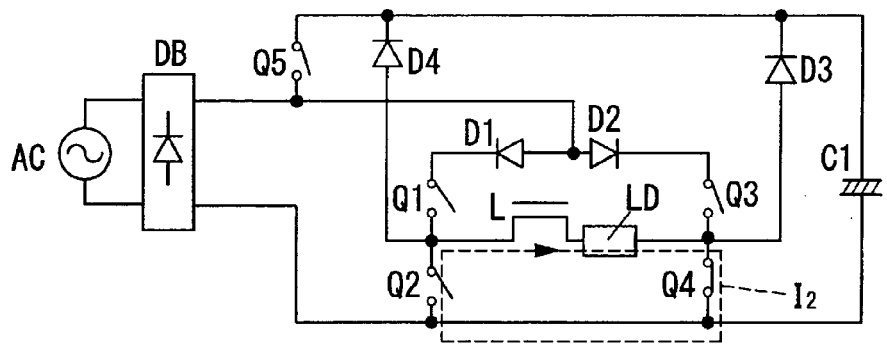
Figure 39C:
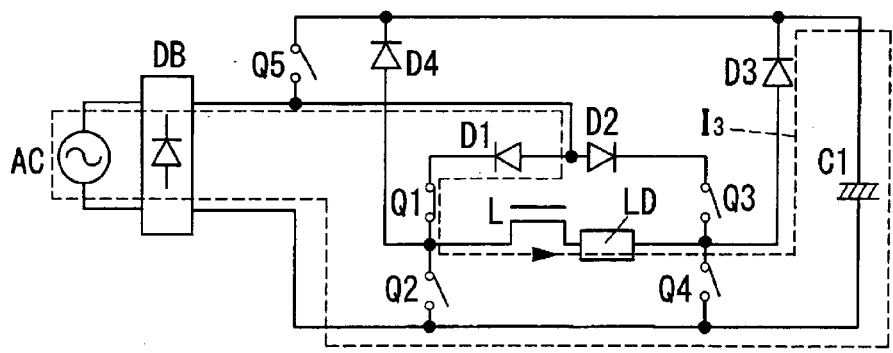
Figure 40:
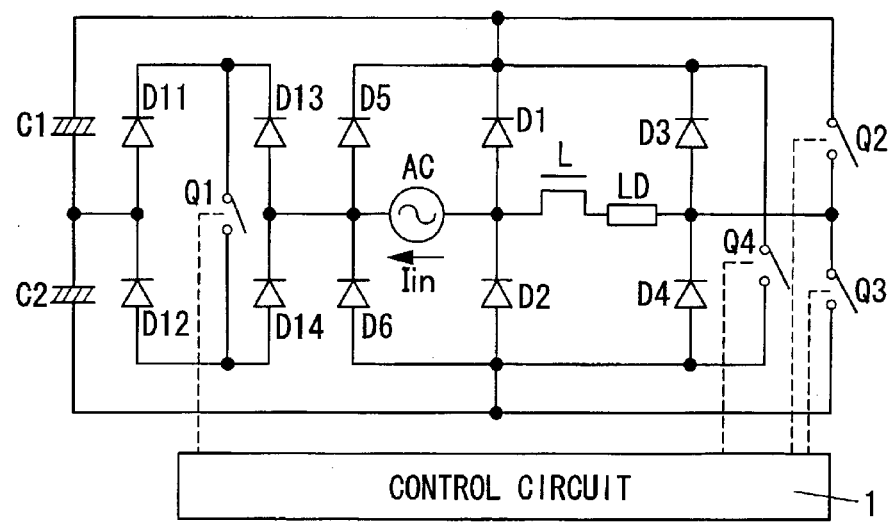
FIG. 40 is a circuit diagram of a power converter in accordance with a thirteenth embodiment of the present invention.

FIGS. 39A–39C show a current which flows through the circuit in a first period T1 controlled based on the first pattern, in a second period T2 controlled based on the second pattern, and in a third period T3 controlled based on the third pattern, respectively. In the first period T1, as shown in FIG. 39A, a current I1 flows increasingly through a closed loop; from the smoothing capacitor C1 to the smoothing capacitor C1 via the fifth switching element Q5, the first diode D1, the first switching element Q1, the inductor L, the load LD, the fourth switching element Q4. The current I1 is accompanied by a discharging current from the smoothing capacitor C1. A simplified equivalent circuit in the first period is shown in FIG. 24A, which is a series circuit of the inductor L and the load LD connected across the charged smoothing capacitor C1.

In the second period T2, as shown in FIG. 39B, a current I2 flows decreasingly by back electromotive force of the inductor L through a closed loop; from the inductor L to the inductor L via the load LD, the fourth switching element Q4, and the bypass of the second switching element Q2. The current I2 flows independently of a charge and a discharge of the smoothing capacitor C1. A simplified equivalent circuit in this period is shown in FIG. 24B, which is a series circuit of the inductor L and the load LD.

In the third period T3, as shown in FIG. 39C, a current I3 flows decreasingly through a closed loop; from the AC source to the AC source via the rectifier circuit DB, the first diode D1, the first switching element Q1, the inductor L, the load LD, the third diode D3, the smoothing capacitor C1, and the rectifier circuit DB. The current I3 is accompanied by a charging current to the smoothing capacitor C1. A simplified equivalent circuit in this period is shown in FIG. 24C, which is a series circuit of the inductor L, the load LD, and the smoothing capacitor C1 connected across the DC source E.

In the third period T3, a first current supplying mode is given, in which the current flows through a closed loop including the AC source, the inductor L, and the load LD. In the first and second periods T1 and T2, a second current supplying mode is given, in which the current flows through a closed loop including the inductor L and the load LD but excluding the AC source. That is, the control circuit can improve a harmonic distortion (a power-factor) and limit the current to the load, always passing the current to the load and the inductor L, by repeating the first current supplying mode and the second current supplying mode alternately.

The control circuit can pass the current of rectangular wave of low frequency to the load LD by repeating the remaining three patterns of the negative cycle after repeating the first, second, and third patterns two or more times as mentioned above. The control system in the negative cycle is designed to pass the current to the load in the reverse direction by controlling the third and second switching elements like the first and fourth switching elements, respectively, instead of controlling the first and fourth switching elements.

In the third period in the negative cycle, the current flows in the opposite direction of the direction indicated by the arrow of FIG. 39C; from the inductor L to the load via the fourth diode D4, the smoothing capacitor C1, and the bypass of the fourth switching element Q4.

Thirteenth Embodiment

A power converter in accordance with a thirteenth embodiment of the present invention will be explained based on FIGS. 40–43. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2. The first switching element Q1 and the second switching element Q2 are connected in series with the inductor L and the load LD across the AC source, and the first switching element Q1 and the third switching element Q3 are connected in series with the inductor L and the load LD across the AC source. A series circuit of a first smoothing capacitor C1 and a second smoothing capacitor C2 is connected across a series circuit of the second switching element Q2 and the third switching element Q3. A series circuit of a first diode D1 and a second diode D2 are connected across a series circuit of the second switching element Q2 and the third switching element Q3. A diode bridge D11–D14 is inserted between the connection point of the first smoothing capacitor C1 with the second smoothing capacitor C2 and the AC source, each input terminal of the diode bridge is connected to the connection point of the first smoothing capacitor C1 with the second smoothing capacitor C2 and the AC source, respectively. The first switching element Q1 is connected between output terminals of the diode bridge D11–D14. A series circuit of a third diode D3 and a fourth diode D4 is connected across a series circuit of the first diode D1 and the second diode D2. The inductor L and the load LD are connected in series between the connection point of the first diode D1 with the second diode D2 and the connection point of the third diode D3 with the fourth diode D4. The fourth switching element Q4 is connected across a series circuit of the third diode D3 and the fourth diode D4. A series circuit of a fifth diode D5 and a sixth diode D6 is connected across a series circuit of the first diode D1 and the second diode D2, and the AC source is inserted between the connection point of the first diode D1 with the second diode D2 and the connection point of the fifth diode D5 with the sixth diode D6. The second and third switching elements Q2 and Q3, each defined by FET, have a parasitic diode, respectively, which defines a bypass allowing a reverse current to flow across each switching element.

The control circuit passes the current to the load in one direction by making the second switching element Q2 turn on and off and keeping the third switching element Q3 turned off in the meantime, while making the first and fourth switching elements Q1, Q4 turn on and off alternately, and also, the control circuit passes the current to the load in the reverse direction by making the third switching element Q3 turn on and off and keeping the second switching element turned off in the meantime, while making the first and fourth switching elements Q1, Q4 turn on and off alternately.

Figure 41:
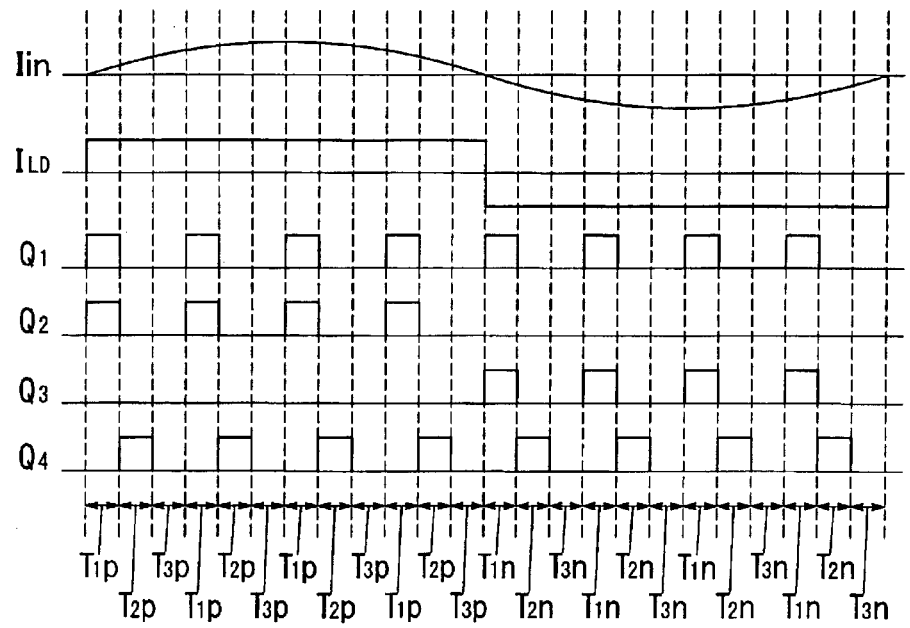
FIG. 41 is a time chart showing a control action of switching elements used in the above circuit.

The control circuit 1 can always pass the current to the load and the inductor, improving the harmonic distortion, namely, a power-factor, by controlling the first, second, third, and fourth switching elements Q1–Q4 to turn on and off in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. FIG. 41 shows a control system to control the switching elements Q1–Q4.

In a first pattern in the positive cycle, the first and second switching elements Q1, Q2 are turned on. In a second pattern, only the fourth switching element Q4 is turned on. In a third pattern, all the switching elements Q1–Q4 are turned off. In a first pattern in the negative cycle, the first and third switching elements Q1, Q3 are turned on, and in a second pattern, only the fourth switching element Q4 is turned on, and in a third pattern, all the switching elements Q1–Q4 are turned off. Each switching element is turned on and off at a frequency higher enough than the frequency of the AC source (50–60 Hz), for example, dozens several hundred kHz.

Figure 42A:
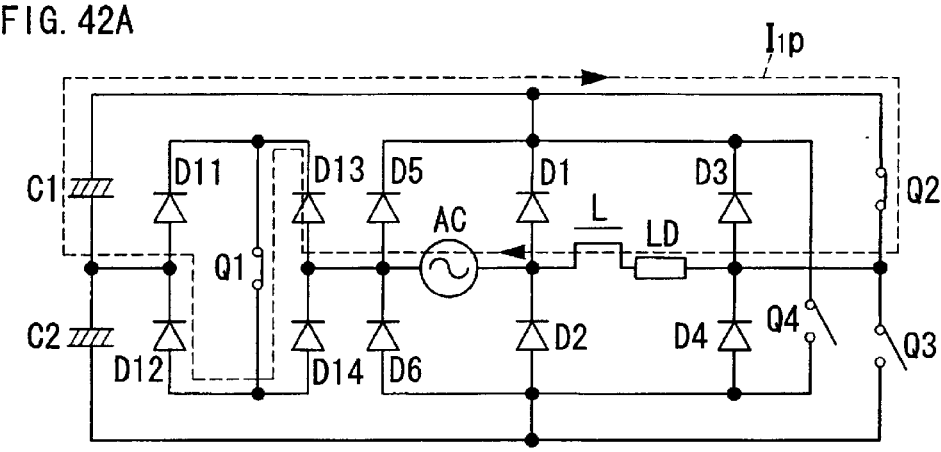
FIGS. 42A, 42B, and 42C are explanatory diagrams showing a pass of the current flowing through the above circuit when the switching elements are controlled in different on/off patterns over the positive half cycle of an AC source.
Figure 42B:
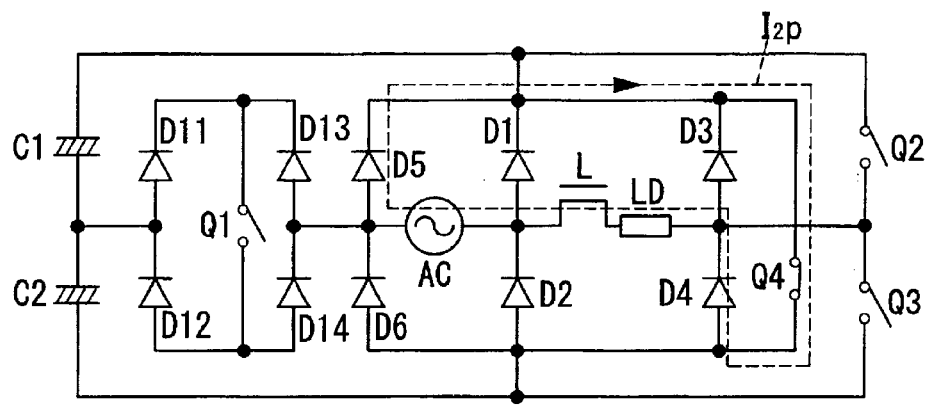
Figure 42C:
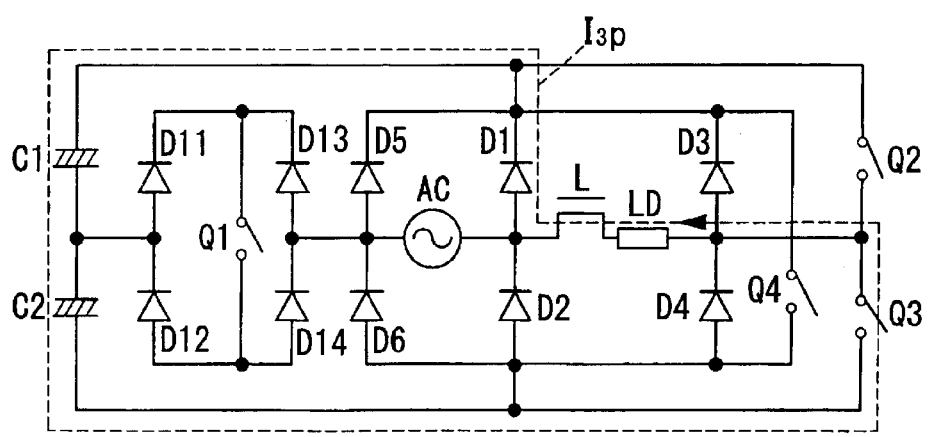

FIGS. 42A–42C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 42A, a current I1p flows increasingly through a closed loop; from the AC source to the AC source via the diode D13, the first switching element Q1, the diode D12, the smoothing capacitor C1, the second switching element Q2, the load LD, and the inductor L. The current I1p is accompanied by a discharging current from the smoothing capacitor C1. A simplified equivalent circuit in this period is shown in FIG. 4A.

In the second period T2p, as shown in FIG. 42B, a current I2p flows increasingly through a closed loop; from the AC source to the AC source via the fifth diode D5, the fourth switching element Q4, the fourth diode D4, the load LD, and the inductor L. The current I2p flows independently of a charge and a discharge of the smoothing capacitors C1, C2. A simplified equivalent circuit in this period is shown in FIG. 4B.

In the third period T3p, as shown in FIG. 42C, a current I3p flows decreasingly by back electromotive force of the inductor L through a closed loop; from the inductor L to the inductor L via the first diode D1, the smoothing capacitor C1, the smoothing capacitor C2, the parasitic diode of the third switching element Q3, and the load LD. The current I3p is accompanied by a charging current to the smoothing capacitors C1, C2. A simplified equivalent circuit in this period is a circuit in which the smoothing capacitor C1 of FIG. 4C was replaced by the series circuit of the smoothing capacitors C1 and C2.

Figure 43A:
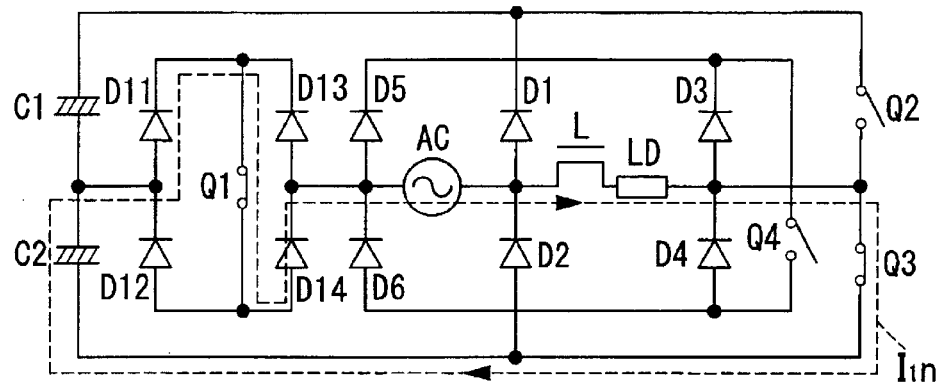
FIGS. 43A, 43B, and 43C are explanatory diagrams showing a pass of the current flowing through the above circuit when the switching elements are controlled in different on/off patterns over the negative half cycle of the AC source.
Figure 43B:
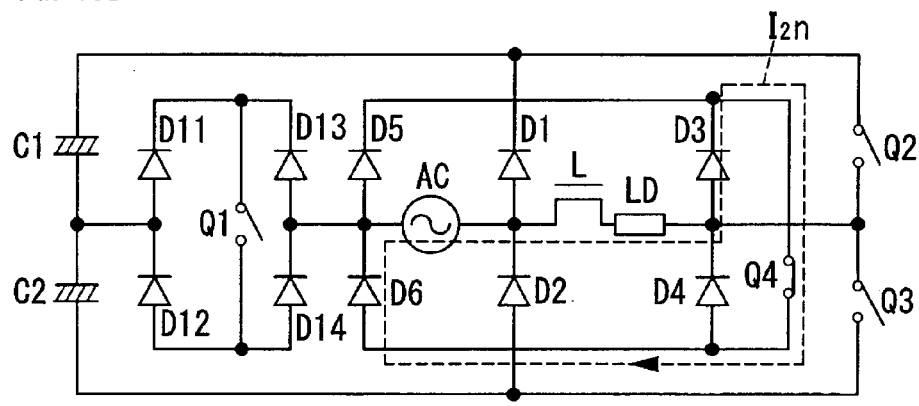
Figure 43C:
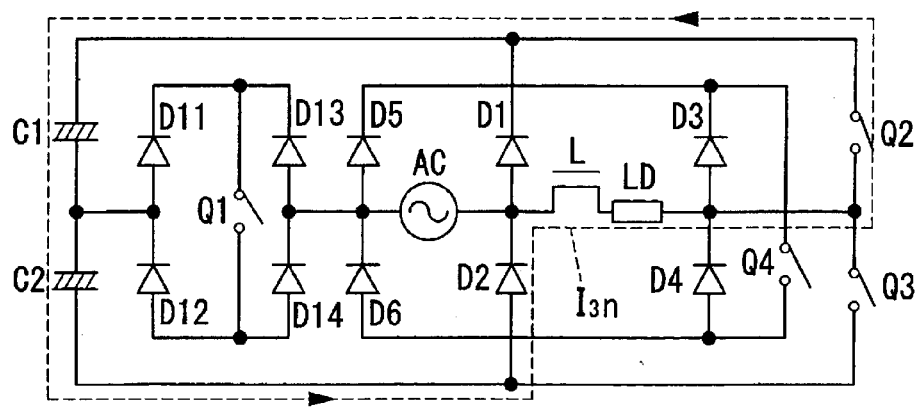
Figure 44:
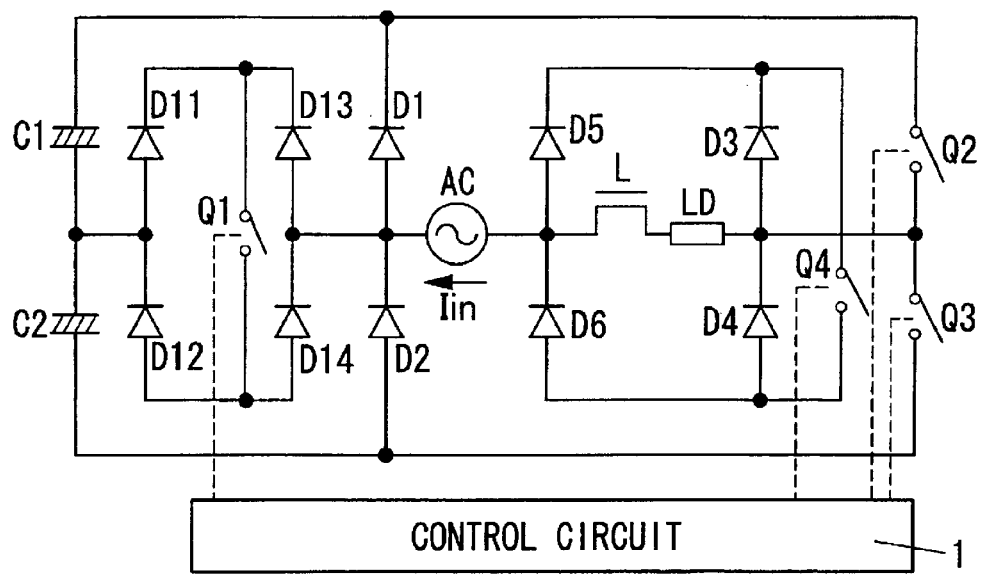
FIG. 44 is a circuit diagram of a power converter in accordance with a fourteenth embodiment of the present invention.

FIGS. 43A–43C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 43A, a current I1n flows increasingly through a closed loop; from the AC source to the AC source via the inductor L, the load LD, the third switching element Q3, the smoothing capacitor C2, the diode D11, the first switching element Q1, and the diode D14. The current I1n is accompanied by a discharging current from the smoothing capacitor C2. A simplified equivalent circuit in this period is a circuit in which the smoothing capacitor C1 of FIG. 4A was replaced by the smoothing capacitor C2.

In the second period T2n, as shown in FIG. 43B, a current I2n flows increasingly through a closed loop; from the AC source to the AC source via the inductor L, the load LD, the third diode D3, the fourth switching element Q4, and the sixth diode D6. The current I2n flows independently of a charge and a discharge of the smoothing capacitors C1, C2. A simplified equivalent circuit in this period is shown in FIG. 4B.

In the third period T3n, as shown in FIG. 43C, a current I3n flows decreasingly by back electromotive force of the inductor L through a closed loop; from the inductor L to the inductor L via the load LD, the parasitic diode of the second switching element Q2, the smoothing capacitor C1, the smoothing capacitor C2, and the diode D2. The current I3n is accompanied by a charging current to the smoothing capacitors C1, C2. A simplified equivalent circuit in this period is a circuit in which the smoothing capacitor C1 of FIG. 4C was replaced by the series circuit of the smoothing capacitors C1 and C2.

As shown in the above explanation, in each of the positive and negative cycles, a first current supplying mode in which the current flows through a loop including the AC source, the inductor L, and the load LD is given in the first and second period T1 and T2, and a second current supplying mode in which the current flows through a loop including the inductor L and the load LD but excluding the AC source is given in the third period T3. That is, the control circuit can improve a harmonic distortion (a power-factor) and limit the current to the load, always passing the current to the load and the inductor, by repeating the first current supplying mode and the second current supplying mode alternately.

Fourteenth Embodiment

A power converter in accordance with a fourteenth embodiment of the present invention will be explained based on FIGS. 44–47. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2. The first switching element Q1 and the second switching element Q2 are connected in series with the inductor L and the load LD across the AC source, and the first switching element Q1 and the third switching element Q3 are connected in series with the inductor L and the load LD across said AC source. A series circuit of a first diode D1 and a second diode D2 is connected across a series circuit of the second and third switching elements Q2, Q3. A series circuit of a first smoothing capacitor C1 and a second smoothing capacitor C2 is connected across a series circuit of the second and third switching elements Q2, Q3. A diode bridge D11–D14 is inserted between the connection point of the first smoothing capacitor C1 with the second smoothing capacitor C2 and one terminal of the AC source, and each input terminal of the diode bridge is connected to the connection point of the first smoothing capacitor C1 with the second smoothing capacitor C2 and the terminal of the AC source, respectively. The first switching element Q1 is connected between output terminals of the diode bridge D11–D14. The one terminal of the AC source is connected with the connection point of the first diode D1 with the second diode D2. A diode bridge D3–D6 is inserted between the connection point of the first diode D1 with the second diode D2 and the connection point of the second switching element Q2 with the third switching element Q3. The diode D3 is connected in series with said diode D4. The diode D5 is connected in series with the diode D6. The inductor L and the load LD are connected in series between the connection point of the diode D3 with the diode D4 and the connection point of the diode D5 with the diode D6. The fourth switching element Q4 is connected across a series circuit of the fifth diode D5 and the sixth diode D6. The second and third switching elements Q2 and Q3, each defined by FET, have a parasitic diode, respectively, which defines a bypass allowing a reverse current to flow across each switching element.

The control circuit 1 passes a current to the load in one direction by making the second switching element Q2 turn on and off and keeping the third switching element Q3 turned off in the meantime, while making the first and fourth switching element Q1, Q4 turn on and off alternately, and also, the control circuit passes the current to the load in the reverse direction by making the third switching element Q3 turn on and off and keeping the second switching element Q2 turned off in the meantime, while making the first and fourth switching elements Q1, Q4 turn on and off alternately.

Figure 45:
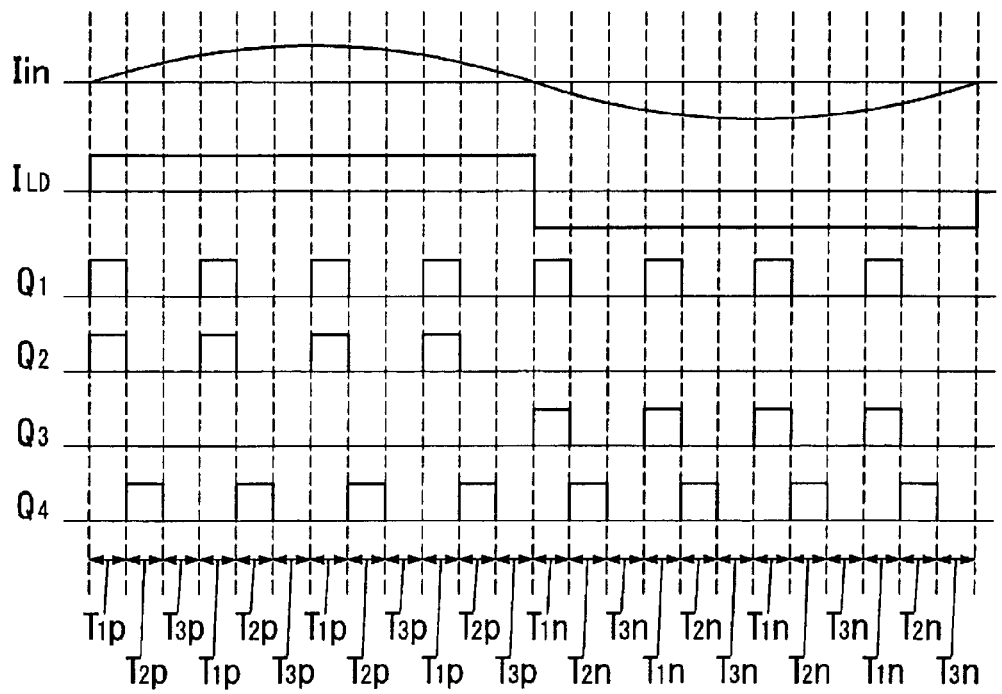
FIG. 45 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 to turn on and off in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. A control system to control the switching elements Q1–Q4 is shown in FIG. 45.

In a first pattern in the positive cycle, the first and second switching elements Q1, Q2 are turned on. In a second pattern, only the fourth switching element Q4 is turned on. In a third pattern, all the switching elements Q1–Q4 are turned off. In a first pattern in the negative cycle, the first and third switching elements Q1, Q3 are turned on, and in a second pattern, only the fourth switching element Q4 is turned on, and in a third pattern, all the switching elements Q1–Q4 are turned off. Each switching element is turned on and off at a frequency higher enough than the frequency of the AC source (50–60 Hz), for example, dozens several hundred kHz.

Figure 46A:
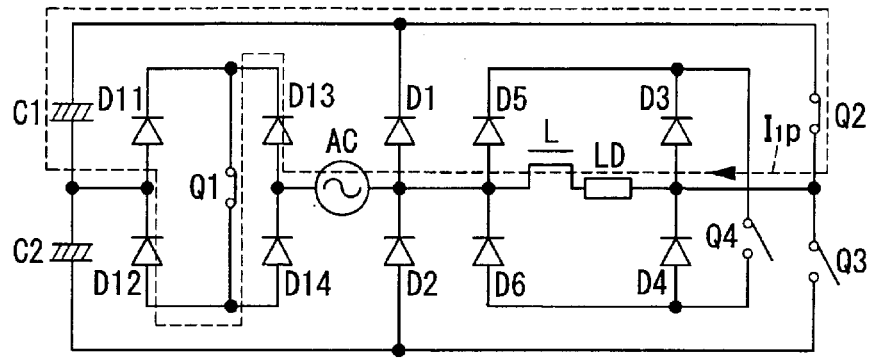
FIGS. 46A, 46B, and 46C are explanatory diagrams showing a pass of the current flowing through the above circuit when the switching elements are controlled in different on/off patterns over the positive half cycle of the AC source.
Figure 46B:
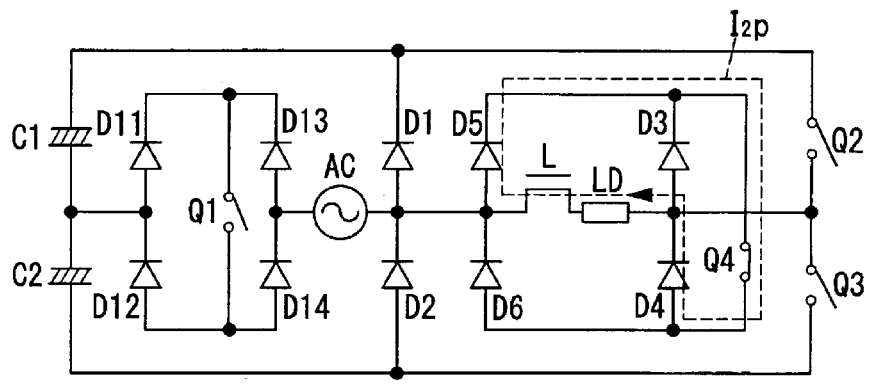
Figure 46C:
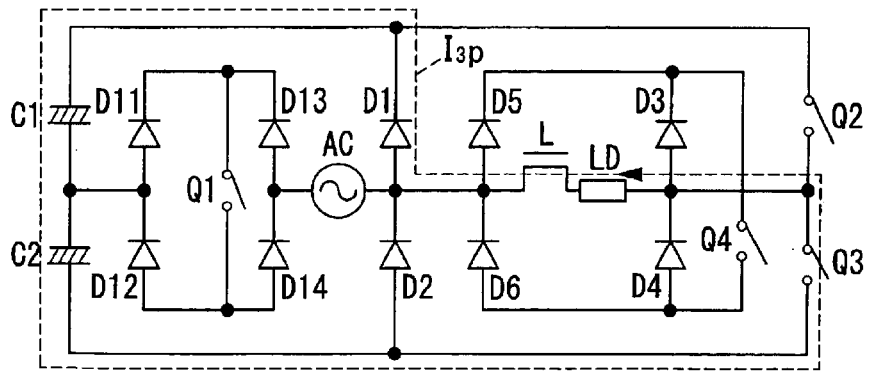

FIGS. 46A–46C show a current which flows through the circuit in a first period T1$p$ controlled based on the first pattern in the positive cycle, in a second period T2$p$ controlled based on the second pattern in the positive cycle, and in a third period T3$p$ controlled based on the third pattern in the positive cycle, respectively. In the first period T1$p$, as shown in FIG. 46A, a current I1$p$ flows increasingly through a closed loop; from the AC source to the AC source via the diode D13, the first switching element Q1, the diode D12, the smoothing capacitor C1, the second switching element Q2, the load LD, and the inductor L. The current I1$p$ is accompanied by a discharging current from the smoothing capacitor C1. A simplified equivalent circuit in this period is shown in FIG. 16A.

In the second period T2$p$, as shown in FIG. 46B, a current I2$p$ flows decreasingly by back electromotive force of the inductor L through a closed loop; from the inductor L to the inductor L via the fifth diode D5, the fourth switching element Q4, the diode D4, and the load LD. The current I2$p$ flows independently of a charge and a discharge of the smoothing capacitors C1 and C2. A simplified equivalent circuit in this period is shown in FIG. 16B.

In the third period T3$p$, as shown in FIG. 46C, a current I3$p$ flows decreasingly by back electromotive force of the inductor L through a closed loop; from the inductor L to the inductor L via the diode D1, the smoothing capacitor C1, the smoothing capacitor C2, the parasitic diode of the third switching element Q3, and the load LD. The current I3$p$ is accompanied by a charging current to the smoothing capacitors C1 and C2. A simplified equivalent circuit in this period is a circuit in which the smoothing capacitor C1 of FIG. 16C was replaced by the series circuit of the smoothing capacitors C1 and C2.

Figure 47A:
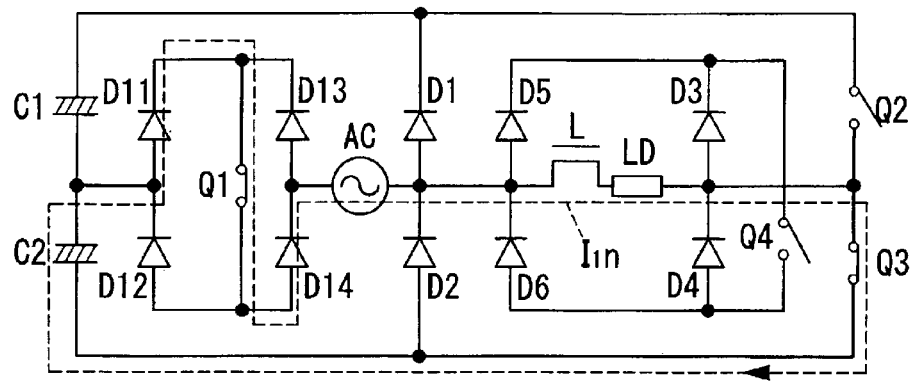
FIGS. 47A, 47B, and 47C are explanatory diagrams showing a pass of the current flowing through the above circuit when the switching elements are controlled in different on/off patterns over the negative half cycle of the AC source.
Figure 47B:
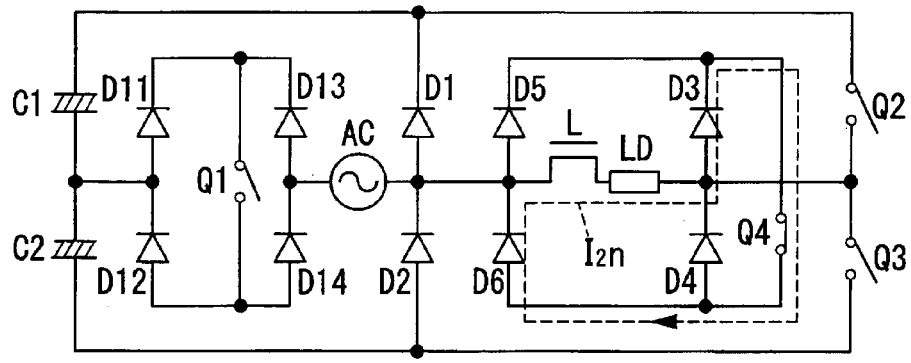
Figure 47C:
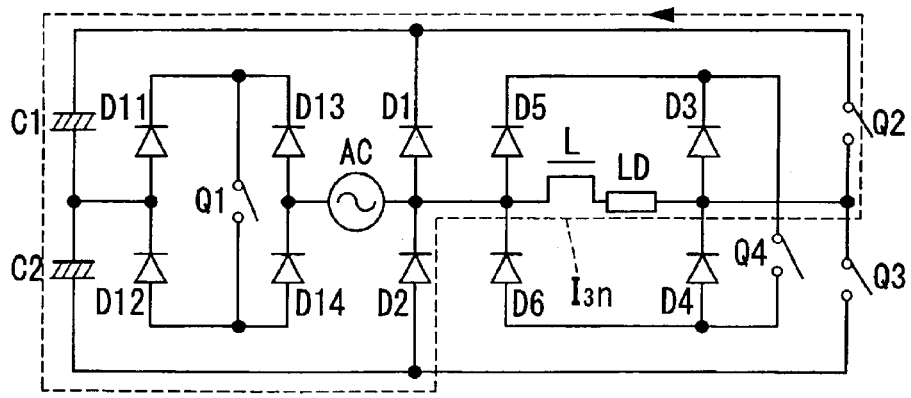
Figure 48:
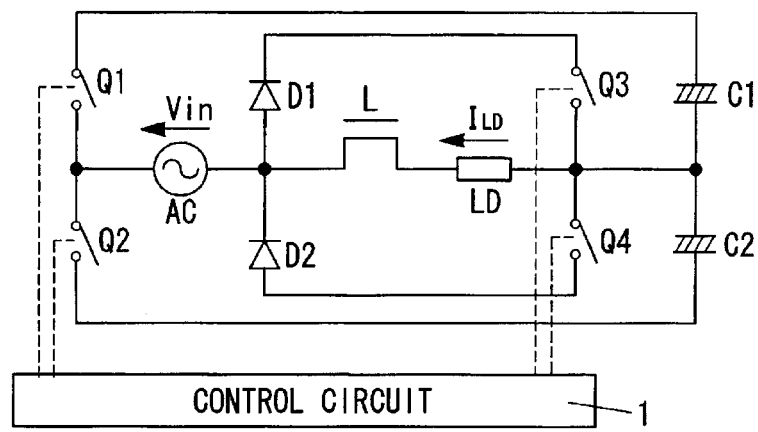
FIG. 48 is a circuit diagram of a power converter in accordance with a fifteenth embodiment of the present invention.

FIGS. 47A–47C show a current which flows through the circuit in a first period T1$n$ controlled based on the first pattern in the negative cycle, in a second period T2$n$ controlled based on the second pattern in the negative cycle, and in a third period T3$n$ controlled based on the third pattern in the negative cycle, respectively. In the first period T1$n$, as shown in FIG. 47A, a current I1$n$ flows increasingly through a closed loop; from the AC source to the AC source via the inductor L, the load LD, the third switching element Q3, the smoothing capacitor C2, the diode D11, the first switching element Q1, and the diode D14. The current I1$n$ is accompanied by a discharging current from the smoothing capacitor C2. A simplified equivalent circuit in this period is a circuit in which the smoothing capacitor C1 of FIG. 16A was replaced by the smoothing capacitor C2.

In the second period T2$n$, as shown in FIG. 47B, a current I2$n$ flows decreasingly by back electromotive force of the inductor L through a closed loop; from the inductor L to the inductor L via the load LD, the third diode D3, the fourth switching element Q4, and the diode D6. The current I2$n$ flows independently of a charge and a discharge of the smoothing capacitors C1 and C2. A simplified equivalent circuit in this period is shown in FIG. 16B.

In the third period T3n, as shown in FIG. 47C, a current I3n flows decreasingly by back electromotive force of the inductor L through a closed loop; from the inductor L to the inductor L via the load LD, the parasitic diode of the second switching element Q2, the smoothing capacitor C1, the smoothing capacitor C2, and the diode D2. The current I3n is accompanied by a charging current to the smoothing capacitors C1 and C2. A simplified equivalent circuit in this period is a circuit in which the smoothing capacitor C1 of FIG. 16C was replaced by the series circuit of the smoothing capacitors C1 and C2.

As shown in the above explanation, in each of the positive cycle and negative cycle, a first current supplying mode in which the current flows through a loop including the AC source, the inductor L, and the load LD is given in the first period T1, and a second current supplying mode in which the current flows through a loop including the inductor L and the load LD but excluding the AC source is given in the second and third periods T2, T3. That is, the control circuit can improve a harmonic distortion (a power-factor) and limit the current to the load, always passing the current to the load and the inductor, by repeating the first current supplying mode and the second current supplying mode alternately.

Fifteenth Embodiment

A power converter in accordance with a fifteenth embodiment of the present invention will be explained based on FIGS. 48–51. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2.

The first switching element Q1 and a first smoothing capacitor C1 are connected in series with the inductor L and the load LD across the AC source, and the second switching element Q2 and a second smoothing capacitor C2 are connected in series with the inductor L and the load LD across the AC source. The first and second switching elements Q1, Q2 are connected in series, and a series circuit of the first and second smoothing capacitors C1, C2 is connected across the series circuit of the first and second switching elements Q1, Q2. A first diode D1 and the third switching element Q3 are connected in series across a series circuit of the inductor L and said load LD, and a second diode D2 and the fourth switching element Q4 are connected in series across the series circuit of the inductor L and the load LD. A series circuit of the third switching element Q3 and the fourth switching element Q4 is connected across a series circuit of the first and second diodes D1, D2, and the AC source is inserted between the connection point of the first switching element Q1 with the second switching element Q2 and the connection point of the first diode D1 with the second diode D2.

The control circuit 1 passes the current to the load in one direction by making the second and third switching elements Q2, Q3 turn off while making the first and fourth switching elements Q1, Q4 turn on and off alternately. And also, the control circuit passes the current to the load in the reverse direction by making the first and fourth switching elements Q1, Q4 turn off while making the second and third switching elements Q2, Q3 turn on and off alternately. The first and second switching elements Q1 and Q2, each defined by FET, have a parasitic diode, respectively, which defines a bypass allowing a reverse current to flow across each switching element.

Figure 49:
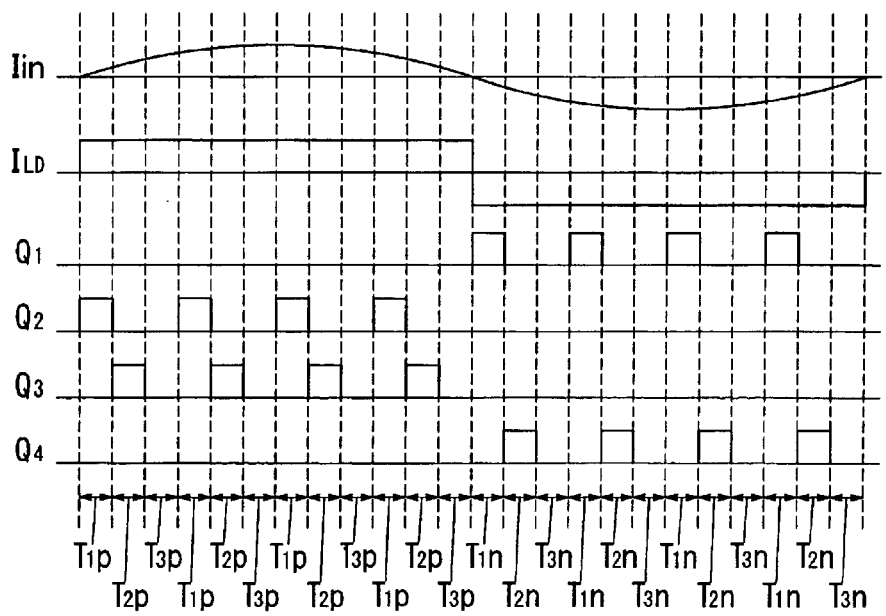
FIG. 49 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 to turn on and off in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. A control system to control the switching elements Q1–Q4 is shown in FIG. 49.

In a first pattern in the positive cycle, only the second switching element Q2 is turned on. In a second pattern, only the third switching element Q3 is turned on. In a third pattern, all the switching elements Q1–Q4 are turned off. In a first pattern in the negative cycle, only the first switching element Q1 is turned on, and in a second pattern, only the fourth switching element Q4 is turned on, and in a third pattern, all the switching elements Q1–Q4 are turned off. Each switching element is turned on and off at a frequency higher enough than the frequency of the AC source (50–60 Hz), for example, dozens—several hundred kHz.

Figure 50A:
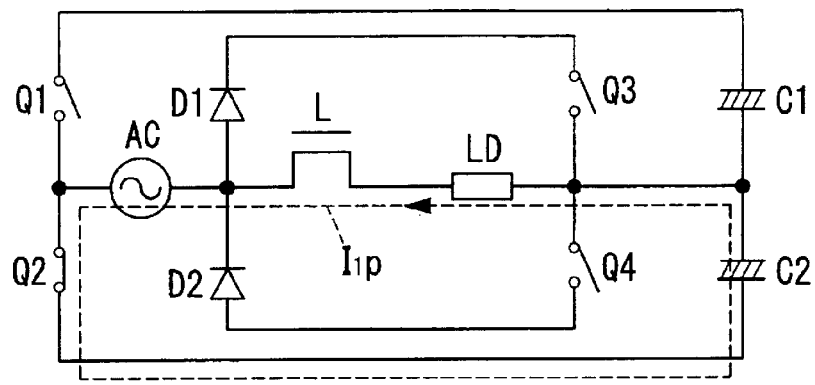
FIGS. 50A, 50B, and 50C are explanatory diagrams showing a pass of the current flowing through the above circuit when the switching elements are controlled in different on/off patterns over the positive half cycle of the AC source.
Figure 50B:
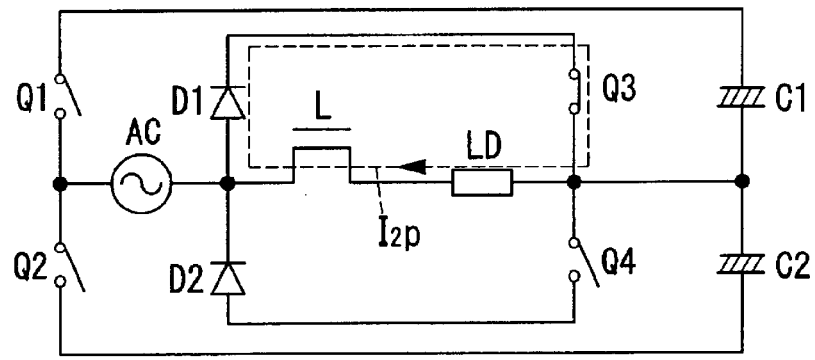
Figure 50C:
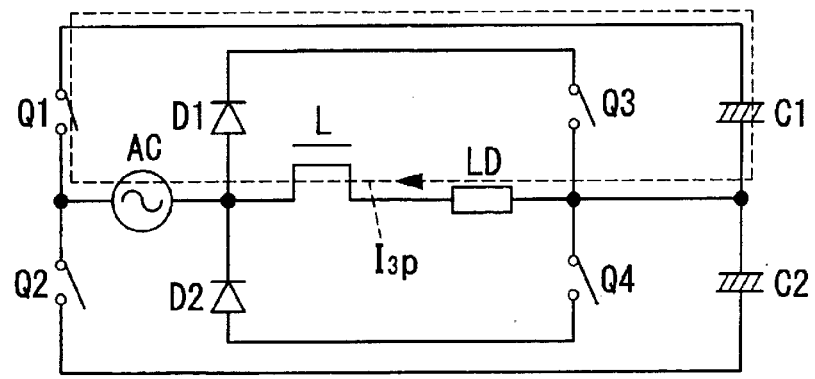

FIGS. 50A–50C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 50A, a current I1 flows increasingly through a closed loop; from the AC source to the AC source via the second switching element Q2, the second smoothing capacitor C2, the load LD, and the inductor L. The current I1 is accompanied by a discharging current from the second smoothing capacitor C2. A simplified equivalent circuit in this period is a circuit in which the smoothing capacitor C1 of FIG. 8A was replaced by the second smoothing capacitor C2.

In the second period T2p, as shown in FIG. 50B, a current I2p flows decreasingly by back electromotive force of the inductor L through a closed loop; from the inductor L to the inductor L via the first diode D1, the third switching element Q3, and the load LD. The current I2p flows independently of a charge and a discharge of the smoothing capacitors C1 and C2. A simplified equivalent circuit in this period is shown in FIG. 8B.

In the third period T3p, as shown in FIG. 50C, a current I3p flows decreasingly through a closed loop; from the AC source to the AC source via the parasitic diode of the first switching element Q1, the first smoothing capacitor C1, the load LD, and the inductor L. The current I3p is accompanied by a charging current to the first smoothing capacitor C1. A simplified equivalent circuit in this period is shown in FIG. 8C.

Figure 51A:
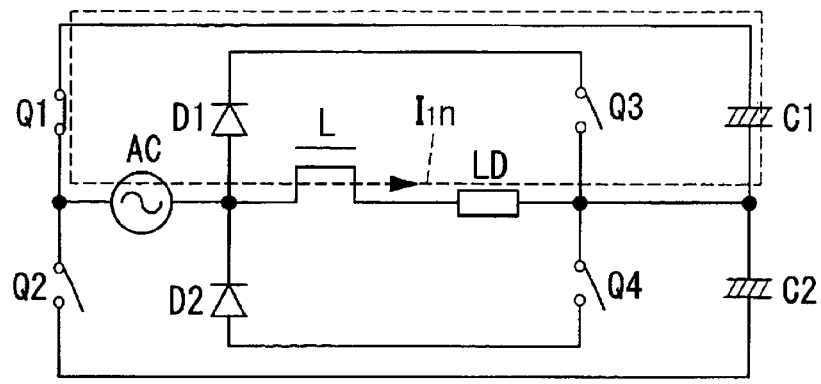
FIGS. 51A, 51B, and 51C are explanatory diagrams showing a pass of the current flowing through the above circuit when the switching elements are controlled in different on/off patterns over the negative half cycle of the AC source.
Figure 51B:
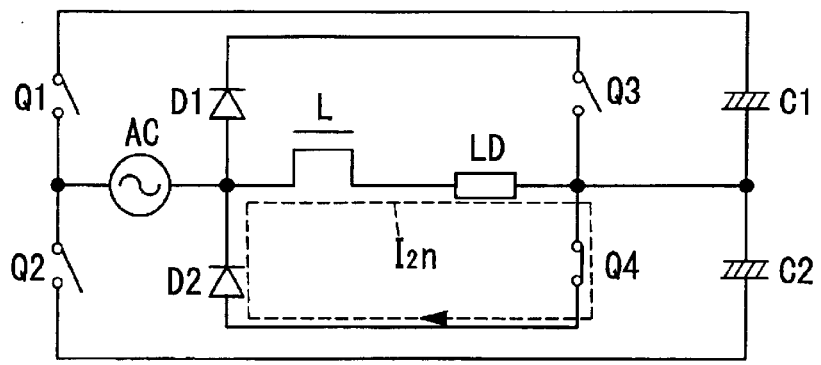
Figure 51C:
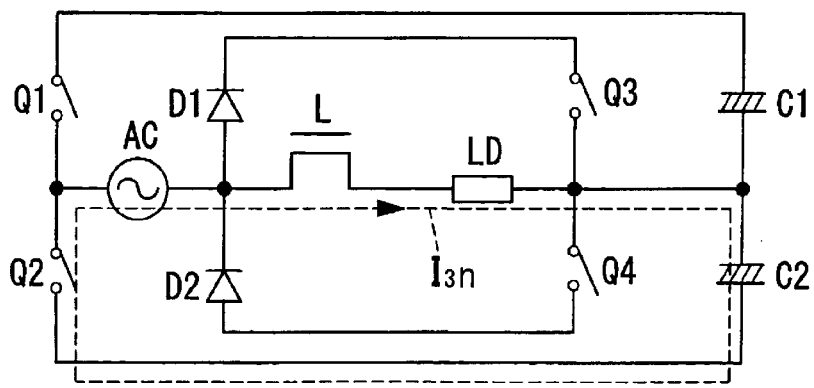
Figure 52:
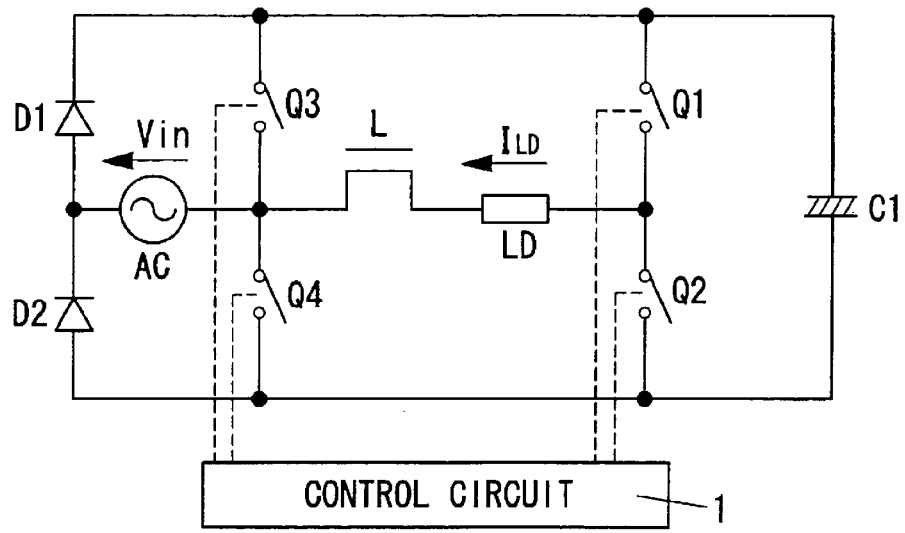
FIG. 52 is a circuit diagram of a power converter in accordance with a sixteenth embodiment of the present invention.

FIGS. 51A–51C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 51A, a current I1n flows increasingly through a closed loop; from the AC source to the AC source via the inductor L, the load LD, the first smoothing capacitor C1, and the first switching element Q1. The current I1n is accompanied by a discharging current from the first smoothing capacitor C1. A simplified equivalent circuit in this period is shown in FIG. 8A.

In the second period T2n, as shown in FIG. 51B, a current I2n flows decreasingly by back electromotive force of the inductor L through a closed loop; from the inductor L to the inductor L via the load LD, the fourth switching element Q4, and the second diode D2. The current I2n flows independently of a charge and a discharge of the smoothing capacitors C1 and C2. A simplified equivalent circuit in this period is shown in FIG. 8B.

In the third period T3n, as shown in FIG. 51C, a current I3n flows decreasingly through a closed loop; from the AC source to the AC source via the inductor L, the load LD, the second smoothing capacitor C2, and the parasitic diode of the second switching element Q2. The current I3p is accompanied by a charging current to the second smoothing capacitor C2. A simplified equivalent circuit in this period is a circuit in which the smoothing capacitor C1 of FIG. 8C was replaced by the second smoothing capacitor C2.

As shown in the above explanation, in each of the positive cycle and negative cycle, a first current supplying mode in which the current flows through a loop including the AC source, the inductor L, and the load LD is given in the first and third periods T1, T3, and a second current supplying mode in which the current flows through a loop including the inductor L and the load LD but excluding the AC source is given in the second period T2. That is, the control circuit can improve a harmonic distortion (a power-factor) and limit the current to the load, always passing the current to the load and the inductor, by repeating the first current supplying mode and the second current supplying mode alternately.

Sixteenth Embodiment

A power converter in accordance with a sixteenth embodiment of the present invention will be explained based on FIGS. 52–55. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2.

The first switching element Q1 and a first diode D1 are connected in series with the inductor L and the load LD across the AC source, the second switching element Q2 and a second diode D2 are connected in series with the inductor L and the load LD across the AC source. The first and second switching elements Q1, Q2 are connected in series, and a series circuit of the first and second diodes D1, D2 and a smoothing capacitor C1 are connected across the series circuit of the first and second switching elements Q1, Q2. A series circuit of the third and fourth switching elements Q3, Q4 is connected across a series circuit of the first and second switching element Q1, Q2. The AC source is inserted between the connection point of the first diode D1 with the second diode D2 and the connection point of the third switching element Q3 with the fourth switching element Q4. The inductor L and the load LD are inserted in series between the connection point of the first switching element Q1 with the second switching element Q2 and the connection point of the third switching element Q3 with the fourth switching element Q4. The first and second switching elements Q1 and Q2, each defined by FET, have a parasitic diode, respectively, which defines a bypass allowing a reverse current to flow across each switching element.

The control circuit 1 passes the current to the load in one direction by making the second and third switching elements Q2, Q3 turn off while making the first and fourth switching elements Q1, Q4 turn on and off. And also, the control circuit passes the current to the load in the reverse direction by making the first and fourth switching elements Q1, Q4 turn off while making the second and third switching elements Q2, Q3 turn on and off.

Figure 53:
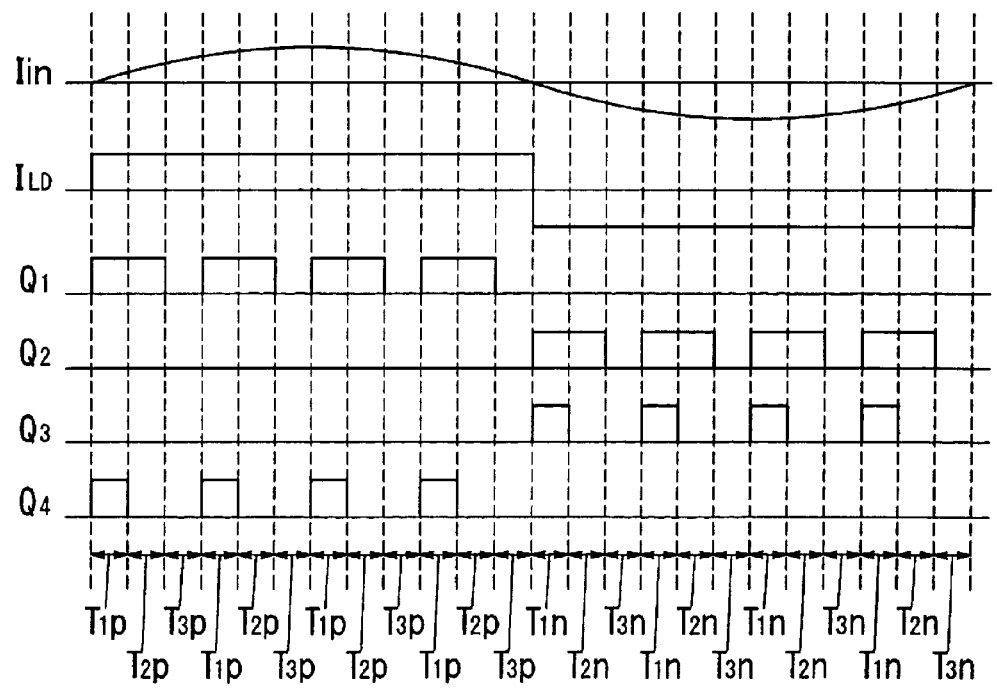
FIG. 53 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. FIG. 53 shows a control system to control the switching elements Q1–Q4.

In a first pattern in the positive cycle, the first and fourth switching elements Q1, Q4 are turned on. In a second pattern, only the first switching element Q1 is turned on. In a third pattern, all the switching elements Q1–Q4 are turned off. In a first pattern in the negative cycle, the second and third switching elements Q2, Q3 are turned on, and in a second pattern, only the second switching element Q2 is turned on, and in a third pattern, all the switching elements Q1–Q4 are turned off. Each switching element is turned on and off at a frequency higher enough than the frequency of the AC source (50–60 Hz), for example, dozens—several hundred kHz.

Figure 54A:
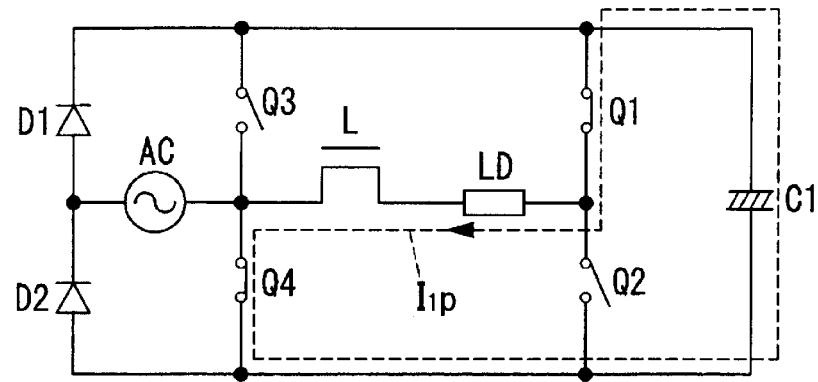
FIGS. 54A, 54B, and 54C are explanatory diagrams showing a pass of the current flowing through the above circuit when the switching elements are controlled in different on/off patterns over the positive half cycle of the AC source.
Figure 54B:
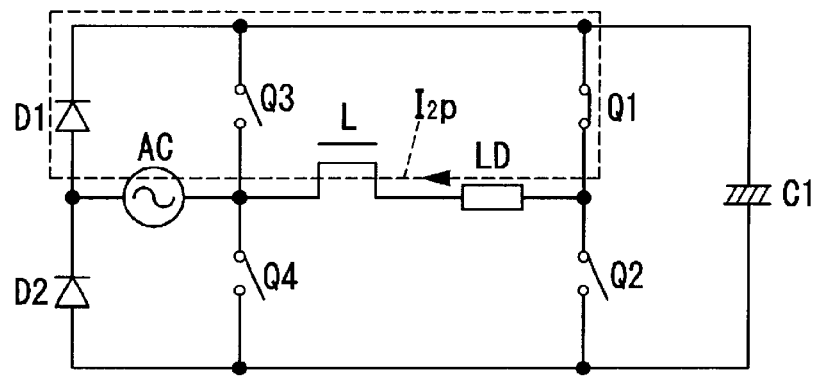
Figure 54C:
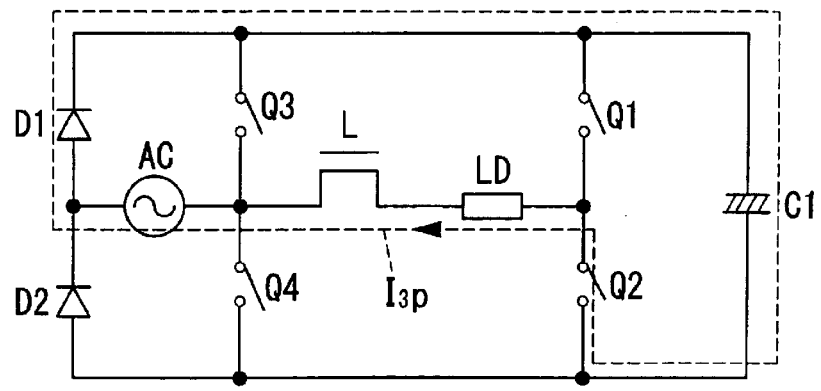

FIGS. 54A–54C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 54A, a current I1p flows increasingly through a closed loop; from the smoothing capacitor C1 to the smoothing capacitor C1 via the first switching element Q1, the load LD, the inductor L, and the fourth switching element Q4. The current I1p is accompanied by a discharging current from the smoothing capacitor C1. A simplified equivalent circuit in the first period is shown in FIG. 12A.

In the second period T2p, as shown in FIG. 54B, a current I2p flows increasingly through a closed loop; from the AC source to the AC source via the first diode D1, the first switching element Q1, the load LD, and the inductor L. The current I2p flows independently of a charge and a discharge of the smoothing capacitor C1. A simplified equivalent circuit in the second period is shown in FIG. 12B.

In the third period T3p, as shown in FIG. 54C, a current I3p flows decreasingly through a closed loop; from the AC source to the AC source via the first diode D1, the smoothing capacitor C1, the parasitic diode of the second switching element Q2, the load LD, and the inductor L. The current I3p is accompanied by a charging current to the smoothing capacitor C1. A simplified equivalent circuit in this period is shown in FIG. 12C.

Figure 55A:
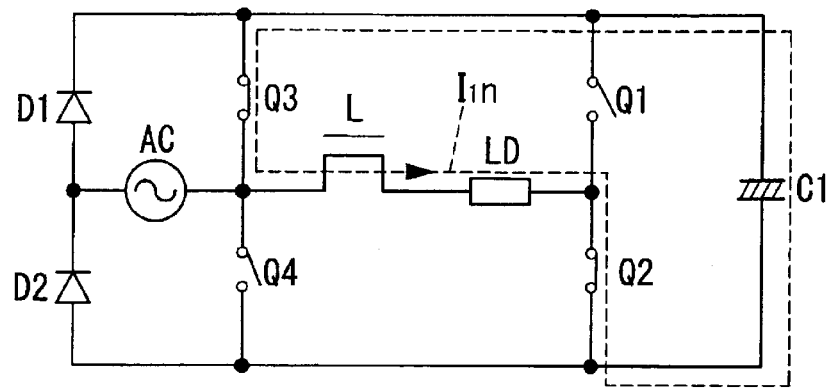
FIGS. 55A, 55B, and 55C are explanatory diagrams showing a pass of the current flowing through the above circuit when the switching elements are controlled in different on/off patterns over the negative half cycle of the AC source.
Figure 55B:
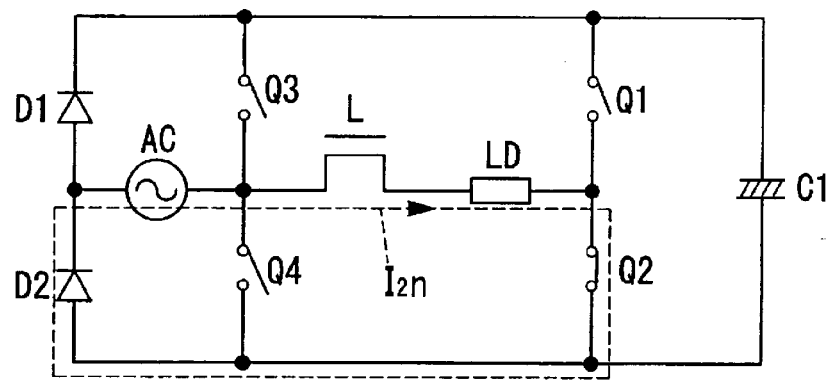
Figure 55C:
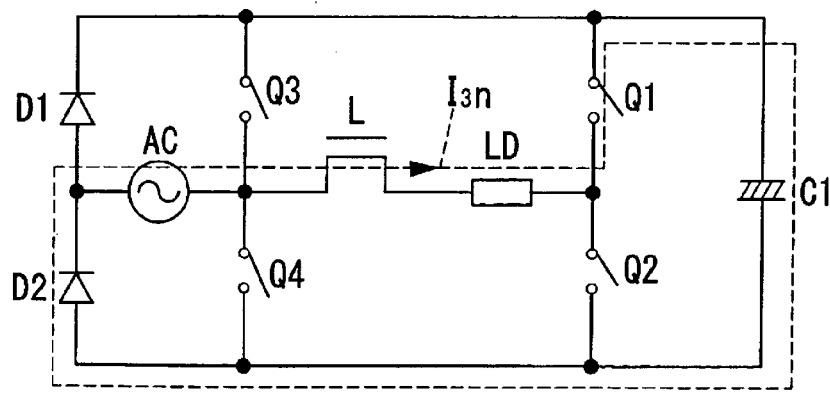
Figure 56:
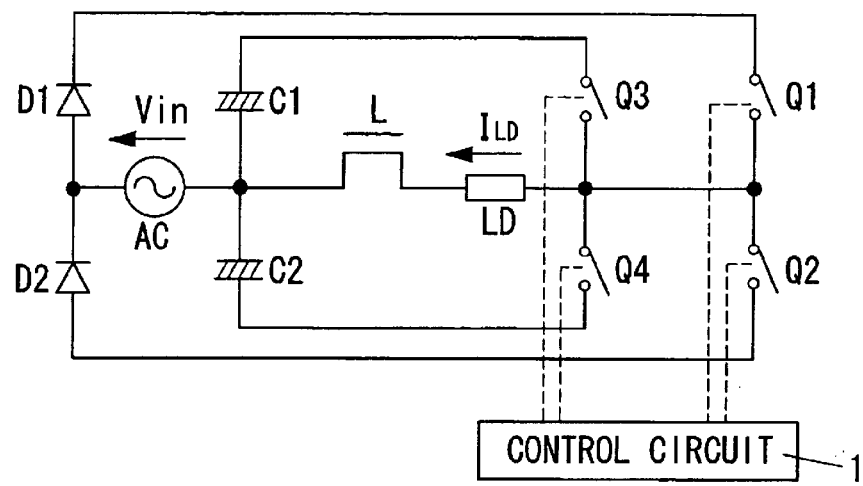
FIG. 56 is a circuit diagram of a power converter in accordance with a seventeenth embodiment of the present invention.

FIGS. 55A–55C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 55A, a current I1n flows increasingly through a closed loop; from the smoothing capacitor C1 to the smoothing capacitor C1 via the third switching element Q3, the inductor L, the load LD, and the second switching element Q2. The current I1n is accompanied by a discharging current from the smoothing capacitor C1. A simplified equivalent circuit in the first period is shown in FIG. 12A.

In the second period T2n, as shown in FIG. 55B, a current I2n flows increasingly through a closed loop; from the AC source to the AC source via the inductor L, the load LD, the second switching element Q2, and the second diode D2. The current I2n flows independently of a charge and a discharge of the smoothing capacitor C1. A simplified equivalent circuit in the second period is shown in FIG. 12B.

In the third period T3n, as shown in FIG. 55C, a current I3n flows decreasingly through a closed loop; from the AC source to the AC source via the inductor L, the load LD, the parasitic diode of the first switching element Q1, the smoothing capacitor C1, and the second diode D2. The current I3n is accompanied by a charging current to the smoothing capacitor C1. A simplified equivalent circuit in this period is shown in FIG. 12C.

As shown in the above explanation, in each of the positive cycle and negative cycle, a first current supplying mode in which the current flows through a loop including the AC source, the inductor L, and the load LD is given in the second and third periods T2, T3, and a second current supplying mode in which the current flows through a loop including the inductor L and the load LD but excluding the AC source is given in the first period T1. That is, the control circuit can improve a harmonic distortion (a power-factor) and limit the current to the load, always passing the current to the load and the inductor, by repeating the first current supplying mode and the second current supplying mode alternately.

Seventeenth Embodiment

A power converter in accordance with a seventeenth embodiment of the present invention will be explained based on FIGS. 56–59. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2.

A first diode D1 and the first switching element Q1 are connected in series with the inductor L and the load LD across the AC source, and the second switching element Q2 and a second diode D2 are connected in series with the inductor L and the load LD across the AC source. The first and second switching elements Q1, Q2 are connected in series, and the series circuit is connected across a series circuit of the first diode D1 and the second diode D2. The first smoothing capacitor C1 and the third switching element Q3 are connected in series across a series circuit of the inductor L and the load LD. The fourth switching element Q4 and the second smoothing capacitor C2 are connected in series across the series circuit of the inductor L and the load LD. The first and second smoothing capacitors C1, C2 are connected in series, and the series circuit of the first and second smoothing capacitor is connected across a series circuit of the third and fourth switching elements Q3, Q4. The AC source is connected between the connection point of the first diode D1 with the second diode D2 and the connection point of the first smoothing capacitor C1 with the second smoothing capacitor C2. The third and fourth switching elements Q3 and Q4, each defined by FET, have a parasitic diode, respectively, which defines a bypass allowing a reverse current to flow across each switching element.

The control circuit 1 passes the current to the load in one direction by making the second and fourth switching elements Q2, Q4 turn off while making the first and third switching elements Q1, Q3 turn on and off alternately. And also, the control circuit passes the current to the load in the reverse direction by making the first and third switching elements Q1, Q3 turn off while making the second and fourth switching elements Q2, Q4 turn on and off alternately.

Figure 57:
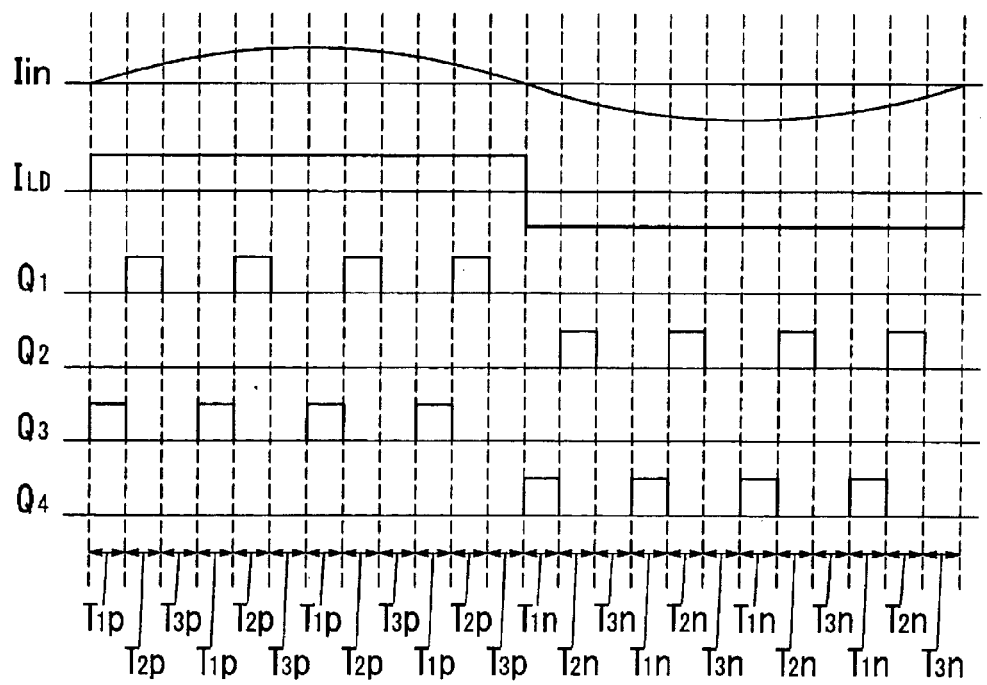
FIG. 57 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. A control system to control the switching elements Q1–Q4 is shown in FIG. 57.

In a first pattern in the positive cycle, only the third switching element Q3 is turned on. In a second pattern, only the first switching element Q1 is turned on. In a third pattern, all the switching elements Q1–Q4 are turned off. In a first pattern in the negative cycle, only the fourth switching element Q4 is turned on, and in a second pattern, only the second switching element Q2 is turned on, and in a third pattern, all the switching elements Q1–Q4 are turned off. Each switching element is turned on and off at a frequency higher enough than the frequency of the AC source (50–60 Hz), for example, dozens—several hundred kHz.

Figure 58A:
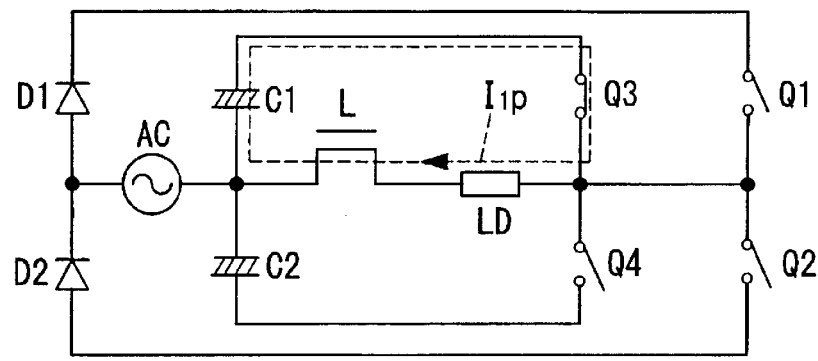
FIGS. 58A, 58B, and 58C are explanatory diagrams showing a pass of the current flowing through the above circuit when the switching elements are controlled in different on/off patterns over the positive half cycle of the AC source.
Figure 58B:
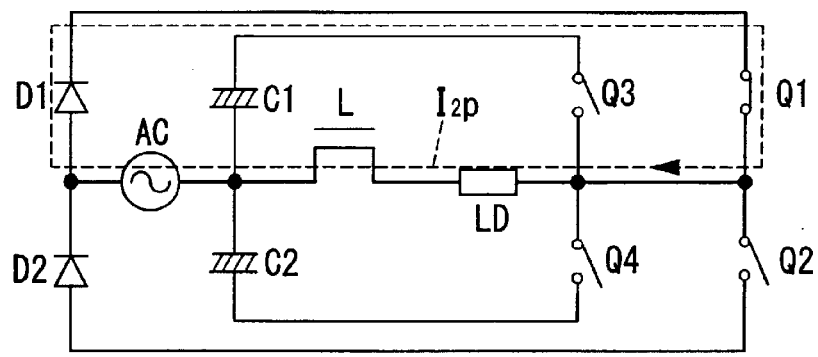
Figure 58C:
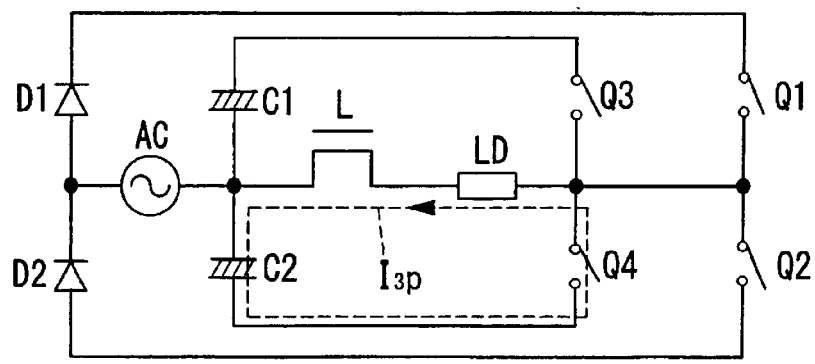

FIGS. 58A–58C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 58A, a current I1p flows increasingly through a closed loop; from the smoothing capacitor C1 to the smoothing capacitor C1 via the third switching element Q3, the load LD, and the inductor L. The current I1p is accompanied by a discharging current from the smoothing capacitor C1. A simplified equivalent circuit in this period is shown in FIG. 20A.

In the second period T2p, as shown in FIG. 58B, a current I2p flows increasingly through a closed loop; from the AC source to the AC source via the first diode D1, the first switching element Q1, the load LD, and the inductor L. The current I2p flows independently of a charge and a discharge of the smoothing capacitor C1. A simplified equivalent circuit in this period is shown in FIG. 20B.

In the third period T3p, as shown in FIG. 58C, a current I3p flows decreasingly by back electromotive force of the inductor L through a closed loop; from the inductor L to the inductor L via the second smoothing capacitor C2, the parasitic diode of the fourth switching element Q4, and the load LD. The current I3p is accompanied by a charging current to the second smoothing capacitor C2. A simplified equivalent circuit in this period is a circuit in which the smoothing capacitor C1 of FIG. 20C was replaced by the second smoothing capacitor C2.

Figure 59A:
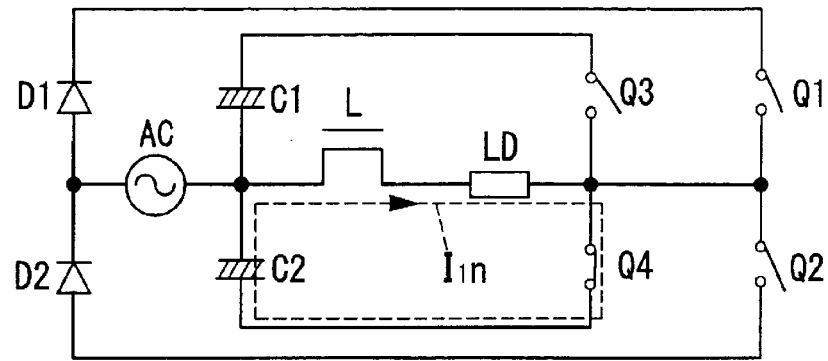
FIGS. 59A, 59B, and 59C are explanatory diagrams showing a pass of the current flowing through the above circuit when the switching elements are controlled in different on/off patterns over the negative half cycle of the AC source.
Figure 59B:
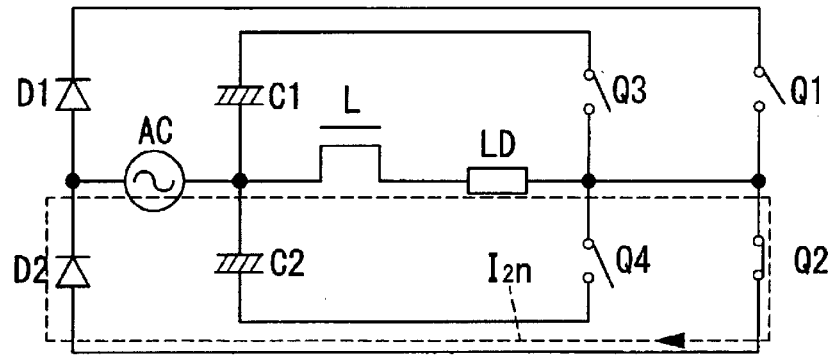
Figure 59C:
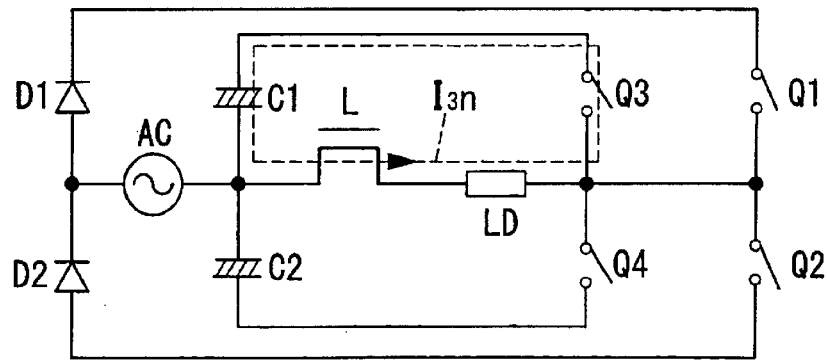
Figure 60:
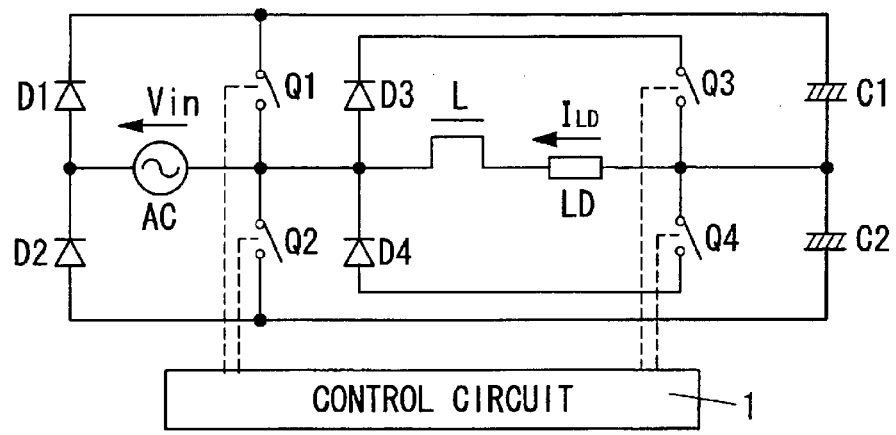
FIG. 60 is a circuit diagram of a power converter in accordance with an eighteenth embodiment of the present invention.

FIGS. 59A–59C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 59A, a current I1n flows increasingly through a closed loop; from the smoothing capacitor C2 to the smoothing capacitor C2 via the inductor L, the load LD, and the fourth switching element Q4. The current I1n is accompanied by a discharging current from the smoothing capacitor C2. A simplified equivalent circuit in this period is a circuit in which the smoothing capacitor C1 of FIG. 20A was replaced by the second smoothing capacitor C2.

In the second period T2n, as shown in FIG. 59B, a current I2n flows increasingly through a closed loop; from the AC source to the AC source via the inductor L, the load LD, the second switching element Q2, and the second diode D2. The current I2n flows independently of a charge and a discharge of the smoothing capacitors C1, C2. A simplified equivalent circuit in this period is shown in FIG. 20B.

In the third period T3n, as shown in FIG. 59C, a current I3n flows decreasingly by back electromotive force of the inductor L through a closed loop; from the inductor L to the inductor L via the load LD, the parasitic diode of the third switching element Q3, and the first smoothing capacitor C1. The current I3n is accompanied by a charging current to the first smoothing capacitor C1. A simplified equivalent circuit in this period is shown in FIG. 20C.

As shown in the above explanation, in each of the positive cycle and negative cycle, a first current supplying mode in which the current flows through a loop including the AC source, the inductor L, and the load LD is given in the second period T2, and a second current supplying mode in which the current flows through a loop including the inductor L and the load LD but excluding the AC source is given in the first and third periods T1, T3. That is, the control circuit can improve a harmonic distortion (a power-factor) and limit the current to the load, always passing the current to the load and the inductor, by repeating the first current supplying mode and the second current supplying mode alternately.

Eighteenth Embodiment

A power converter in accordance with an eighteenth embodiment of the present invention will be explained based on FIGS. 60–63. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2.

A first diode D1 and a first smoothing capacitor C1 are connected in series with the inductor L and the load LD across the AC source, and a second diode D2 and a second smoothing capacitor C2 are connected in series with the inductor L and the load LD across the AC source. The first smoothing capacitor D1 and the second diode D2 are connected in series, and the series circuit of the first and second smoothing capacitors are connected across a series circuit of the first smoothing capacitor C1 and the second smoothing capacitor C2. A series circuit of the first and second switching elements Q1, Q2 is connected across a series circuit of the first and second diodes D1, D2. A series circuit of a third diode D3 and the third switching element Q3 is connected across a series circuit of the inductor L and the load LD, and a series circuit of a fourth diode D4 and a fourth switching element Q4 is connected across the series circuit of the inductor L and the load LD. A series circuit of the third switching element Q3 and the fourth switching element Q4 is connected across a series circuit of the third diode D3 and the fourth diode D4. The AC source is inserted between the connection point of the first diode D1 with the second diode D2 and the connection point of the first switching element Q1 with the second switching element Q2.

The control circuit passes the current to the load in one direction by making the second and third switching elements Q2, Q3 turn off while making the first and fourth switching elements Q1, Q4 turn on and off alternately. And also, the control circuit passes the current to the load in the reverse direction by making the first and fourth switching elements Q1, Q4 turn off while making the second and third switching elements Q2, Q3 turn on and off alternately.

Figure 61:
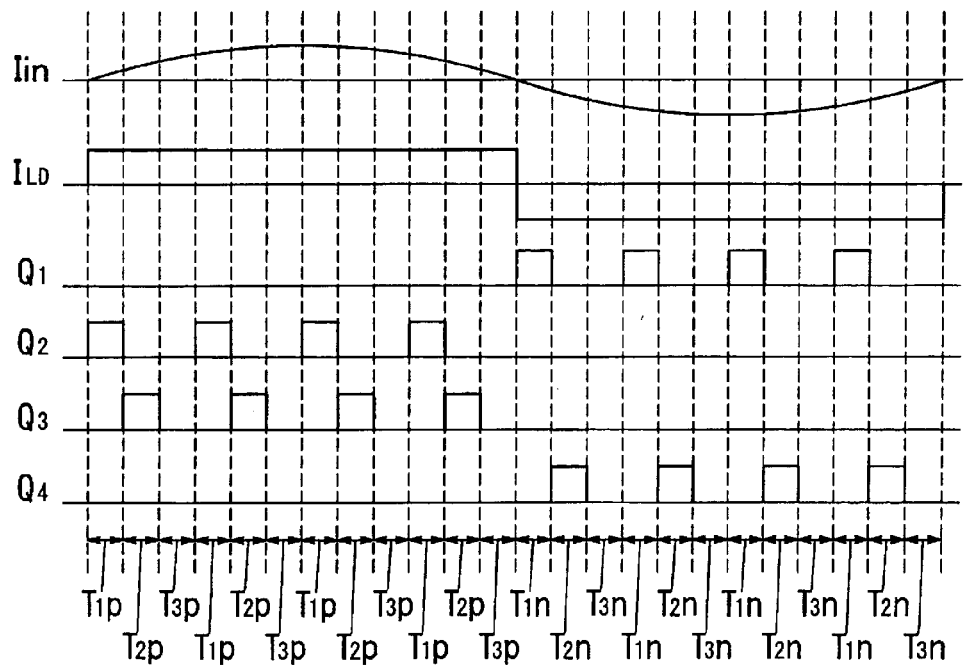
FIG. 61 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 to turn on and off in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. FIG. 61 shows a control system to control the switching elements Q1–Q4.

In a first pattern in the positive cycle, only the second switching element Q2 is turned on. In a second pattern, only the third switching element Q3 is turned on. In a third pattern, all the switching elements Q1–Q4 are turned off. In a first pattern in the negative cycle, only the first switching element Q1 is turned on, and in a second pattern, only the fourth switching element Q4 is turned on, and in a third pattern, all the switching elements Q1–Q4 are turned off. Each switching element is turned on and off at a frequency higher enough than the frequency of the AC source (50–60 Hz), for example, dozens—several hundred kHz.

Figure 62A:
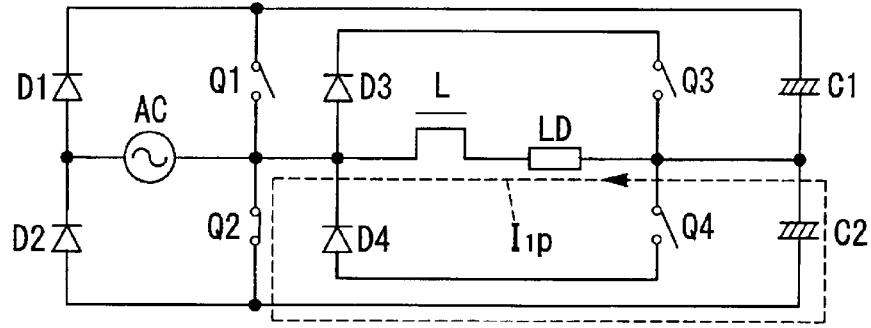
FIGS. 62A, 62B, and 62C are explanatory diagrams showing a pass of the current flowing through the above circuit when the switching elements are controlled in different on/off patterns over the positive half cycle of the AC source.
Figure 62B:
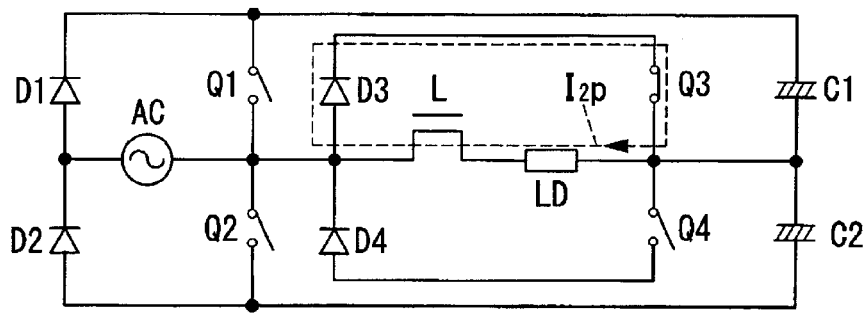
Figure 62C:
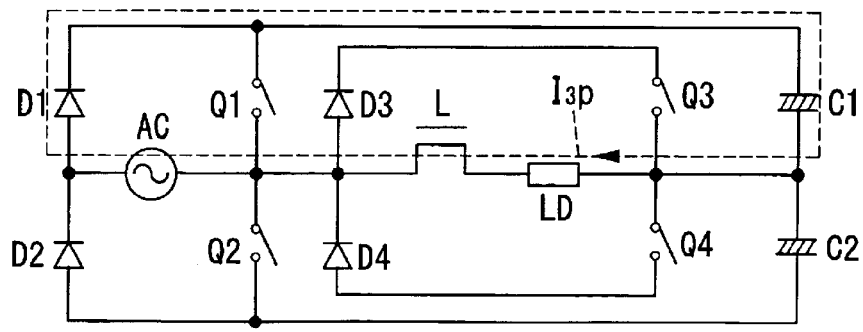

FIGS. 62A–62C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 62A, a current I1p flows increasingly through a closed loop; from the smoothing capacitor C2 to the smoothing capacitor C2 via the load LD, and the inductor L, and the second switching element Q2. The current I1p is accompanied by a discharging current from the smoothing capacitor C2. A simplified equivalent circuit in this period is a circuit in which the smoothing capacitor C1 of FIG. 24A was replaced by the second smoothing capacitor C2.

In the second period T2p, as shown in FIG. 62B, a current I2p flows decreasingly by back electromotive force of the inductor L through a closed loop; from the inductor L to the inductor L via the diode D3, the third switching element Q3, and the load LD. The current I2p flows independently of a charge and a discharge of the smoothing capacitors C1, C2. A simplified equivalent circuit in this period is shown in FIG. 24B.

In the third period T3p, as shown in FIG. 62C, a current I3p flows decreasingly through a closed loop; from the AC source to the AC source via the diode D1, the smoothing capacitor C1, the load LD, and the inductor L. The current I3p is accompanied by a charging current to the smoothing capacitor C1. A simplified equivalent circuit in this period is shown in FIG. 24C.

Figure 63A:
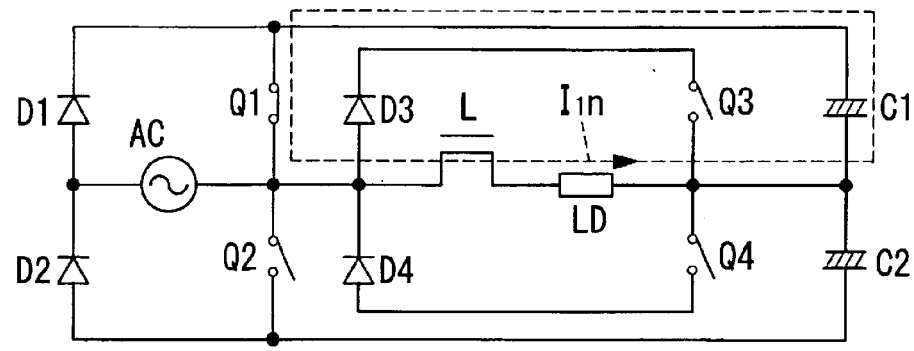
FIGS. 63A, 63B, and 63C are explanatory diagrams showing a pass of the current flowing through the above circuit when the switching elements are controlled in different on/off patterns over the negative half cycle of the AC source.
Figure 63B:
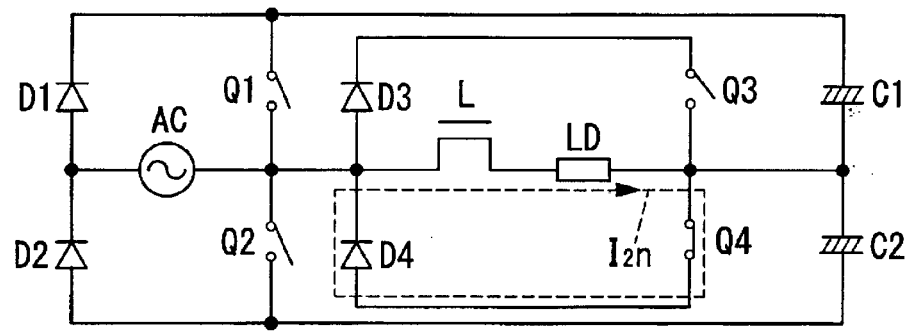
Figure 63C:
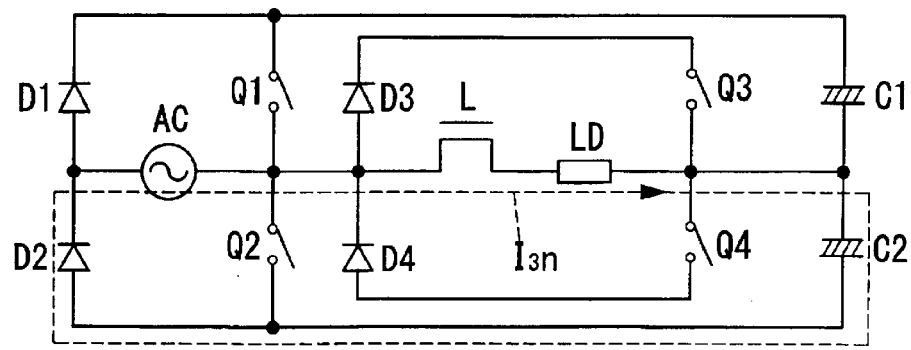
Figure 64:
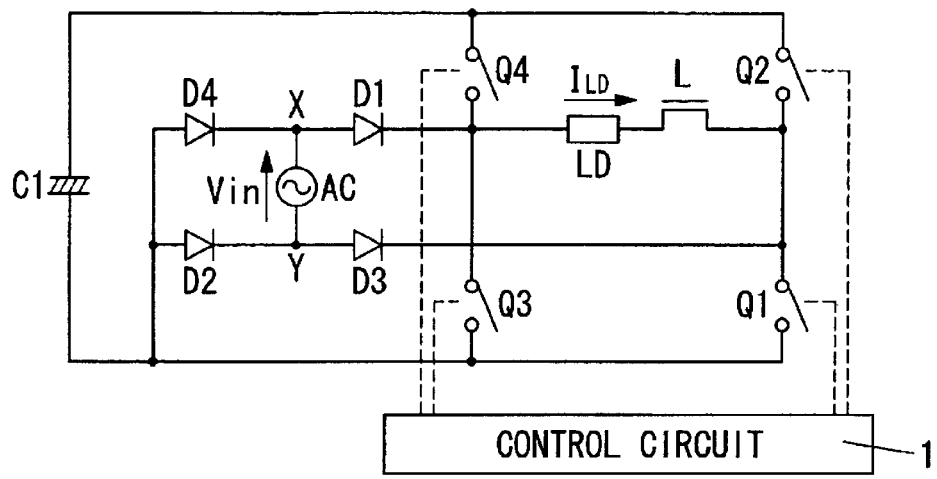
FIG. 64 is a circuit diagram of a power converter in accordance with a nineteenth embodiment of the present invention.

FIGS. 63A–63C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 63A, a current I1n flows increasingly through a closed loop; from the smoothing capacitor C1 to the smoothing capacitor C1 via the first switching element Q1, the inductor L, and the load LD. The current I1n is accompanied by a discharging current from the smoothing capacitor C1. A simplified equivalent circuit in this period is shown in FIG. 24A.

In the second period T2n, as shown in FIG. 63B, a current I2n flows decreasingly by back electromotive force of the inductor L through a closed loop; from the inductor L to the inductor L via the load LD, the fourth switching element Q4, and the diode D4. The current I2n flows independently of a charge and a discharge of the smoothing capacitors C1, C2. A simplified equivalent circuit in this period is shown in FIG. 24B.

In the third period T3n, as shown in FIG. 63C, a current I3n flows decreasingly through a closed loop; from the AC source to the AC source via the inductor L, the load LD, the smoothing capacitor C2, and the diode D2. The current I3n is accompanied by a charging current to the smoothing capacitor C2. A simplified equivalent circuit in this period is a circuit in which the smoothing capacitor C1 of FIG. 24C was replaced by the smoothing capacitor C2.

As shown in the above explanation, in each of the positive cycle and negative cycle, a first current supplying mode in which the current flows through a loop including the AC source, the inductor L, and the load LD is given in the third period T3, and a second current supplying mode in which the current flows through a loop including the inductor L and the load LD but excluding the AC source is given in the first and second periods T1, T2. That is, the control circuit can improve a harmonic distortion (a power-factor) and limit the current to the load, always passing the current to the load and the inductor, by repeating the first current supplying mode and the second current supplying mode alternately.

Nineteenth Embodiment

A power converter in accordance with a nineteenth embodiment of the present invention will be explained based on FIGS. 64–67. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and two smoothing capacitors C1, C2. The second and fourth switching elements Q2 and Q4, each defined by FET, have a parasitic diode, respectively, which defines a bypass allowing a reverse current to flow across each switching element.

A first diode D1, the first switching element Q1, and a second diode D2 are connected in series with the inductor L and the load LD across the AC source, and the first diode D1, the parasitic diode of the second switching element Q2, the second diode D2, and a smoothing capacitor C1 are connected in series with the inductor L and the load LD across the AC source. And also, a third diode D3, the third switching element Q3, and a fourth diode D4 are connected in series with the inductor L and the load LD across the AC source, and the third diode D3, the parasitic diode of the fourth switching element Q4, the smoothing capacitor C1, and the fourth diode D4 are connected in series with the inductor L and the load LD across the AC source. A series circuit of the first switching element Q1, the fourth switching element Q4, the inductor L, and the load LD is connected across the smoothing capacitor C1, and also, a series circuit of the second switching element Q2, the third switching element Q3, the inductor L, and the load LD is connected across the smoothing capacitor C1.

The control circuit 1 passes the current to the load in one direction by making the second and third switching elements Q2, Q3 turn off while making the first and fourth switching elements Q1, Q4 turn on and off with different duty ratio. And also, the control circuit passes the current to the load in the reverse direction by making the first and fourth switching elements Q1, Q4 turn off while making the second and third switching elements Q2, Q3 turn on and off with different duty ratio.

Figure 65:
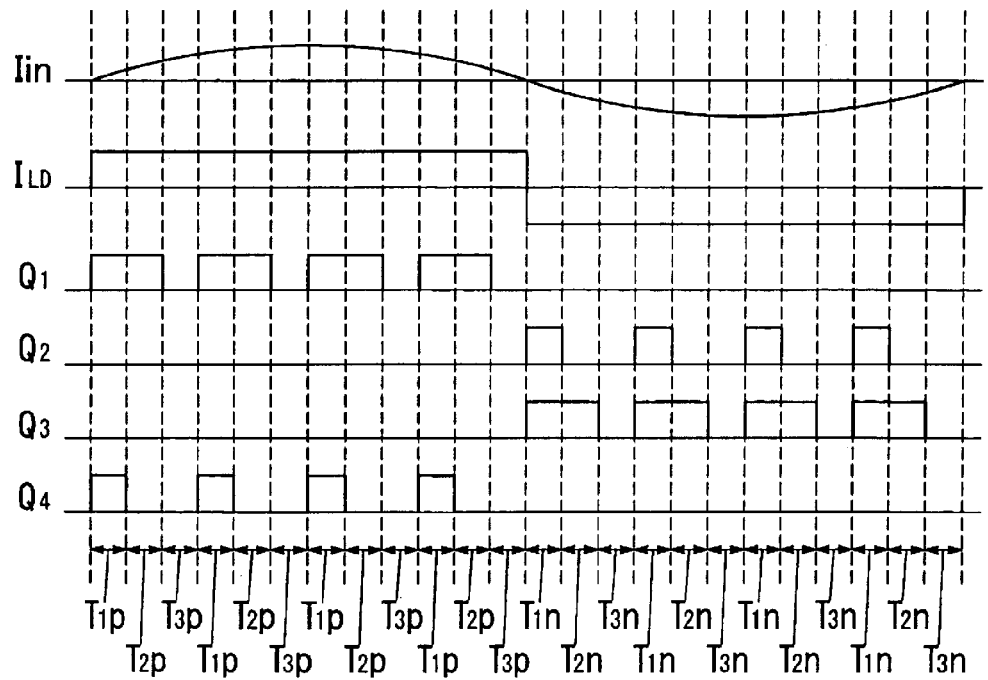
FIG. 65 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. A control system to control the switching elements Q1–Q4 is shown in FIG. 65.

In a first pattern in the positive cycle, the first and fourth switching elements Q1, Q4 are turned on. In a second pattern, only the first switching element Q1 is turned on. In a third pattern, all the switching elements Q1–Q4 are turned off. In a first pattern in the negative cycle, the second and third switching elements Q2, Q3 are turned on, and in a second pattern, only the third switching element Q3 is turned on, and in a third pattern, all the switching elements Q1–Q4 are turned off. Each switching element is turned on and off at a frequency higher enough than the frequency of the AC source (50–60 Hz), for example, dozens—several hundred kHz.

Figure 66A:
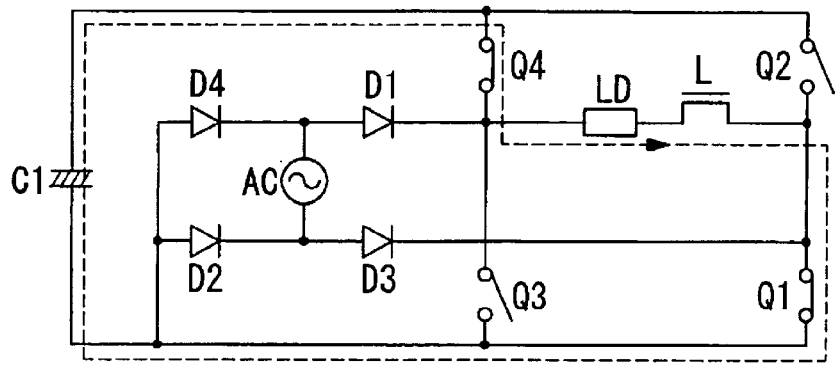
FIGS. 66A, 66B, and 66C are explanatory diagrams showing a pass of the current flowing through the above circuit when the switching elements are controlled in different on/off patterns over the positive half cycle of the AC source.
Figure 66B:
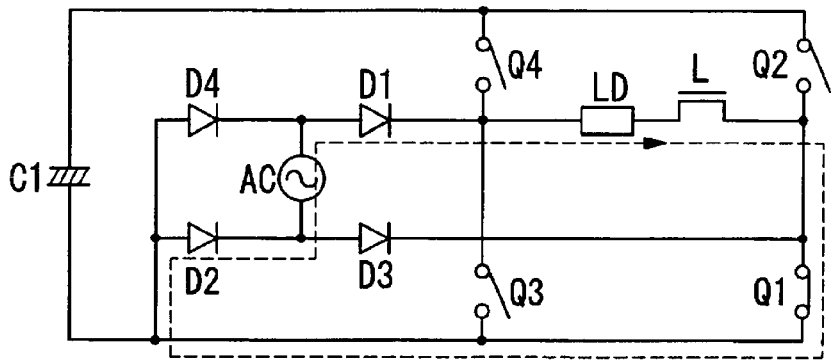
Figure 66C:
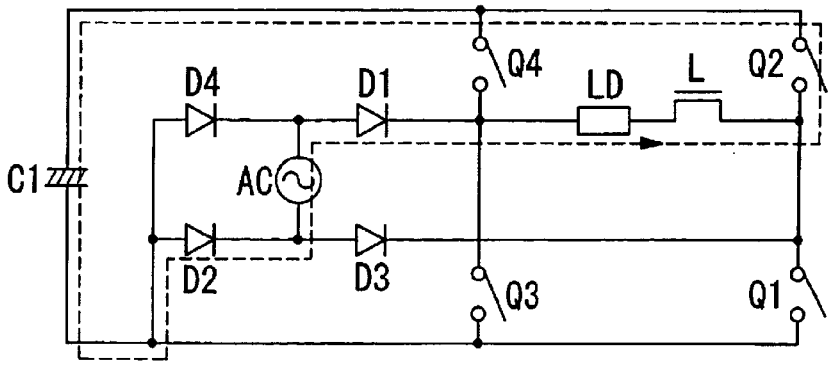

FIGS. 66A–66C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 62A, a current I1p flows increasingly through a closed loop; from the smoothing capacitor C1 to the smoothing capacitor C1 via the fourth switching element Q4, the load LD, the inductor L, and the first switching element Q1. The current I1 is accompanied by a discharging current from the smoothing capacitor C1. A simplified equivalent circuit in this period is shown in FIG. 12A.

In the second period T2p, as shown in FIG. 66B, a current I2p flows increasingly through a closed loop; from the AC source to the AC source via the first diode D1, the load LD, the inductor L, the first switching element Q1, and the second diode D2. The current I2p flows independently of a charge and a discharge of the smoothing capacitor C1. A simplified equivalent circuit in this period is shown in FIG. 12B.

In the third period T3p, as shown in FIG. 66C, a current I3p flows decreasingly through a closed loop; from the AC source to the AC source via the first diode D1, the load LD, the inductor L, the parasitic diode of the second switching element Q2, and the smoothing capacitor C1, and the second diode D2. The current I3p is accompanied by a charging current to the smoothing capacitor C1. A simplified equivalent circuit in this period is shown in FIG. 12C.

Figure 67A:
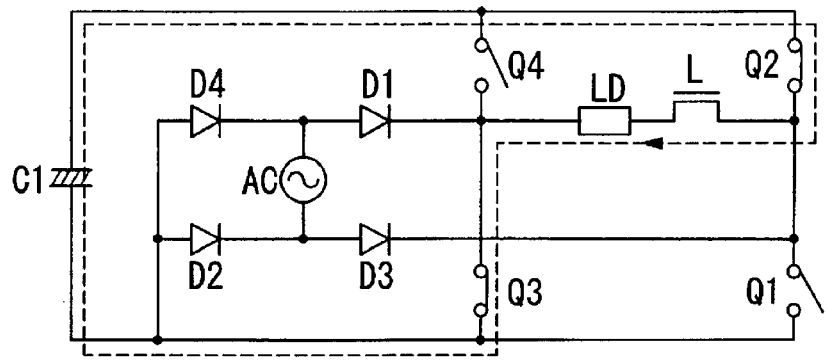
FIGS. 67A, 67B, and 67C are explanatory diagrams showing a pass of the current flowing through the above circuit when the switching elements are controlled in different on/off patterns over the negative half cycle of the AC source.
Figure 67B:
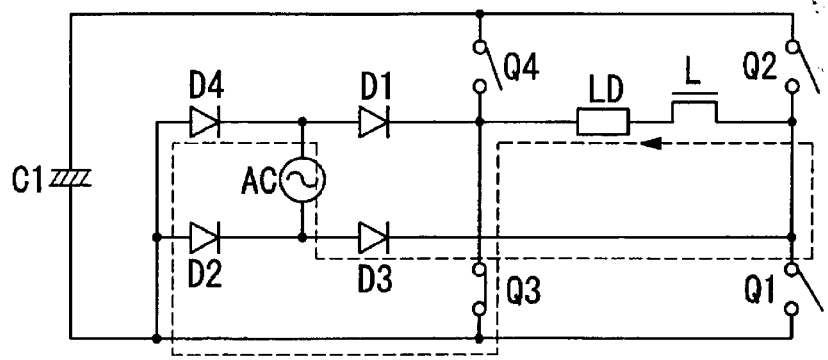
Figure 67C:
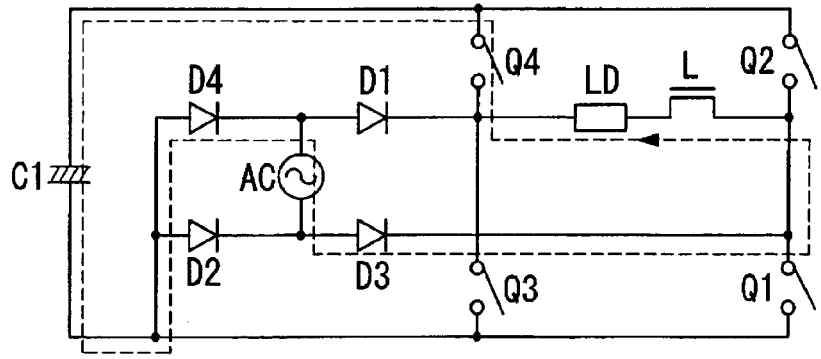

FIGS. 67A–67C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 67A, a current I1n flows increasingly through a closed loop; from the smoothing capacitor C1 to the smoothing capacitor C1 via the second switching element Q2, the inductor L, the load LD, and the third switching element Q3. The current I1n is accompanied by a discharging current from the smoothing capacitor C1. A simplified equivalent circuit in this period is shown in FIG. 12A.

In the second period T2n, as shown in FIG. 67B, a current I2n flows increasingly through a closed loop; from the AC source to the AC source via the third diode D3, the inductor L, the load LD, the third switching element Q3, and the fourth diode D4. The current I2n flows independently of a charge and a discharge of the smoothing capacitor C1. A simplified equivalent circuit in this period is shown in FIG. 12B.

In the third period T3n, as shown in FIG. 67C, a current I3n flows decreasingly through a closed loop; from the AC source to the AC source via the third diode D3, the inductor L, the load LD, the parasitic diode of the fourth switching element Q4, the smoothing capacitor C1, and the fourth diode D4. The current I3n is accompanied by a charging current to the smoothing capacitor C1. A simplified equivalent circuit in this period is shown in FIG. 12C.

As shown in the above explanation, in each of the positive cycle and negative cycle, a first current supplying mode in which the current flows through a loop including the AC source, the inductor L, and the load LD is given in the second and third periods T2, T3, and a second current supplying mode in which the current flows through a loop including the inductor L and the load LD but excluding the AC source is given in the first period T1. That is, the control circuit can improve a harmonic distortion (a power-factor) and limit the current to the load, always passing the current to the load and the inductor, by repeating the first current supplying mode and the second current supplying mode alternately.

Although, in this embodiment, it is required to control each switching element according to the polarity of the AC source, it is possible to discriminate the polarity of the AC source, unaffectedly by high-frequency voltage, by a simple detection circuit for detecting the voltage of a connection point X between the first diode D1 and the fourth diode D4, and the voltage of a connection point Y between the second diode D2 and the third diode D3, and therefore it is possible to control each of the switching elements; because either the connection point X or the connection point Y is equipotential with the negative-pole side of the smoothing capacitor C1 according to the polarity of the AC source and is not affected by the high-frequency voltage produced by turning on and off of the switching elements, that is, electrical potential at the connection point X and Y changes at the same low frequency as the AC source.

Twentieth Embodiment

Figure 68:
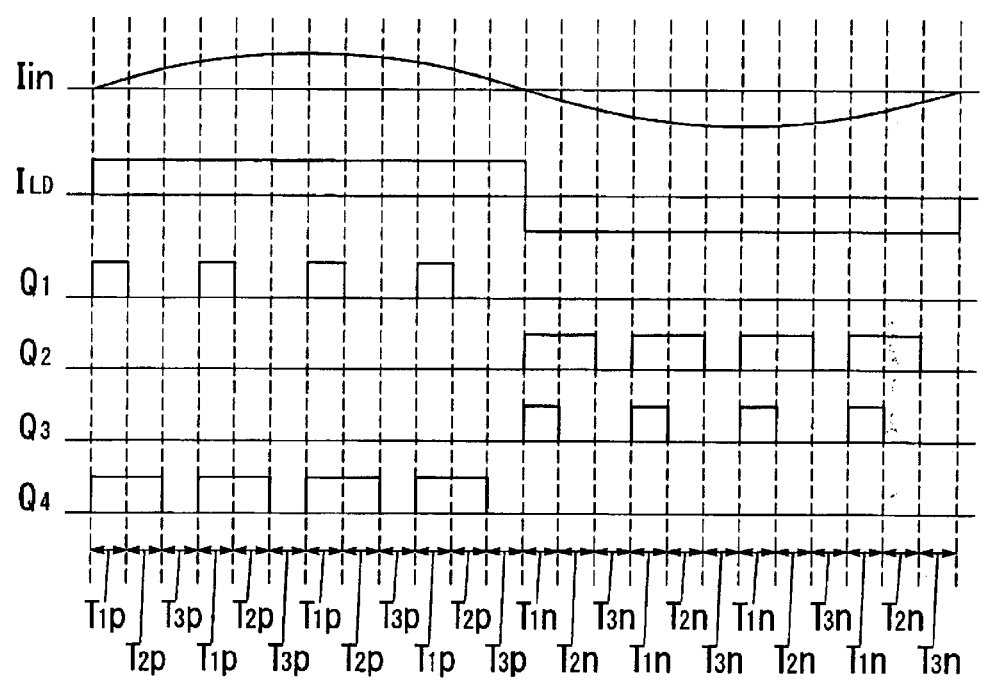
FIG. 68 is a time chart showing a control action of switching elements used in a power converter in accordance with a twentieth embodiment of the present invention.

A power converter in accordance with a twentieth embodiment of the present invention is shown in FIGS. 68–70. A circuit arrangement of the power converter is identical to the nineteenth embodiment, and a control system of the control circuit 1 is different from the nineteenth embodiment. The similar parts of these embodiments are identified by the same reference character. The control circuit 1 can always pass the current to the load and the inductor, improving the harmonic distortion, namely, a power-factor, by controlling the first, second, third, and fourth switching elements Q1–Q4 in six different patterns.

These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz.

In a first pattern in the positive cycle, the first and fourth switching elements Q1, Q4 are turned on. In a second pattern, only the fourth switching element Q4 is turned on. In a third pattern, all the switching elements Q1–Q4 are turned off. In a first pattern in the negative cycle, the second and third switching elements Q2, Q3 are turned on, and in a second pattern, only the second switching element Q2 is turned on, and in a third pattern, all the switching elements Q1–Q4 are turned off. Each switching element is turned on and off at a frequency higher enough than the frequency of the AC source (50–60 Hz), for example, dozens—several hundred kHz.

Figure 69A:
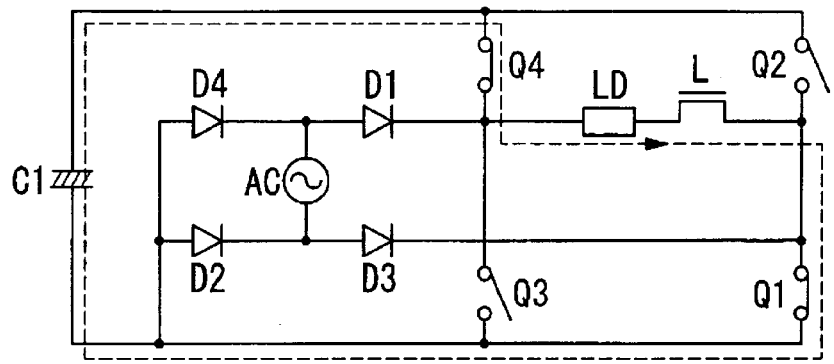
FIGS. 69A, 69B, and 69C are explanatory diagrams showing a pass of the current flowing through the above circuit when the switching elements are controlled in different on/off patterns over the positive half cycle of the AC source.
Figure 69B:
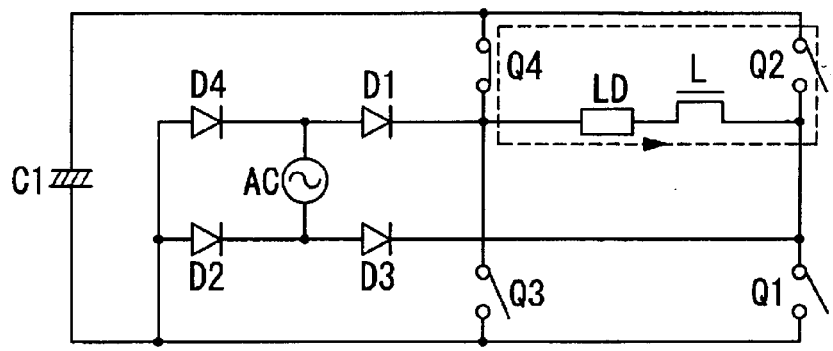
Figure 69C:
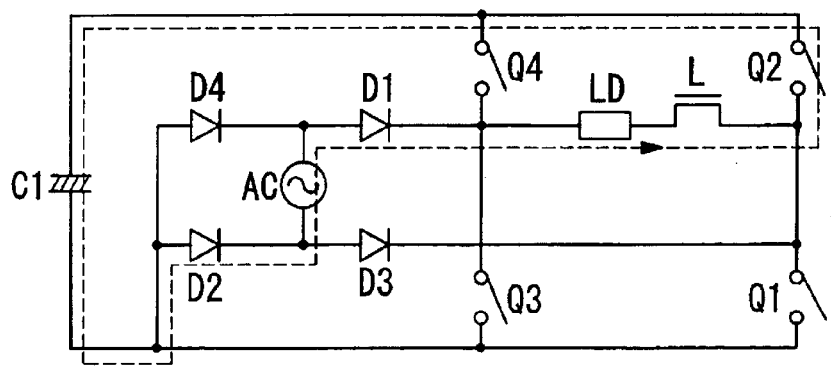

FIGS. 69A–69C show a current which flows through the circuit in a first period T1p controlled based on the first pattern in the positive cycle, in a second period T2p controlled based on the second pattern in the positive cycle, and in a third period T3p controlled based on the third pattern in the positive cycle, respectively. In the first period T1p, as shown in FIG. 69A, a current I1p flows increasingly through a closed loop; from the smoothing capacitor C1 to the smoothing capacitor C1 via the fourth switching element Q4, the load LD, the inductor L, and the first switching element Q1. The current I1p is accompanied by a discharging current from the smoothing capacitor C1. A simplified equivalent circuit in this period is shown in FIG. 24A.

In the second period T2p, as shown in FIG. 69B, a current I2p flows decreasingly by back electromotive force of the inductor L through a closed loop; from the inductor L to the inductor L via the parasitic diode of the second switching element Q2, the fourth switching element Q4, and the load LD. The current I2p flows independently of a charge and a discharge of the smoothing capacitor C1. A simplified equivalent circuit in this period is shown in FIG. 24B.

In the third period T3p, as shown in FIG. 69C, a current I3p flows decreasingly through a closed loop; from the AC source to the AC source via the first diode D1, the load LD, the inductor L, the parasitic diode of the second switching element Q2, the smoothing capacitor C1, and the second diode D2. The current I3p is accompanied by a charging current to the smoothing capacitor C1. A simplified equivalent circuit in this period is shown in FIG. 24C.

Figure 70A:
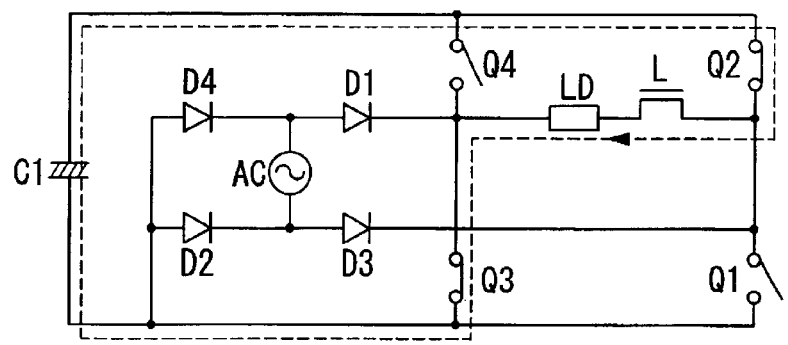
FIGS. 70A, 70B, and 70C are explanatory diagrams showing a pass of the current flowing through the above circuit when the switching elements are controlled in different on/off patterns over the negative half cycle of the AC source.
Figure 70B:
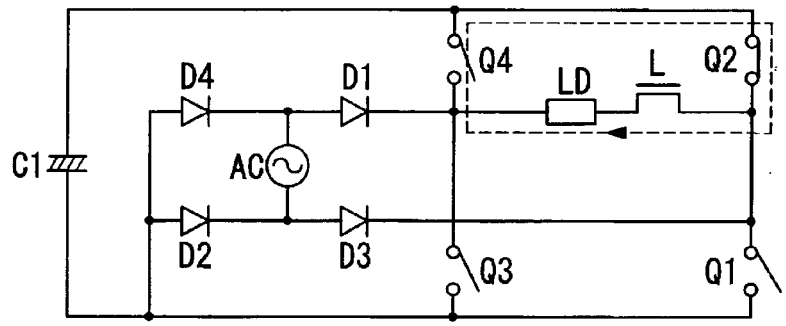
Figure 70C:
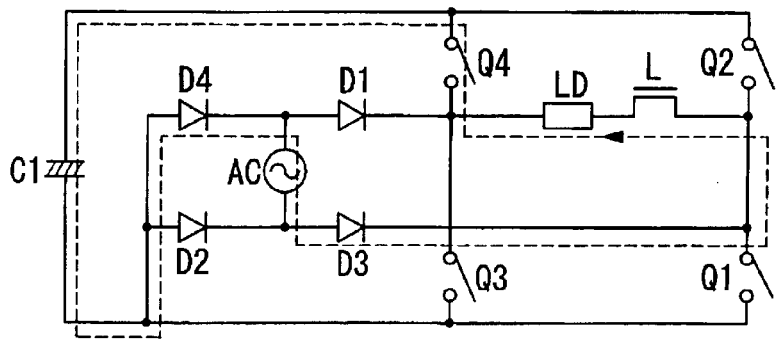

FIGS. 70A–70C show a current which flows through the circuit in a first period T1n controlled based on the first pattern in the negative cycle, in a second period T2n controlled based on the second pattern in the negative cycle, and in a third period T3n controlled based on the third pattern in the negative cycle, respectively. In the first period T1n, as shown in FIG. 70A, a current I1n flows increasingly through a closed loop; from the smoothing capacitor C1 to the smoothing capacitor C1 via the second switching element Q2, the inductor L, the load LD, and the third switching element Q3. The current I1n is accompanied by a discharging current from the smoothing capacitor C1. A simplified equivalent circuit in this period is shown in FIG. 24A.

In the second period T2n, as shown in FIG. 70B, a current I2n flows decreasingly by back electromotive force of the inductor L through a closed loop; from the inductor L to the inductor L via the load LD, the parasitic diode of the fourth switching element Q4, and the second switching element Q2. The current I2n flows independently of a charge and a discharge of the smoothing capacitor C1. A simplified equivalent circuit in this period is shown in FIG. 24B.

In the third period T3n, as shown in FIG. 70C, a current I3n flows decreasingly through a closed loop; from the AC source to the AC source via the third diode D3, the inductor L, the load LD, the parasitic diode of the fourth switching element Q4, the smoothing capacitor C1, and the fourth diode D4. The current I3n is accompanied by a charging current to the smoothing capacitor C1. A simplified equivalent circuit in this period is shown in FIG. 24C.

As shown in the above explanation, in each of the positive cycle and negative cycle, a first current supplying mode in which the current flows through a loop including the AC source, the inductor L, and the load LD is given in the third period T3, and a second current supplying mode in which the current flows through a loop including the inductor L and the load LD but excluding the AC source is given in the first and second periods T1, T2. That is, the control circuit can improve a harmonic distortion (a power-factor) and limit the current to the load, always passing the current to the load and the inductor, by repeating the first current supplying mode and the second current supplying mode alternately.

Twenty-First Embodiment

Figure 71:
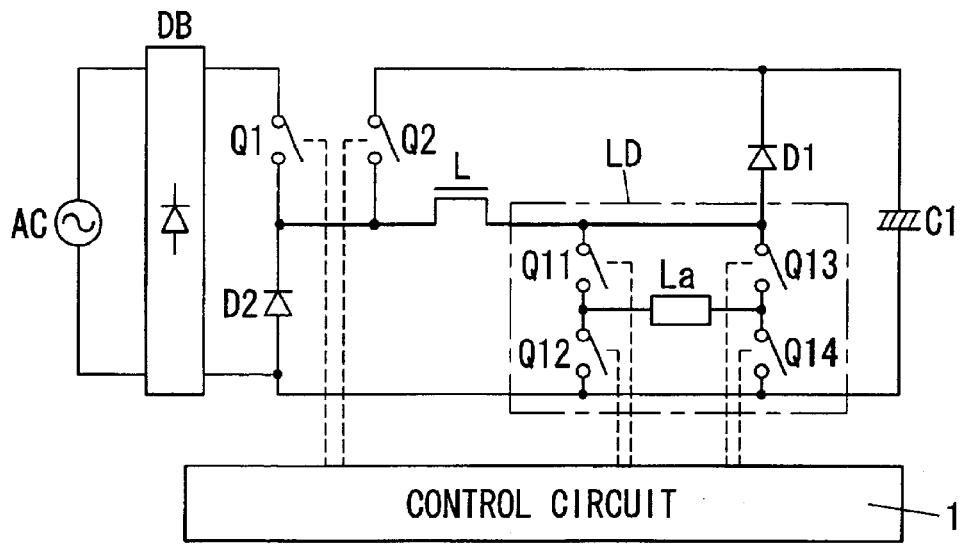
FIG. 71 is a circuit diagram of a power converter in accordance with a twenty-first embodiment of the present invention.

A power converter in accordance with a twenty-first embodiment of the present invention will be explained based on FIGS. 71–73. This power converter has a inverter circuit to which a discharge lamp La is connected as a load LD, and supplies DC power to the input terminals of the inverter circuit. In the inverter circuit, four switching elements Q11–Q14 are connected to form a full bridge, and the discharge lamp La is connected between the output terminals of the inverter circuit.

This power converter has a rectifier circuit DB which rectifies an AC current from an AC source, two switching elements Q1 and Q2, one inductor L, and one smoothing capacitor C1. The first switching element Q1 is connected in series with a inductor L and the load LD across the rectifier circuit DB, and a first diode D1, the smoothing capacitor C1, and a second diode D2 are connected in series across the inductor L. A series circuit of the second switching element Q2, the inductor L, and the load LD is connected across the smoothing capacitor C1. The first diode D1 and the second switching element Q2 are connected in series across the inductor L. The first and second diodes D1, D2 define a rectifying device which shunts the current to be supplied to the load LD from the inductor L, to the smoothing capacitor.

The control circuit can improve a power-factor and can limit the current to the load, always passing the current to both the load and the inductor, by controlling the first and second switching elements so that they can have both a period in which they are turned on and off alternately and a period in which they are turned off at the same time.

Figure 72:
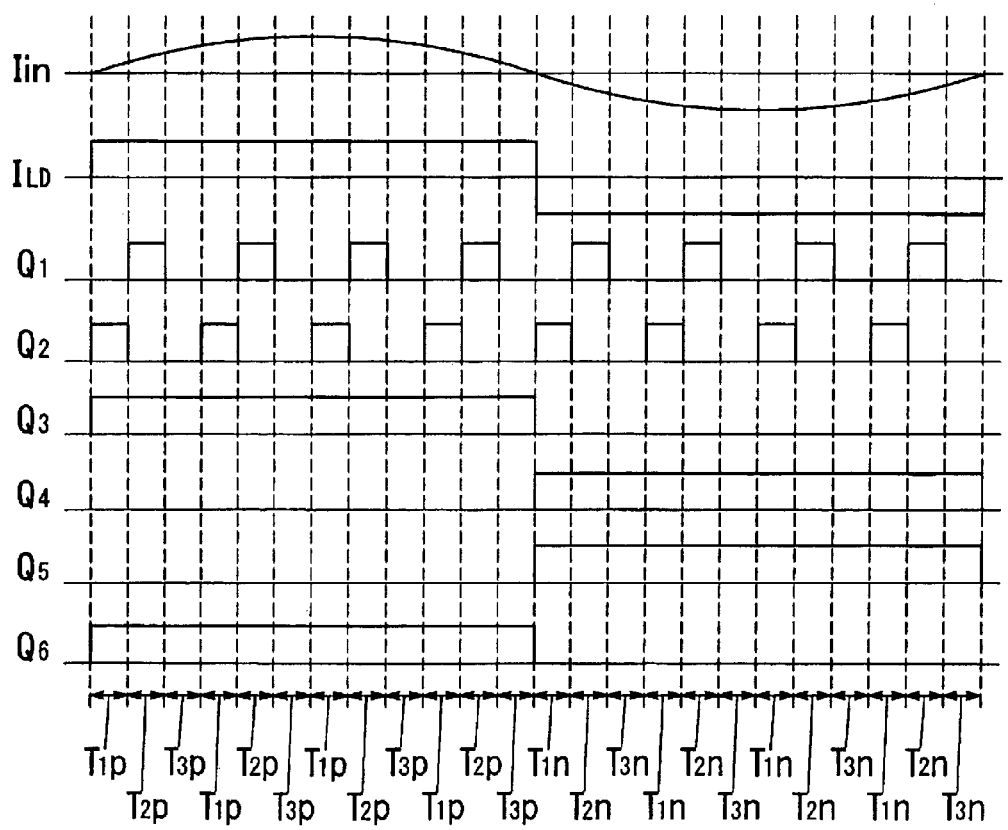
FIG. 72 is a time chart showing a control action of switching elements used in the above circuit.

FIG. 72 shows a control system of the first and second switching elements Q1, Q2 and the eleventh-fourteenth switching elements Q11–Q14. The first and second switching elements Q1, Q2 are controlled in three patterns. In a first pattern, the second switching element Q2 is turned on. In a second pattern, the first switching element Q1 is turned on. In a third pattern, both of the switching elements Q1, Q2 are turned off. An alternating power of low frequency can be supplied to the discharge lamp La by controlling the switching elements Q11–Q14, which form the inverter circuit as the load, in synchronization with the AC source, while these three patterns are repeated. Each of the switching elements Q1, Q2 are turned on and off at a frequency higher enough than the frequency of the AC source (50–60 Hz), for example, dozens—several hundred kHz. A low-pass filter which prevents the high frequency component produced by turning on and off actions of the switching elements Q1 and Q2 from being superposed on the AC power is inserted between the AC source and the rectifier circuit DB.

Figure 73A:
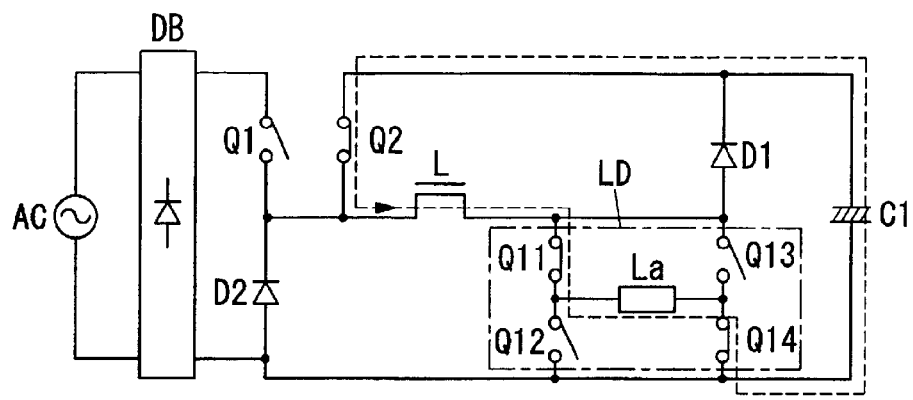
FIGS. 73A, 73B, and 73C are explanatory diagrams showing a pass of the current flowing through the above circuit when the switching elements are controlled in different on/off patterns.
Figure 73B:
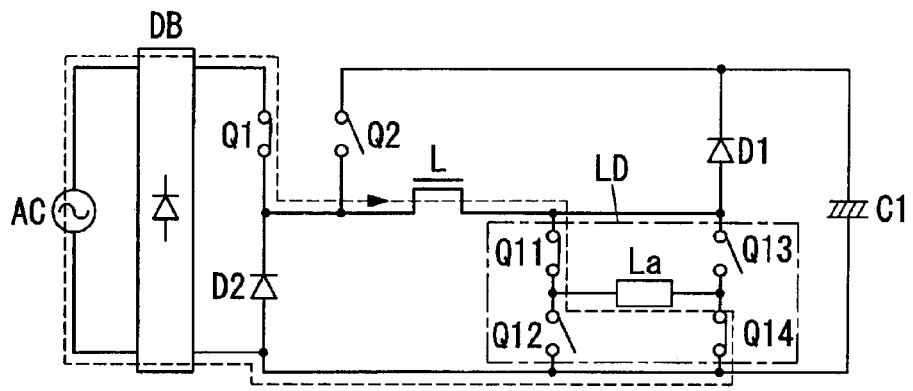
Figure 73C:
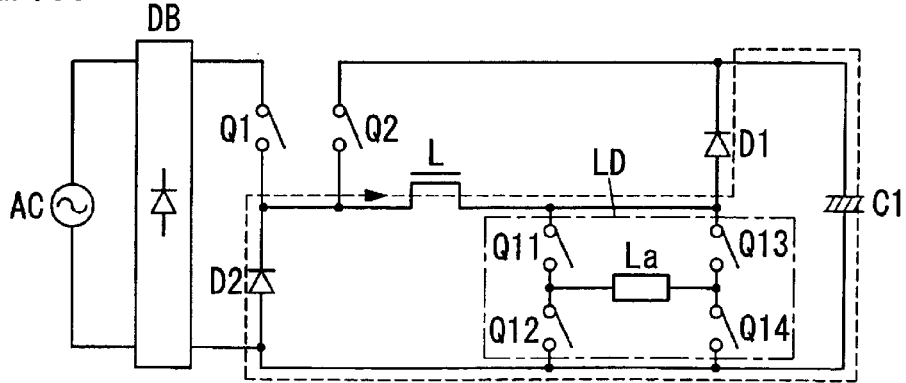

FIGS. 73A–73C show a current which flows through the circuit in a first period T1 controlled based on the first pattern, in a second period T2 controlled based on the second pattern, and in a third period T3 controlled based on the third pattern, respectively. In the first period T1, as shown in FIG. 73A, the current flows increasingly through a closed loop; from the smoothing capacitor C1 to the smoothing capacitor C1 via the second switching element Q2, the inductor L, and the load LD, and the current to the load LD is limited by the inductor L. The current is accompanied by a discharging current from the smoothing capacitor C1.

In the second period T2, as shown in FIG. 73B, the current flows through a closed loop; from the AC source to the AC source via the rectifier circuit DB, the first switching element Q1, the inductor L, the load LD, and the rectifier circuit DB. In this period, whether the current flowing through the inductor L will increase or decrease, namely, whether energy will be stored in the inductor L or discharged from the inductor L is changed according to the output voltage of the rectifier circuit DB.

In the third period T3, as shown in FIG. 73C, the current flows by stored energy of the inductor L through a closed loop; from the inductor L to the inductor L via the load LD, and the second diode D2.

As shown in the above explanation, a first current supplying mode in which the current flows through a loop including the AC source, the inductor L, and the load LD is given in the second and third periods T2, T3, and a second current supplying mode in which the current flows through a loop including the inductor L and the load LD but excluding the AC source is given in the first period T1. That is, the control circuit can improve a harmonic distortion (a power-factor) and limit the current to the load, always passing the current to the load and the inductor, by repeating the first current supplying mode and the second current supplying mode alternately.

In this embodiment, the first switching element Q1, the inductor L, and the second diode D2 form a step-down chopper which regards the rectifier circuit as a power supply and supplies power to the load LD. As the switching element, a well-known thing such as MOSFET, a bipolar transistor, and IGBT may be used. Also, the second switching element Q2, the inductor L, and the second diode D2 form a step-down chopper which regards the smoothing capacitor C1 as a power supply and supplies power to the load LD.

In the period T3 shown in FIG. 73C, if a surplus of the stored energy of the Inductor L is generated and the voltage across the inductor L becomes higher than the voltage across the smoothing capacitor C1, the first diode D1 will conduct a current, and the stored energy of the inductor L will be used for a charge of the smoothing capacitor C1 through a closed loop; form the inductor L to the inductor L via the first diode D1, the smoothing capacitor C1, and the second diode D2. For example, in a crest of the voltage wave where the output voltage of the rectifier circuit DB is near the peak, the surplus of the stored energy of the inductor L is generated, and the smoothing capacitor C1 is charged. That is, it is prevented that the supply voltage to the load becomes superfluous, because the first diode D1 is connected in series with the inductor L and the smoothing capacitor C1 across the rectifier circuit DB and the current is shunted to the smoothing capacitor C1 through the first diode D1 near the peak voltage of the AC source.

On the other hand, in the trough of the voltage wave where the output voltage of the rectifier circuit DB is near 0V, the stored energy of the inductor L is supplied only to the load LD. In the state of FIG. 73B, too, the first diode D1 may conduct a current, and the smoothing capacitor C1 may be charged, depending on a relation between the electrical potential of the connection point of the inductor L with the load LD and the electrical potential of the positive pole of the smoothing capacitor C1.

Moreover, if a surplus of the input energy is generated and the voltage across the smoothing capacitor C1 rises, the first diode D1 does not conduct the current in the state of FIG. 73C, then the length in which the current flows to the load LD becomes longer. Therefore, the output energy to the load LD increases. On the other hand, if a shortage of the input energy is generated and the voltage across the smoothing capacitor C1 falls, the length in which the charging current flows to the smoothing capacitor C1 becomes longer, therefore, the output energy to the load LD decreases. In this way, because the output energy to the load LD will increase or decrease according to the increasing or decreasing of the input energy, a balance between the input energy and the output energy is automatically adjusted so that the balance is neither too much nor too little. Therefore, it is easy to control the switching elements Q1, Q2, and it becomes possible to control them by a simple control circuit.

Twenty-Second Embodiment

Figure 74:
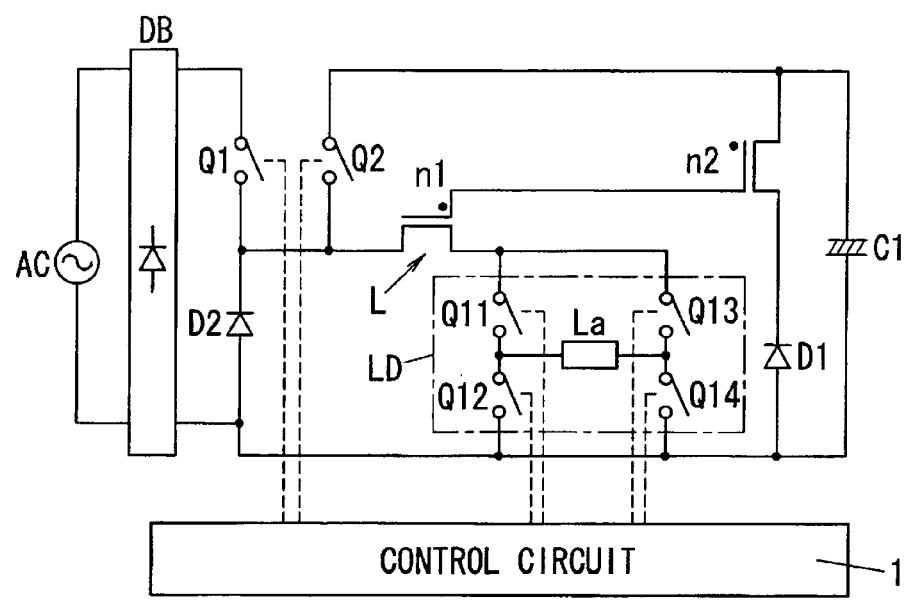
FIG. 74 is a circuit diagram of a power converter in accordance with a twenty-second embodiment of the present invention.

A power converter in accordance with a twenty-second embodiment of the present invention is shown in FIGS. 74 and 75. A circuit arrangement of the power converter is identical to the twenty-first embodiment except that the inductor L includes a primary winding n1 and a secondary winding n2. The similar parts of these embodiments are identified by the same reference character.

In this power converter, the first switching element Q1 is connected in series with the primary winding n1 of the inductor L and the load LD across the rectifier circuit DB. The second switching element Q2, the inductor L, and the load LD are connected in series across the smoothing capacitor C1. The secondary winding n2 and a first diode D1 are connected across the smoothing capacitor C1. The load LD and a second diode D2 are connected in series across the primary winding n1. The polarity of the secondary winding n2 of the inductor L is set up as shown in a FIG. 74.

The control circuit controls the first and second switching elements Q1, Q2 so that they can repeat three patterns including a period in which they are turned on and off alternately and a period in which they are turned off at the same time.

Figure 75A:
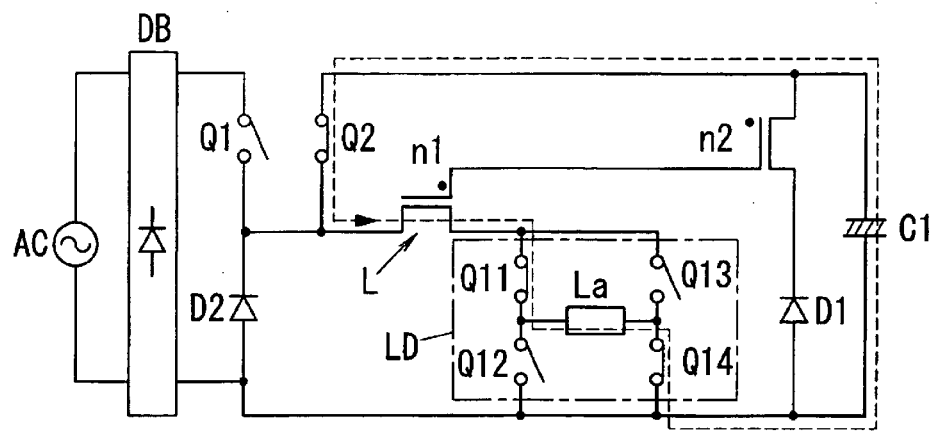
FIGS. 75A, 75B, and 75C are explanatory diagrams showing a pass of the current flowing through the above circuit when the switching elements are controlled in different on/off patterns.

In a first pattern, the second switching element Q2 is turned on, and as shown in FIG. 75A, a current flows in a closed loop; from the smoothing capacitor C1 to the smoothing capacitor C1 via the second switching element Q2, the primary winding n1 of the inductor L, and the load LD. In this period, a current flowing through the primary winding n1 of the inductor L increases with time, and energy is stored in the inductor L, and the inductor operates as a current-limiting element to the load LD. Although a voltage is induced in the secondary winding n2 in this period, a charging current to the smoothing capacitor C1 does not flow, because the inductor is set up so that the induced voltage will be lower than the voltage across the smoothing capacitor C1.

Figure 75B:
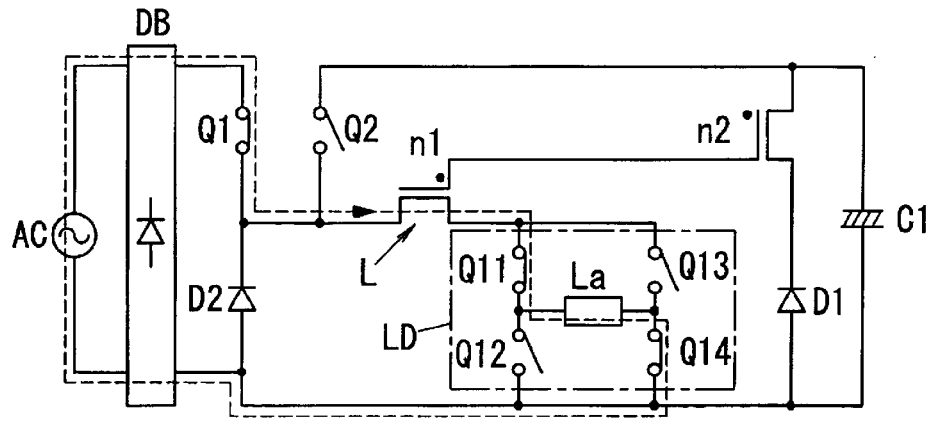

In the second period, the first switching element Q1 is turned on, and a current flows in a closed loop as shown in FIG. 75B; from the AC source to the AC source via the rectifier circuit DB, the first switching element Q1, the primary winding n1 of the inductor L, the load, and the rectifier circuit DB. In this period, too, although a voltage is induced in the secondary winding n2 of the inductor L, a charging current to the smoothing capacitor C1 does not flow, because the inductor is set up so that the induced voltage will be lower than the voltage across the smoothing capacitor C1.

In the third period, both the first and second switching elements Q1, Q2 are turned off, and the stored energy of the inductor L is discharged through two closed loops; one is from the primary winding n1 of the inductor L to the primary winding n1 via the load LD, and the second diode D2; and the other is from the secondary winding n2 of the inductor L to the secondary winding n2 via the smoothing capacitor C1, and the first diode D1.

If the voltage across the secondary winding n2 becomes higher than the voltage across the smoothing capacitor C1, the charging current flows to the smoothing capacitor C1 from the secondary winding n2. At that time, the first diode conducts the current, and the stored energy of the inductor L is used for the charge of the smoothing capacitor C1. In this way, in this arrangement of this embodiment, the voltage applied to the smoothing capacitor C1 can be set up appropriately by a turn ratio of the primary winding n1 and the secondary winding n2, and freedom of a circuit design can be raised.

Figure 75C:
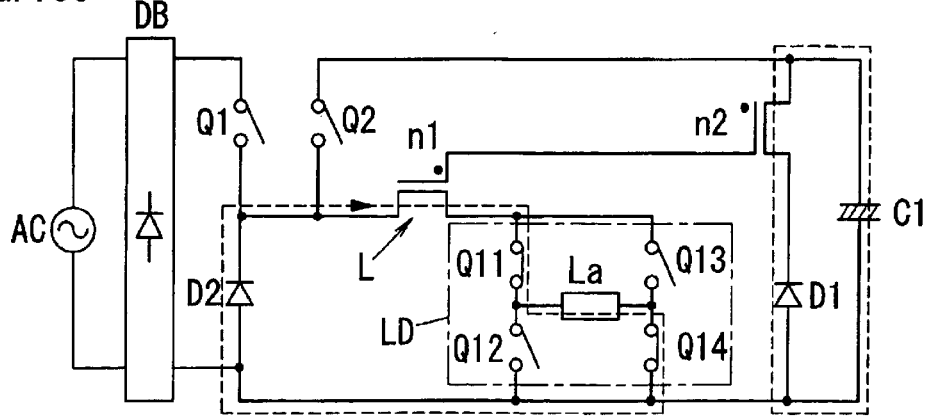

For example, if the turn ratio of the primary winding n1 and the secondary winding n2 is n, the voltage of the smoothing capacitor is VC1, the output voltage of the rectifier circuit is VE, and the absolute value of the load voltage is VLa, then the voltage Vn2 across the secondary winding n2 is expressed as follows:

$Vn2a = -n(VC1-VLa)$; In the period of FIG. 75A
$Vn2b = -n(VE-VLa)$; In the period of FIG. 75B
$Vn2c = n \cdot VLa$; In the period of FIG. 75C
For $VE \geq 0$, then $Vn2c \geq Vn2c$.
Therefore, if the turn ratio n is selected so that $VC1 = Vn2c$, the charging current can be set up so that it will flow to the smoothing capacitor C1 from the secondary winding n2 only when in FIG. 75C.

Twenty-Third Embodiment

Figure 76:
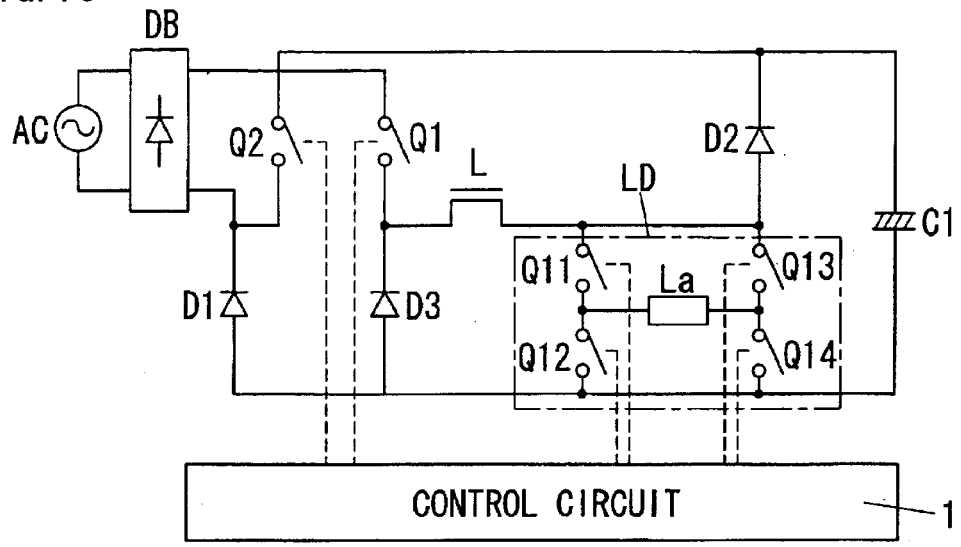
FIG. 76 is a circuit diagram of a power converter in accordance with a twenty-third embodiment of the present invention.

A power converter in accordance with a twenty-third embodiment of the present invention will be explained based on FIGS. 76–78. This power converter has a inverter circuit to which a discharge lamp La is connected as a load LD, and supplies DC power to the input terminals of the inverter circuit. In the inverter circuit, four switching elements Q11–Q14 are connected to form a full bridge, and the discharge lamp La is connected between the output terminals of the inverter circuit.

This power converter has a rectifier circuit DB which rectifies an AC current from an AC source, two switching elements Q1 and Q2, one inductor L, and one smoothing capacitor C1. The first switching element Q1 is connected in series with the inductor L, the load LD, the smoothing capacitor C1, and the second switching element Q2 across the rectifier circuit DB. And the first switching element Q1 is connected in series with the inductor L, the load LD, and a first diode D1 across the rectifier circuit DB. A series circuit of a second diode D2, the smoothing capacitor C1, and a third diode D3 is inserted across the inductor L, and the second diode D2 and the third diode D3 form a path to pass a charging current to the smoothing capacitor from the inductor.

the control circuit can improve a power-factor and can limit the current to the load, always passing the current to the load and the inductor, by controlling the first and second switching elements so that they can have both a period in which they are turned on and off alternately and a period in which they are turned off at the same time.

Figure 77:
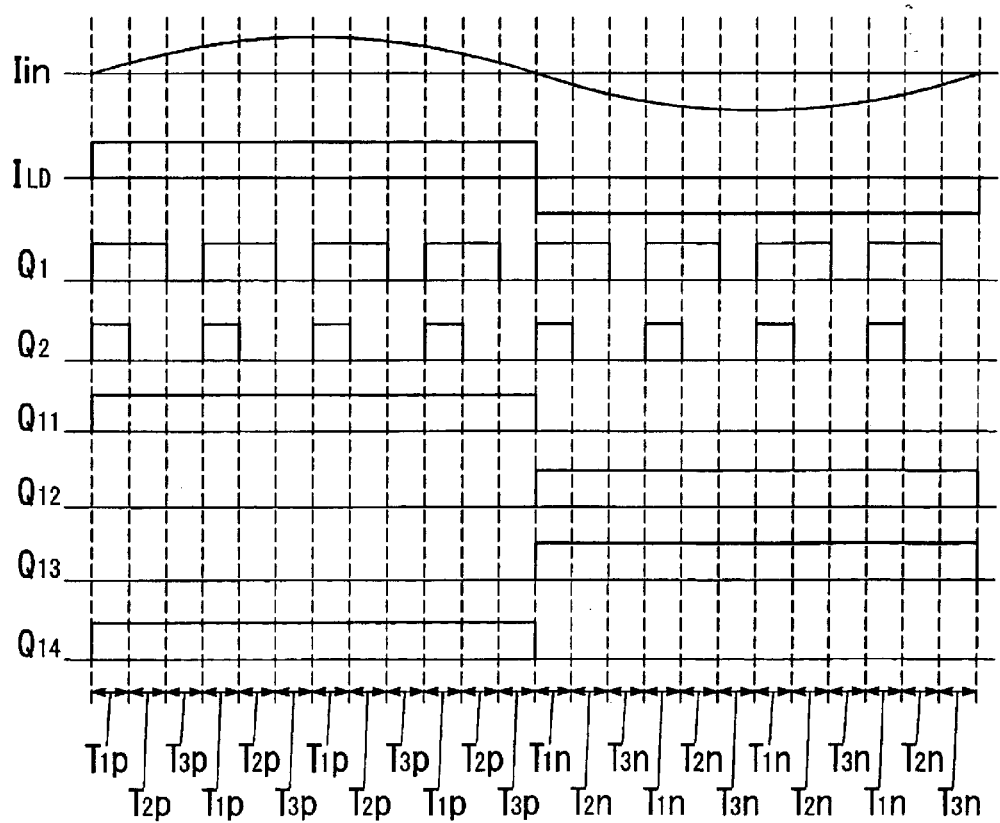
FIG. 77 is a time chart showing a control action of switching elements used in the above circuit.

FIG. 77 shows a control system of the first and second switching elements Q1, Q2 and the eleventh-fourteenth switching elements Q11–Q14. The first and second switching elements Q1, Q2 are controlled in three patterns. In a first pattern, the first and second switching elements Q1, Q2 are turned on. In a second pattern, the first switching element Q1 is turned on. In a third pattern, both of the switching elements Q1 and Q2 are turned off. An alternating power of low frequency is supplied to the discharge lamp La by controlling the switching elements Q11–Q14, which form the inverter circuit as the load, in synchronization with the AC source, while these three patterns are repeated. Each of the switching elements Q1, Q2 are turned on and off at a frequency higher enough than the frequency of the AC source (50–60 Hz), for example, dozens—several hundred kHz. A low-pass filter which prevents the high frequency component produced by turning on and off actions of the switching elements Q1 and Q2 from being superposed on the AC power is inserted between the AC source and the rectifier circuit DB.

Figure 78A:
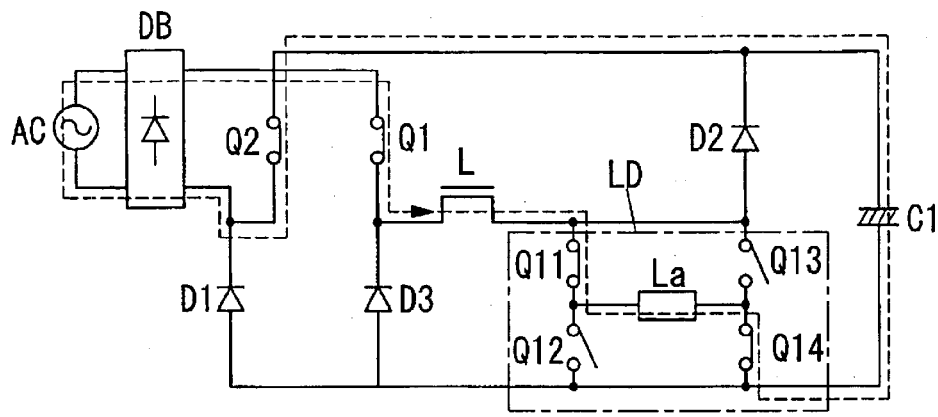
FIGS. 78A, 78B, and 78C are explanatory diagrams showing a pass of the current flowing through the above circuit when the switching elements are controlled in different on/off patterns.
Figure 78B:
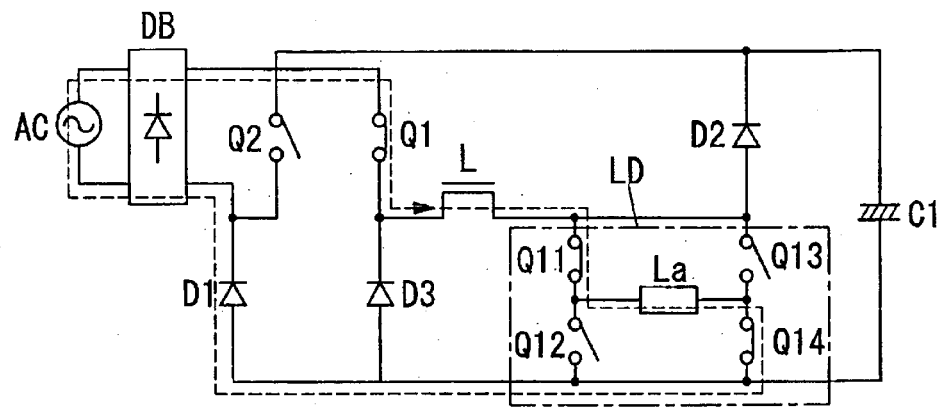
Figure 78C:
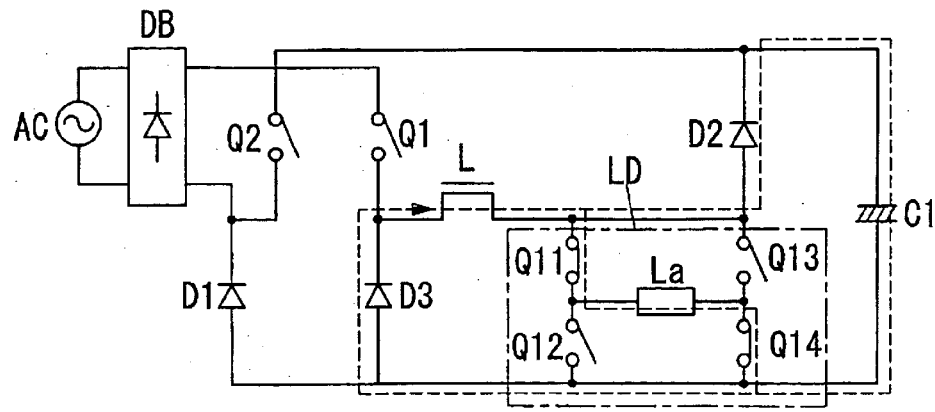
Figure 79:
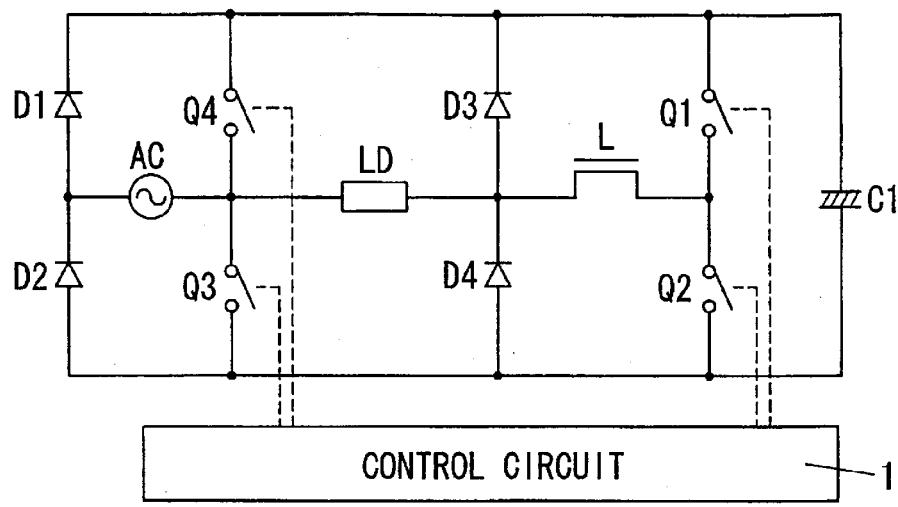
FIG. 79 is a circuit diagram of a power converter in accordance with a twenty-fourth embodiment of the present invention.

FIGS. 78A–78C show a current which flows through the circuit in a first period T1 controlled based on the first pattern, in a second period T2 controlled based on the second pattern, and in a third period T3 controlled based on the third pattern, respectively. In the first period T1, as shown in FIG. 78A, the current flows through a closed loop; from the smoothing capacitor C1 to the smoothing capacitor C1 via the second switching element Q2, the rectifier circuit DB, the AC source, the rectifier circuit DB, the first switching element Q1, the inductor L, and the load LD. In this period, a current flowing through the inductor L increases with time, and energy is stored in the inductor L, and the inductor operates as a current-limiting element to the load LD. By this operation, a voltage adding the voltage across the smoothing capacitor C1 to the output voltage of the rectifier circuit is applied to a series circuit of the inductor L and the load LD. In the second period T2, as shown in FIG. 78B, the current flows through a closed loop; from the AC source to the AC source via the rectifier circuit DB, the first switching element Q1, the inductor L, the load LD, the first diode D1, and the rectifier circuit DB. In this period, only the output voltage of the rectifier circuit DB is applied to the series circuit of the inductor L and the load LD, the energy of the inductor L is discharged.

In the third period T3, as shown in FIG. 78C, the stored energy of the inductor L is discharged through two closed loops; one is from the inductor L to the inductor L via the load LD, and the third diode D3; and the other is from the inductor L to the inductor L via the second diode D2, the smoothing capacitor C1, and the third diode D3. If the voltage across the inductor L becomes higher than the voltage across the smoothing capacitor C1, the charging current flows to the smoothing capacitor C1 from the secondary winding n2. At that time, the second diode conducts the current, and the stored energy of the inductor L is used for the charge of the smoothing capacitor C1.

As shown in the above explanation, a first current supplying mode in which the current flows through a loop including the AC source, the inductor L, and the load LD is given in the first and second periods T1, T2, and a second current supplying mode in which the current flows through a loop including the inductor L and the load LD but excluding the AC source is given in the third period T3. That is, the control circuit can improve a harmonic distortion (a power-factor) and limit the current to the load, always passing the current to the load and the inductor, by repeating the first current supplying mode and the second current supplying mode alternately.

Twenty-Fourth Embodiment

A power converter in accordance with a twenty-fourth embodiment of the present invention will be explained based on FIGS. 79–82. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and one smoothing capacitor C1. The first and second switching elements Q1 and Q2, each defined by FET, have a parasitic diode, respectively, which defines a bypass allowing a reverse current to flow across each switching element.

A first diode D1, the first switching element Q1, the inductor L, and a load LD are connected in series across the AC source. And, the load LD, the inductor L, the second switching element Q2, and a second diode D2 are connected in series across the AC source. The third switching element Q3 and the bypass of the second switching element Q2 are connected in series across a series circuit of the inductor L and the load LD. And, a third diode D3, the smoothing capacitor C1, and the bypass of the second switching element Q2 are connected in series across the inductor L. The bypass of the first switching element Q1 and the fourth switching element Q4 are connected in series across the series circuit of the inductor L and the load LD. The bypass of the first switching element Q1, the smoothing capacitor C1, and a fourth diode D4 are connected in series across the inductor L. And, the third diode D3 and the fourth diode D4 form a path to pass a charging current to the smoothing capacitor from the inductor.

The control circuit passes the current to the load in one direction by controlling the first and third switching elements Q1 and Q3 so that both switching elements will repeat three patterns comprising a period in which both switching elements are turned on at the same time, and periods in which either of them is turned on, while making the second and fourth switching element Q2 and Q4 turn off. And the control circuit passes the current to the load in the reverse direction by controlling the second and fourth switching element Q2 and Q4 so that both switching elements will repeat three patterns comprising a period in which both switching elements are turned on at the same time, and periods in which either of them is turned on, while making the first and third switching elements Q1 and Q3 turn off.

Figure 80:
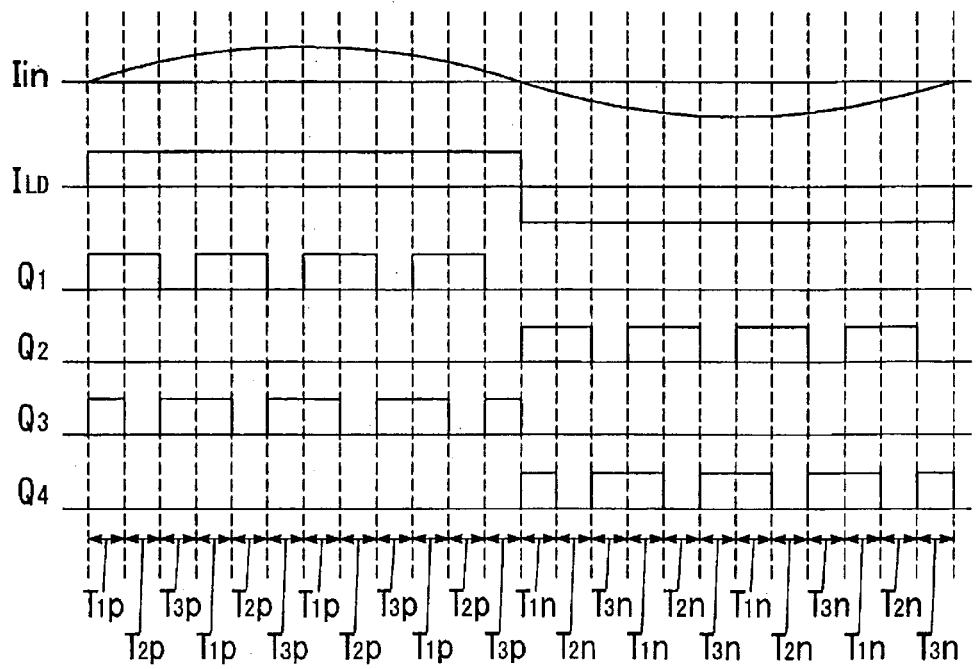
FIG. 80 is a time chart showing a control action of switching elements used in the above circuit.

The control circuit 1 can always pass the current to both the load and the inductor, improving the harmonic distortion, namely, a power-factor, by controlling the first, second, third, and fourth switching elements Q1–Q4 in six different patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. FIG. 80 shows a control system to control the switching elements Q1–Q4.

In a first pattern in the positive cycle, the first and third switching elements Q1, Q3 are turned on. In a second pattern, only the first switching element Q1 is turned on. In a third pattern, only the third switching element Q2 is turned on. In a first pattern in the negative cycle, the second and fourth switching elements Q2, Q4 are turned on, and in a second pattern, only the second switching element Q2 is turned on, and in a third pattern, only the fourth element Q4 is turned on. Each switching element is turned on and off at a frequency higher enough than the frequency of the AC source (50–60 Hz), for example, dozens—several hundred kHz.

Figure 81A:
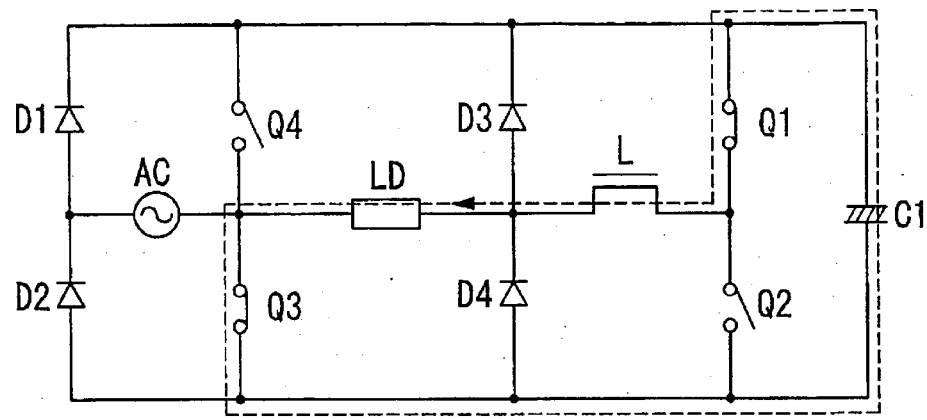
FIGS. 81A, 81B, and 81C are explanatory diagrams showing a pass of the current flowing through the above circuit when the switching elements are controlled in different on/off patterns over the positive half cycle of the AC source.
Figure 81B:
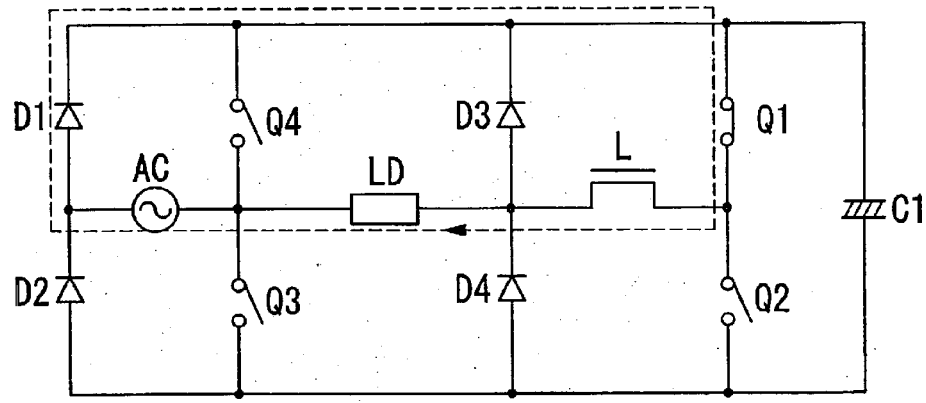
Figure 81C:
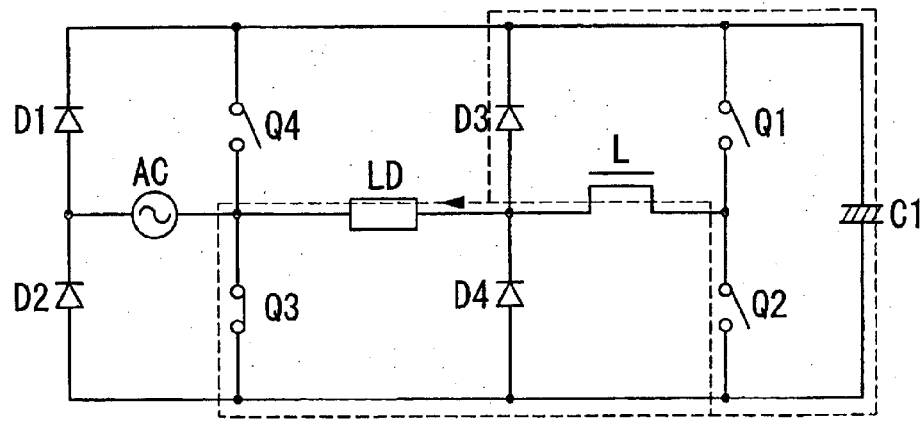

FIGS. 81A–81C show a current which flows through the circuit in a first period T1$p$ controlled based on the first pattern in the positive cycle, in a second period T2$p$ controlled based on the second pattern in the positive cycle, and in a third period T3$p$ controlled based on the third pattern in the positive cycle, respectively. In the first period T1$p$, as shown in FIG. 81A, the current flows through a closed loop; from the smoothing capacitor C1 to the smoothing capacitor C1 via the first switching element Q1, the inductor L, the load LD, and the third switching element Q3. In this period, a current flowing through the inductor L increases with time, and energy is stored in the inductor L, and the inductor L operates as a current-limiting element to the load LD.

In the second period T2$p$, as shown in FIG. 81B, the current flows through a closed loop; from the AC source to the AC source via the first diode D1, the switching element Q1, the inductor L, and the load LD. In this period, whether the current flowing through the inductor L will increase or decrease, namely, whether energy will be stored in the inductor L or discharged from the inductor L is decided according to the magnitude relation between the voltage across the AC source and the voltage across the inductor L.

In the third period T3$p$, as shown in FIG. 81C, the stored energy of the inductor L is discharged through two closed loops; one is from the inductor L to the inductor L via the load LD, the third switching element Q3, and the bypass of the second switching element Q2; and the other is from the inductor L to the inductor L via the third diode D3, the smoothing capacitor C1, and the bypass of the second switching element Q2. The closed loop including the smoothing capacitor C1 will be formed when the voltage across the inductor L becomes higher than the voltage of the smoothing capacitor C1 by the stored energy of the inductor L. The ON length of the first switching element Q1, the size of the inductor L, etc., are designed so that the voltage generated across the inductor L in the period of FIG. 81C will be higher than the peak voltage of the AC source. So, in this period, the smoothing capacitor C1 is charged by the energy of the inductor L, not by the AC source.

Figure 82A:
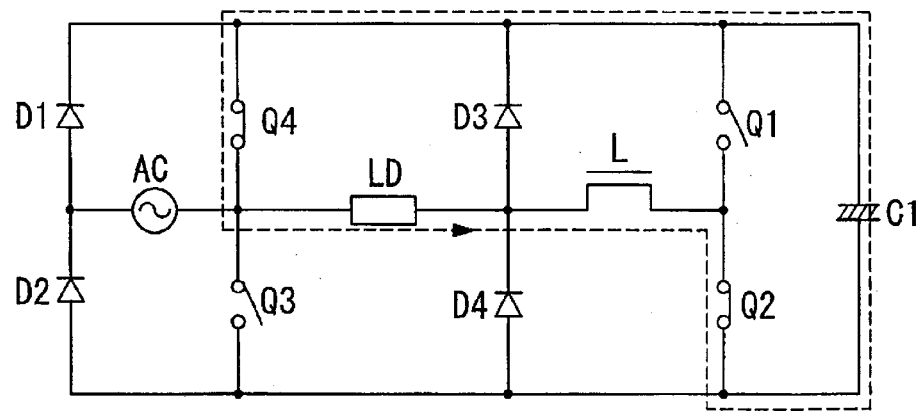
FIGS. 82A, 82B, and 82C are explanatory diagrams showing a pass of the current flowing through the above circuit when the switching elements are controlled in different on/off patterns over the negative half cycle of the AC source.
Figure 82B:
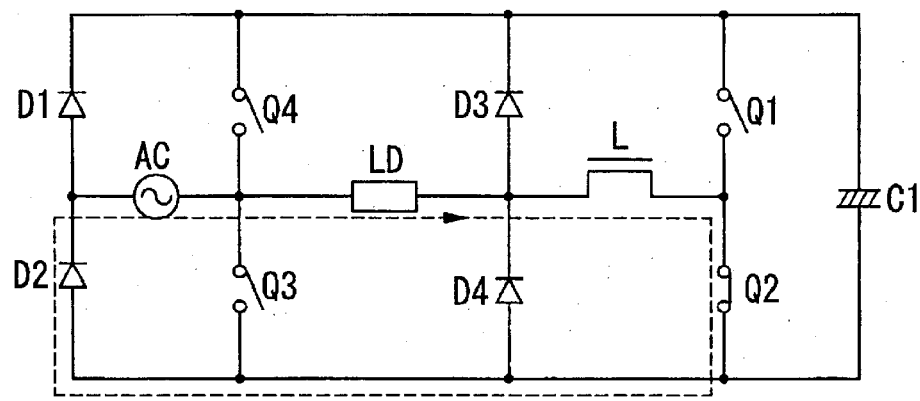
Figure 82C:
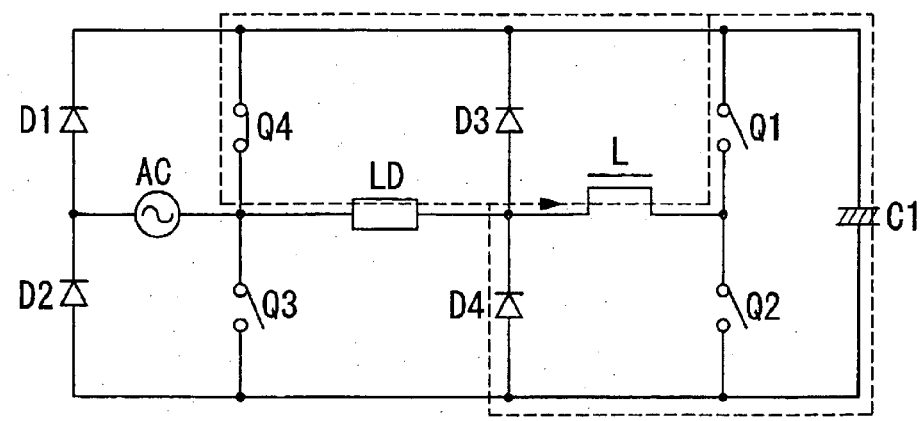

FIGS. 82A–82C show a current which flows through the circuit in a first period T1$n$ controlled based on the first pattern in the negative cycle, in a second period T2$n$ controlled based on the second pattern in the negative cycle, and in a third period T3$n$ controlled based on the third pattern in the negative cycle, respectively. In the first period T1$n$, as shown in FIG. 82A, a current flows through a closed loop; from the smoothing capacitor C1 to the smoothing capacitor C1 via the fourth switching element Q4, the load LD, the inductor L, and the second switching element Q2. In this period, a current flowing through the inductor L increases with time, and energy is stored in the inductor L.

In the second period T2$n$, as shown in FIG. 82B, a current flows through a closed loop; from the AC source to the AC source via the load LD, the inductor L, the second switching element Q2, and the second diode D2. In this period, whether the current flowing through the inductor L will increase or decrease, namely, whether energy will be stored in the inductor L or discharged from the inductor L is decided according to the magnitude relation between the voltage across the AC source and the voltage across the inductor L.

In the third period T3$n$, as shown in FIG. 82C, the stored energy of the inductor L is discharged through two closed loops; one is from the inductor L to the inductor L via the bypass of the first switching element Q1, the fourth switching element Q4, and the load LD; and the other is from the inductor L to the inductor L via the bypass of the first switching element Q1, the smoothing capacitor C1, and the fourth diode D4. The closed loop including the smoothing capacitor C1 will be formed when the voltage across the inductor L becomes higher than the voltage of the smoothing capacitor C1 by the stored energy of the inductor L. The ON length of the second switching element Q2, the size of the inductor L, etc., are designed so that the voltage generated across the inductor L in the period of FIG. 82C will be higher than the peak voltage of the AC source. So, in this period, the smoothing capacitor C1 is charged by the energy of the inductor L, not by the AC source.

As shown in the above explanation, in each of the positive and negative cycles, a first current supplying mode in which the current flows through a loop including the AC source, the inductor L, and the load LD is given in the second period T2, and a second current supplying mode in which the current flows through a loop including the inductor L and the load LD but excluding the AC source is given in the first and third periods T1, T3. That is, the control circuit can improve a harmonic distortion (a power-factor) and limit the current to the load, always passing the current to the load and the inductor, by repeating the first current supplying mode and the second current supplying mode alternately.

Twenty-Fifth Embodiment

Figure 83:
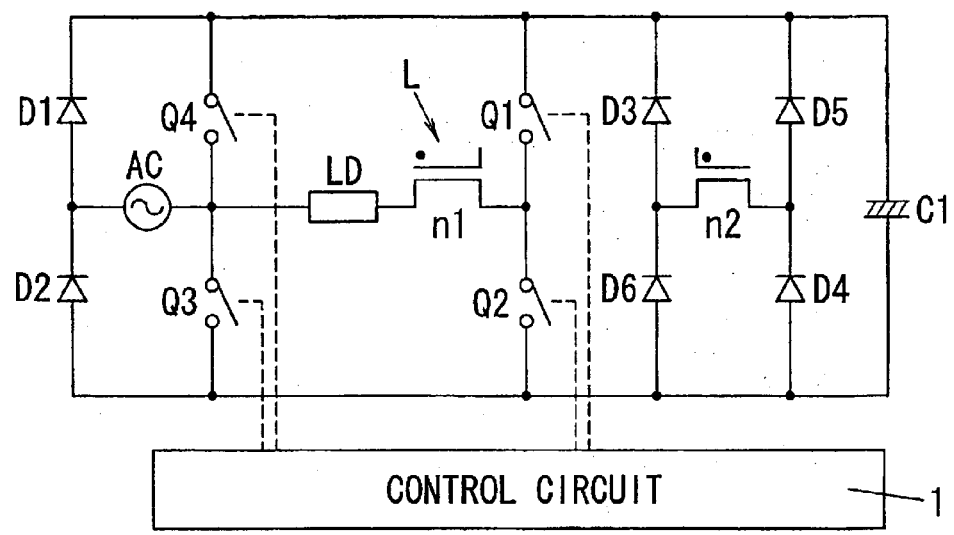
FIG. 83 is a circuit diagram of a power converter in accordance with a twenty-fifth embodiment of the present invention.

A power converter in accordance with a twenty-fifth embodiment of the present invention will be explained based on FIGS. 83–85. This power converter is designed to convert AC power from an AC source into DC power and subsequently convert the DC power to AC power in order to supply an alternating current of rectangular wave of low frequency, for example, at 100 Hz, to a load such as a discharge lamp. This power converter includes four switching elements Q1–Q4, one inductor L, and one smoothing capacitor C1. The first and second switching elements Q1 and Q2, each defined by FET, have a parasitic diode, respectively, which defines a bypass allowing a reverse current to flow across each switching element. The inductor L has a primary winding n1 and a secondary winding n2.

A first diode D1, the first switching element Q1, the primary winding n1 of the inductor L, and the load LD are connected in series across the AC source, and also, the load LD, the primary winding n1, the second switching element Q2, and a second diode D2 are connected in series across the AC source. The third switching element Q3 and the bypass of the second switching element Q2 are connected in series across a series circuit of the primary winding n1 and the load LD. The bypass of the first switching element Q1 and the fourth switching element Q4 are connected in series across the series circuit of the primary winding n1 and the load LD. A series circuit of a third diode D3, the smoothing capacitor C1, and a fourth diode D4 is connected across the secondary winding n2. A series circuit of a fifth diode D5, the smoothing capacitor C1, and a sixth diode D6 is also connected across the secondary winding n2. A series circuit of the first switching element Q1, the primary winding n1, the load LD, the third switching element Q3 is inserted across the smoothing capacitor C1. A series circuit of the fourth switching element Q4, the load LD, the primary winding n1, the second switching element Q2 is also inserted across the smoothing capacitor C1. The diodes D3–D6 form a path to pass a charging current to the smoothing capacitor from the inductor.

The control circuit passes the current to the load in one direction by controlling the first and third switching elements Q1, Q3 so that both switching elements will repeat three patterns comprising a period in which both switching elements are turned on at the same time, and periods in which either of them is turned on, while making the second and fourth switching element Q2 and Q4 turn off. And the control circuit passes the current to the load in the reverse direction by controlling the second and fourth switching elements Q2 and Q4 so that both switching elements will repeat three patterns comprising a period in which both switching elements are turned on at the same time, and periods in which either of them is turned on, while making the first and third switching elements Q1 and Q3 turn off.

The control circuit can always pass the current to both the load and the inductor, improving the harmonic distortion, namely, a power-factor, by controlling the first, second, third, and fourth switching elements Q1–Q4 in six different on/off patterns. These six patterns are classified into a positive cycle in which three continuous patterns are repeated in a positive half cycle of the AC source, and a negative cycle in which remaining three continuous patterns are repeated in a negative half cycle of the AC source. Each of the positive cycle and the negative cycle is repeated alternately at a low frequency, for example, at 100 Hz. Each switching element is turned on and off at a frequency higher enough than the frequency of the AC source (50–60 Hz), for example, dozens—several hundred kHz.

Figure 84A:
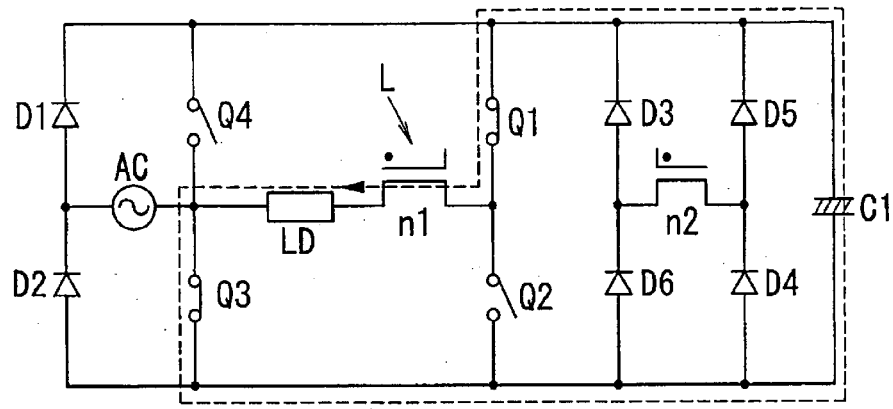
FIGS. 84A, 84B, and 84C are explanatory diagrams showing a pass of the current flowing through the above circuit when the switching elements are controlled in different on/off patterns over the positive half cycle of the AC source.
Figure 84B:
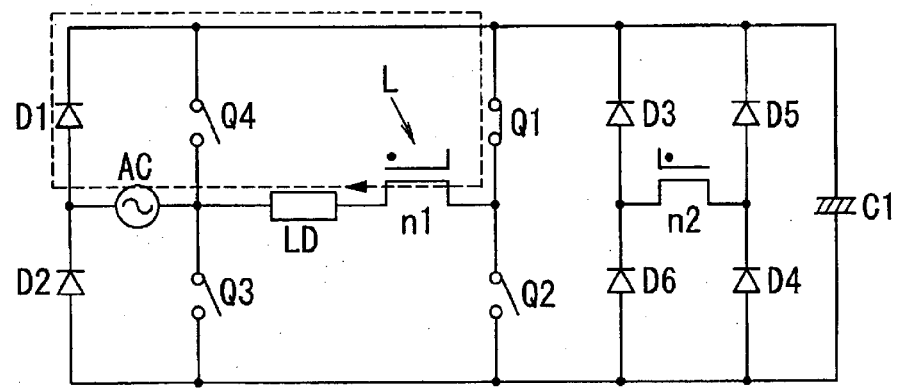
Figure 84C:
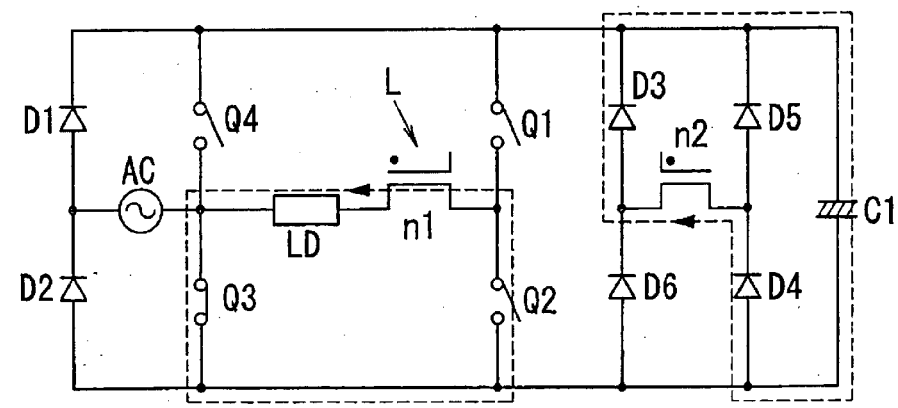

FIGS. 84A–84C show a control system in a first pattern of the positive cycle, in a second pattern of the positive cycle, and in a third pattern of the positive cycle, respectively. As shown in FIG. 84A, in a period of the first pattern, the first and third switching elements Q1, Q3 are turned on, and a current flows through a closed loop; from the smoothing capacitor C1 to the smoothing capacitor C1 via the first switching element Q1, the primary winding n1 of the inductor L, the load LD, and the third switching element Q3. In this period, the current flowing through the primary winding n1 of the inductor L increases with time, and energy is stored in the inductor L, and the inductor operates as a current-limiting element to the load LD.

As shown in FIG. 84B, in a period of the second pattern, only the first switching element Q1 is turned on, and a current flows through a closed loop; from the AC source to the AC source via the first diode D1, the first switching element Q1, the primary winding n1 of the inductor L, and the load LD. In this period, whether the current flowing through the primary winding n1 will increase or decrease, namely, whether energy will be stored in the inductor L or discharged from the inductor L is decided according to the magnitude relation between the voltage across the AC source and the voltage across the primary winding n1.

As shown in FIG. 84C, in a period of the third pattern, only the third switching element Q3 is turned on, and the stored energy of the inductor L is discharged through two closed loops; one is from the primary winding n1 of the inductor L to the primary winding n1 via the load LD, and the third switching element Q3, and the bypass of the second switching element Q2; and the other is from the secondary winding n2 of the inductor L to the secondary winding n2 via the third diode D3, the smoothing capacitor C1, and the fourth diode D4. The closed loop including the smoothing capacitor C1 will be formed only when the voltage across the secondary winding n2 becomes higher than the voltage of the smoothing capacitor C1 by the stored energy of the inductor L.

Figure 85A:
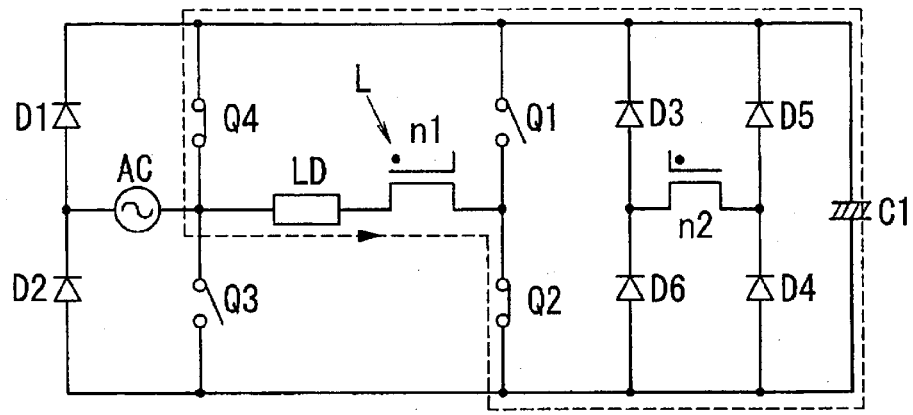
FIGS. 85A, 85B, and 85C are explanatory diagrams showing a pass of the current flowing through the above circuit when the switching elements are controlled in different on/off patterns over the negative half cycle of the AC source.
Figure 85B:
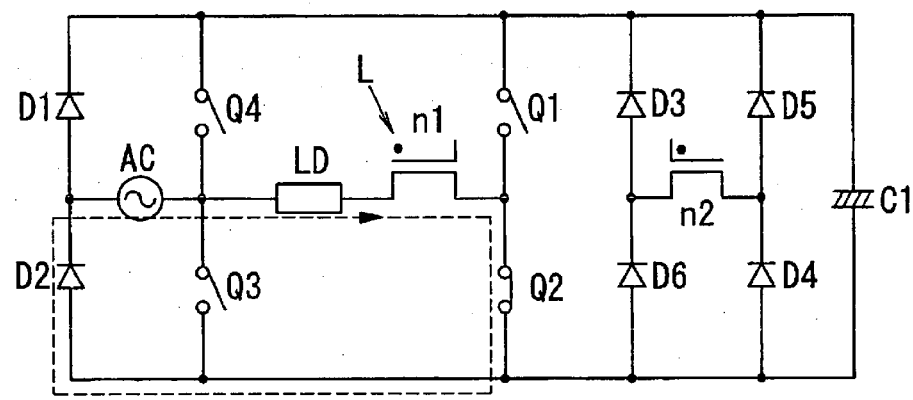
Figure 85C:
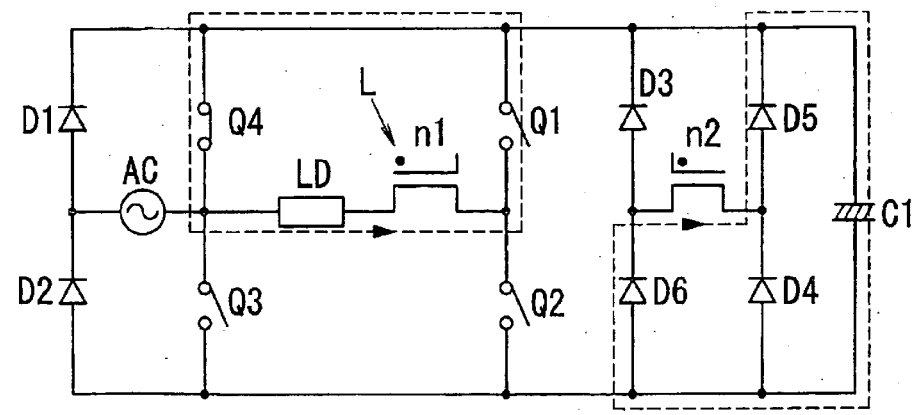

FIGS. 85A–85C show a control system in a first pattern of the negative cycle, in a second pattern of the negative cycle, and in a third pattern of the negative cycle, respectively. As shown in FIG. 85A, in a period of the first pattern, the second and fourth switching elements Q2, Q4 are turned on, and a current flows through a closed loop; from the smoothing capacitor C1 to the smoothing capacitor C1 via the fourth switching element Q4, the load LD, the primary winding n1 of the inductor L, and the second switching element Q2. In this period, the current flowing through the primary winding n1 of the inductor L increases with time, and energy is stored in the inductor L, and the inductor L operates as a current-limiting element to the load LD.

As shown in FIG. 85B, in a period of the second pattern, only the second switching element Q2 is turned on, and a current flows through a closed loop; from the AC source to the AC source via the load LD, the primary winding n1 of the inductor L, the second switching element Q2, and the second diode D2. In this period, whether the current flowing through the primary winding n1 will increase or decrease, namely, whether energy will be stored in the inductor L or discharged from the inductor L is decided according to the magnitude relation between the voltage across the AC source and the voltage across the primary winding n1.

As shown in FIG. 85C, in a period of the third pattern, only the fourth switching element Q4 is turned on, and the stored energy of the inductor L is discharged through two closed loops; one is from the primary winding n1 of the inductor L to the primary winding n1 via the bypass of the first switching element Q1, the fourth switching element Q4, and the load LD; and the other is from the secondary winding n2 of the inductor L to the secondary winding n2 via the fifth diode D5, the smoothing capacitor C1, and the sixth diode D6. The closed loop including the smoothing capacitor C1 will be formed only when the voltage across the secondary winding n2 becomes higher than the voltage of the smoothing capacitor C1 by the stored energy of the inductor L.

As shown in the above explanation, in each of the positive and negative cycles, a first current supplying mode in which the current flows through a loop including the AC source, the inductor L, and the load LD is given in the second period T2, and a second current supplying mode in which the current flows through a loop including the inductor L and the load LD but excluding the AC source is given in the first and third periods T1, T3. That is, the control circuit can improve a harmonic distortion (a power-factor) and limit the current to the load, always passing the current to the load and the inductor, by repeating the first current supplying mode and the second current supplying mode alternately.

In this embodiment, the voltage which is applied to the smoothing capacitor C1 can be set to a desired value by selecting the turn ratio of the primary winding n1 and the secondary winding n2 appropriately, because the inductor L has the primary winding n1 and the secondary winding n2, like the twenty-second embodiment, whereby freedom of a circuit design can be raised.

This applicant is based on and claims the priority of Japanese Patent Application No. 2002-086276, filed on Mar. 26, 2002 and Japanese Patent Application No. 2002-086308, filed on Mar. 26, 2002, the entire contents of which are expressly incorporated by reference herein.

What is claimed is:

1. A power converter for providing an electric power from an AC source to a load, said power converter comprising:
   a plurality of switching elements which turns on and off repetitively to interrupt an input current from said AC source to provide an output current to said load;
   an inductor provided in a path of said input current from said AC source to said load;
   a smoothing capacitor which smoothens said input current to said load;
   a control circuit for controlling said switching elements to turn on and off;
   said inductor and said load being connected in series across said AC source;
   said inductor and said load being connected in series across said smoothing capacitor;
   said control circuit controlling the plurality of said switching elements to turn on and off in different patterns to give a first current supplying mode and a second current supplying mode;
   said first current supplying mode supplying said input current from said AC source to a closed loop including said inductor and said load, during which the current from said AC source is fed directly to said load,
   said second current supplying mode supplying said output current to said load in a closed loop including said inductor and said load but excluding said AC source, during which energy stored in said inductor supplying a current to said load,
   said control circuit repeating said first current supplying mode and said second current supplying mode alternately during each half cycle of the AC current being supplied from said AC source, thereby constantly passing the current to said inductor and said load.

2. The power converter as set forth in claim 1, wherein said control circuit controls the plurality of said switching elements in three different patterns to continuously repeat a first pattern, a second pattern, and a third pattern in this order, one of said three patterns defining one of said first current supplying mode and said second current supplying mode, the remaining two patterns defining the other of said first current supplying mode and said second current supplying mode,
   the voltage applied to said inductor decreasing in accordance with a progress from said first pattern to said third pattern.

3. The power converter as set forth in claim 2, wherein said first pattern allows said smoothing capacitor to pass a discharge current through said inductor,
   said second pattern keeping said smoothing capacitor free from the current flowing through said inductor, and
   said third pattern allowing said smoothing capacitor to be charged by the current flowing through said inductor.

4. The power converter as set forth in claim 1, including:
   a rectifier circuit DB which rectifies the AC current from said AC source to give a DC voltage;
   said switching elements comprising a first switching element Q1, a second switching element Q2, and a third switching element Q3,
   said first switching element Q1, said second switching element Q2, and said third switching element Q3 being connected in series with said inductor, said load, a first diode D1, and said smoothing capacitor C1 across said rectifier circuit DB,
   a second diode D2 being connected across a series circuit of said smoothing capacitor C1 and said third switching element Q3,
   said second diode D2 being connected in series with a third diode D3 across a series circuit of said inductor L, said first diode D1, said load LD, and said second switching element Q2,
   a fourth diode D4 being connected in series with said smoothing capacitor across said second switching element Q2.

5. The power converter as set forth in claim 1, including:
   a rectifier circuit DB which rectifies the AC current from said AC source to give a DC voltage;
   said switching elements comprising a first switching element Q1, a second switching element Q2, a third switching element Q3, a fourth switching element Q4, and a fifth switching element Q5,
   each of said second switching element Q2 and said fourth switching element Q4 having a bypass allowing a reverse current to flow across each switching element,
   said first switching element Q1 and said second switching element Q2 being connected in series with a first diode D1 across said rectifier circuit DB, said first diode D1 being inserted between a high voltage side of said rectifier DB and said first switching element Q1, said first diode D1 having its cathode connected to said first switching element Q1,
   said third switching element Q3 and said fourth switching element Q4 being connected in series with a second diode D2 across said rectifier circuit DB, said second diode D2 being inserted between a high voltage side of said rectifier DB and said third switching element Q3, said second diode D2 having its cathode connected to said third switching element Q3,
   said second switching element Q2 and said fourth switching element Q4 being connected through a common third diode D3 to a low voltage side of said rectifier DB,
   said inductor L being connected in series with said load LD between the connection point of said first switching element Q1 with said second switching element Q2 and the connection point of said third switching element Q3 with said fourth switching element Q4, said fifth switching element Q5 being connected in series with said first diode D1, said first switching element Q1, said inductor L, said load LD, said fourth switching element Q4, and said smoothing capacitor C1 across said rectifier DB, said fifth switching element Q5 being connected in series with said second diode D2, said third switching element Q3, said load LD, said inductor L, said second switching element Q2, and said smoothing capacitor C1 across said rectifier DB, a fourth diode D4 being connected in series with the bypass of said second switching element Q2, said inductor L, and said load LD across said smoothing capacitor C1, and a fifth diode D5 being connected in series with the bypass of said fourth switching element Q4, said load LD, and said inductor L across said smoothing capacitor C1.

6. The power converter as set forth in claim 1, including:

a rectifier circuit DB which rectifies the AC current from said AC source to give a DC voltage;

said switching elements comprising a first switching element Q1, a second switching element Q2, a third switching element Q3, a fourth switching element Q4, and a fifth switching element Q5, said first switching element Q1 and said second switching element Q2 being connected in series with a first diode D1 across said rectifier circuit DB, said first diode D1 being inserted between a high voltage side of said rectifier DB and said first switching element Q1, said first diode D1 having its cathode connected to said first switching element Q1, said third switching element Q3 and said fourth switching element Q4 being connected in series with a second diode D2 across said rectifier circuit DB, said second diode D2 being inserted between a high voltage side of said rectifier DB and said third switching element Q3, said second diode D2 having its cathode connected to said third switching element Q3, said inductor L being connected in series with said load LD between the connection point of said first switching element Q1 with said second switching element Q2 and the connection point of said third switching element Q3 with said fourth switching element Q4, a series circuit of said first diode D1, said first switching element Q1, said inductor L, said load LD, and said fourth switching element Q4 and a series circuit of said second diode D2, said third switching element Q3, said inductor L, said load LD, and said second switching element Q2 being connected in series with the fifth switching element Q5, said AC source, said rectifier circuit DB, said first diode D1, said first switching element Q1, said inductor L, said load LD, and said third diode D3 being connected in series across said smoothing capacitor C1, and said AC source, said rectifier circuit DB, said second diode D2, said third switching element Q3, said inductor L, said load LD, and said fourth diode D4 being connected in series across said smoothing capacitor C1.

7. The power converter as set forth in claim 1, wherein said switching elements comprising a first switching element Q1, a second switching element Q2, a third switching element Q3, and a fourth switching element Q4, each of said second switching element Q2 and said third switching element Q3 having a bypass allowing a reverse current to flow across each switching element, said first switching element Q1 and said second switching element Q2 being connected in series with said inductor L and said load LD across said AC source, said first switching element Q1 and said third switching element Q3 being connected in series with said inductor L and said load LD across said AC source, a series circuit of a first diode D1 and a second diode D2 being connected across a series circuit of said second switching element Q2 and said third switching element Q3, a series circuit of a first smoothing capacitor C1 and a second smoothing capacitor C2 being connected across said series circuit of said second switching element Q2 and said third switching element Q3, a diode bridge D11–D14 being inserted between the connection point of said first smoothing capacitor C1 with said second smoothing capacitor C2 and said AC source, each input terminal of said diode bridge being connected to the connection point of said first smoothing capacitor C1 with said second smoothing capacitor C2 and said AC source, respectively, said first switching element Q1 being connected between output terminals of said diode bridge D11–D14, a series circuit of a third diode D3 and a fourth diode D4 being connected across said series circuit of said first diode D1 and said second diode D2, said inductor L and said load LD being connected in series between the connection point of said first diode D1 with said second diode D2 and the connection point of said third diode D3 with said fourth diode D4, said fourth switching element Q4 being connected across said series circuit of said third diode D3 and said fourth diode D4, a series circuit of a fifth diode D5 and a sixth diode D6 being connected across said series circuit of said first diode D1 and said second diode D2, and said AC source being inserted between the connection point of said first diode D1 with said second diode D2 and the connection point of said fifth diode D5 with said sixth diode D6.

8. The power converter as set forth in claim 1, wherein said switching elements comprising a first switching element Q1, a second switching element Q2, a third switching element Q3, and a fourth switching element Q4, each of said second switching element Q2 and said third switching element Q3 having a bypass allowing a reverse current to flow across each switching element, said first switching element Q1 and said second switching element Q2 being connected in series with said inductor L and said load LD across said AC source, said first switching element Q1 and said third switching element Q3 being connected in series with said inductor L and said load LD across said AC source, a series circuit of a first diode D1 and a second diode D2 being connected across a series circuit of said second switching element Q2 and said third switching element Q3, a series circuit of a first smoothing capacitor C1 and a second smoothing capacitor C2 being connected across said series circuit of said second switching element Q2 and said third switching element Q3, a diode bridge D11–D14 being inserted between the connection point of said first smoothing capacitor C1 with said second smoothing capacitor C2 and one terminal of said AC source, each input terminal of said diode bridge being connected to the connection point of said first smoothing capacitor C1 with said second smoothing capacitor C2 and said terminal of said AC source, respectively, said first switching element Q1 being connected between output terminals of said diode bridge D11–D14, said one terminal of said AC source being connected with the connection point of said first diode D1 with said second diode D2, a diode bridge D3–D6 being inserted between the connection point of said first diode D1 with said second diode D2 and the connection point of said second switching element Q2 with said switching element Q3, said diode D3 being connected in series with said diode D4, said diode D5 being connected in series with said diode D6, said inductor L and said load LD being connected in series between the connection point of said diode D3 with said diode D4 and the connection point of said diode D5 with said diode D6, and said fourth switching element Q4 being connected across the series circuit of said third diode D3 and said fourth diode D4.

9. The power converter as set forth in claim 1, wherein said switching elements comprising a first switching element Q1, a second switching element Q2, a third switching element Q3, and a fourth switching element Q4, each of said first switching element Q1 and said second switching element Q2 having a bypass allowing a reverse current to flow across each switching element, said first switching element Q1 and a first smoothing capacitor C1 being connected in series with said inductor L and said load LD across said AC source, said second switching element Q2 and a second smoothing capacitor C2 being connected in series with said inductor L and said load LD across said AC source, a series circuit of said first smoothing capacitor C1 and said second smoothing capacitor C2 being connected across a series circuit of said first switching element Q1 and said second switching element Q2, a first diode D1 and said third switching element Q3 being connected in series across a series circuit of said inductor L and said load LD, a second diode D2 and said fourth switching element Q4 being connected in series across said series circuit of said inductor L and said load LD, a series circuit of said third switching element Q3 and said fourth switching element Q4 being connected across a series circuit of said first diode D1 and said second diode D2, said AC source being inserted between the connection point of said first switching element Q1 with said second switching element Q2 and the connection point of said first diode D1 with said second diode D2, said load LD, said inductor L, said AC source, and said bypass of said first switching element Q1 being connected in series across said first smoothing capacitor C1, and said bypass of said second switching element Q2, said AC source, said inductor L, and said load LD being connected in series across said second smoothing capacitor C2.

10. The power converter as set forth in claim 1, wherein said switching elements comprising a first switching element Q1, a second switching element Q2, a third switching element Q3, and a fourth switching element Q4, each of said first switching element Q1 and said second switching element Q2 having a bypass allowing a reverse current to flow across each switching element, said first switching element Q1 and a first diode D1 being connected in series with said inductor L and said load LD across said AC source, said second switching element Q2 and a second diode D2 being connected in series with said inductor L and said load LD across said AC source, a series circuit of said first diode D1 and said second diode D2 being connected across a series circuit of said first switching element Q1 and said second switching element Q2, a smoothing capacitor C1 being connected across said series circuit of said switching element Q1 and said switching element Q2, a series circuit of said third switching element Q3 and said fourth switching element Q4 being connected across said series circuit of said switching element Q1 and said second switching element Q2, said AC source being inserted between the connection point of said first diode D1 with said second diode D2 and the connection point of said third switching element Q3 with said fourth switching element Q4, said inductor L and said load LD being inserted in series between the connection point of said first switching element Q1 with said second switching element Q2 and the connection point of said third switching element Q3 with said fourth switching element Q4, said bypass of said second switching element Q2, said load LD, said inductor L, said AC source, and said first diode D1 being connected in series across said smoothing capacitor C1, and said second diode D2, said AC source, said inductor L, said load LD, and said bypass of said first switching element Q1 being connected in series across said smoothing capacitor C1.

11. The power converter as set forth in claim 1, wherein said switching elements comprising a first switching element Q1, a second switching element Q2, a third switching element Q3, and a fourth switching element Q4, each of said third switching element Q3 and said fourth switching element Q4 having a bypass allowing a reverse current to flow across each switching element, a first diode D1 and said first switching element Q1 being connected in series with said inductor L and said load LD across said AC source, said second switching element Q2 and a second diode D2 being connected in series with said inductor L and said load LD across said AC source, a series circuit of said switching element Q1 and said second switching element Q2 being connected across a series circuit of said first diode D1 and said second diode D2, a first smoothing capacitor C1 and said third switching element Q3 being connected in series across a series circuit of said inductor L and said load LD, said fourth switching element Q4 and a second smoothing capacitor C2 being connected in series across said series circuit of said inductor L and said load LD, a series circuit of said first smoothing capacitor C1 and said second smoothing capacitor C2 being connected across a series circuit of said third switching element Q3 and said fourth switching element Q4, said AC source being connected between the connection point of said first diode D1 with said second diode D2 and the connection point of said first smoothing capacitor C1 with said second smoothing capacitor C2, said inductor L, said load LD, and said bypass of said third switching element Q3 being connected in series across said first smoothing capacitor C1, and said bypass of said fourth switching element Q4, said load LD, and said inductor L being connected in series across said second smoothing capacitor C2.

12. The power converter as set forth in claim 1, wherein said switching elements comprising a first switching element Q1, a second switching element Q2, a third switching element Q3, and a fourth switching element Q4, a first diode D1 and a first smoothing capacitor C1 being connected in series with said inductor L and said load LD across said AC source, a second diode D2 and a second smoothing capacitor C2 being connected in series with said inductor L and said load LD across said AC source, a series circuit of said first smoothing capacitor C1 and said second smoothing capacitor C2 being connected across a series circuit of said first diode D1 and said second diode D2, a series circuit of said first switching element Q1 and said second switching element Q2 being connected across said series circuit of said first diode D1 and said second diode D2, a series circuit of a third diode D3 and said third switching element Q3 being connected across a series circuit of said inductor L and said load LD, a series circuit of a fourth diode D4 and said fourth switching element Q4 being connected across said series circuit of said inductor L and said load LD, a series circuit of said third switching element Q3 and said fourth switching element Q4 being connected across a series circuit of said third diode D3 and said fourth diode D4, and said AC source being inserted between the connection point of said first diode D1 with said second diode D2 and the connection point of said first switching element Q1 with said second switching element Q2.

13. The power converter as set forth in claim 1, wherein said switching elements comprising a first switching element Q1, a second switching element Q2, a third switching element Q3, and a fourth switching element Q4, each of said second switching element Q2 and said fourth switching element Q4 having a bypass allowing a reverse current to flow across each switching element, a first diode D1, said first switching element Q1, and a second diode D2 being connected in series with said inductor L and said load LD across said AC source, said first diode D1, said second switching element Q2, said second diode D2, and a smoothing capacitor C1 being connected in series with said inductor L and said load LD across said AC source, a third diode D3, said third switching element Q3, and a fourth diode D4 being connected in series with said inductor L and said load LD across said AC source, said third diode D3, said fourth switching element Q4, said smoothing capacitor C1, and said fourth diode D4 being connected in series with said inductor L and said load LD across said AC source, a series circuit of said first switching element Q1, said fourth switching element Q4, said inductor L, and said load LD being connected across said smoothing capacitor C1, a series circuit of said second switching element Q2, said third switching element Q3, said inductor L, and said load LD being connected across said smoothing capacitor C1, said second diode D2, said AC source, said first diode D1, said load LD, said inductor L, and said bypass of said second switching element Q2 being connected in series across said smoothing capacitor C1, and said fourth diode D4, said AC source, said third diode D3, said inductor L, said load LD, and said bypass of said fourth switching element Q4 being connected in series across said smoothing capacitor C1.

14. The power converter as set forth in claim 1, wherein said inductor being connected with said smoothing capacitor through a rectifying device.

15. The power converter as set forth in claim 14, wherein said inductor L having a primary winding n1 and a secondary winding n2, a current being fed to said load through said primary winding n1, said secondary winding n2 being connected with said smoothing capacitor C1 through said rectifying device, and said smoothing capacitor C1 being charged by the current generated in said secondary winding.

16. The power converter as set forth in claim 14, including:

a rectifier circuit DB which rectifies the AC current from said AC source to give a DC voltage;

said switching elements comprising a first switching element Q1 and a second switching element Q2, said first switching element Q1 being connected in series with said inductor L and said load LD across said rectifier circuit DB, a first diode D1, said smoothing capacitor C1, and a second diode D2 being connected in series across said inductor L, said first diode D1 and said second diode D2 defining said rectifying device, and a series circuit of said second switching element Q2, said inductor L, and said load LD being connected across said smoothing capacitor C1.

17. The power converter as set forth in claim 15, including:

a rectifier circuit DB which rectifies the AC current from said AC source to give a DC voltage;

said switching elements comprising a first switching element Q1 and a second switching element Q2, said first switching element Q1 being connected in series with said primary winding n1 of said inductor L and said load LD across said rectifier circuit DB, said second switching element Q2, said inductor L, and said load LD being connected in series across said smoothing capacitor C1, said secondary winding n2 and a first diode D1 being connected across said smoothing capacitor C1, said load LD and a second diode D2 being connected in series across said primary winding n1, and said first diode D1 defining said rectifying device.

18. The power converter as set forth in claim 14, including:
- a rectifier circuit DB which rectifies the AC current from said AC source to give a DC voltage;
- said switching elements comprising a first switching element Q1 and a second switching element Q2,
- said first switching element Q1 being connected in series with said inductor L, said load LD, said smoothing capacitor C1, and said second switching element Q2 across said rectifier circuit DB,
- said first switching element Q1 being connected in series with said inductor L, said load LD, and a first diode D1 across said rectifier circuit DB,
- a series circuit of a second diode D2, said smoothing capacitor C1, and a third diode D3 being inserted across said inductor L, and
- said second diode D2 and said third diode D3 defining said rectifying device.

19. The power converter as set forth in claim 14, wherein
- said switching elements comprising a first switching element Q1, a second switching element Q2, a third switching element Q3, and a fourth switching element Q4,
- each of said first switching element Q1 and said second switching element Q2 having a bypass allowing a reverse current to flow across each switching element,
- a first diode D1, said first switching element Q1, said inductor L, and said load LD being connected in series across said AC source,
- said load LD, said inductor L, said second switching element Q2, and a second diode D2 being connected in series across said AC source,
- said third switching element Q3 and said bypass of said second switching element Q2 being connected in series across a series circuit of said inductor L and said load LD,
- a third diode D3, a smoothing capacitor C1, and said bypass of said second switching element Q2 being connected in series across said inductor L,
- said bypass of said first switching element Q1 and said fourth switching element Q4 being connected in series across said series circuit of said inductor L and said load LD,
- said bypass of said first switching element Q1, said smoothing capacitor C1, and a fourth diode D4 being connected in series across said inductor L, and
- said third diode D3 and said fourth diode D4 defining said rectifying device.

20. The power converter as set forth in claim 15, wherein
- said switching elements comprising a first switching element Q1, a second switching element Q2, a third switching element Q3, and a fourth switching element Q4,
- each of said first switching element Q1 and said second switching element Q2 having a bypass allowing a reverse current to flow across each switching element,
- a first diode D1, said first switching element Q1, said primary winding n1 of said inductor L, and said load LD being connected in series across said AC source,
- said load LD, said primary winding n1, said second switching element Q2, and a second diode D2 being connected in series across said AC source,
- said third switching element Q3 and said bypass of said second switching element Q2 being connected in series across a series circuit of said primary winding n1 and said load LD,
- said bypass of said first switching element Q1 and said fourth switching element Q4 being connected in series across said series circuit of said primary winding n1 and said load LD,
- a series circuit of a third diode D3, said smoothing capacitor C1, and a fourth diode D4 being connected across said secondary winding n2,
- a series circuit of a fifth diode D5, said smoothing capacitor C1, and a sixth diode D6 being connected across said secondary winding n2,
- a series circuit of said first switching element Q1, said primary winding n1, said load LD, said third switching element Q3 being inserted across said smoothing capacitor C1,
- a series circuit of said fourth switching element Q4, said load LD, said primary winding n1, said second switching element Q2 being inserted across said smoothing capacitor C1, and
- said third diode D3, said fourth diode D4, said fifth diode D5, and said sixth diode D6 defining said rectifying device.

* * * * *